*(12)* United States Patent
Iwasaki

(10) Patent No.: US 7,771,108 B2
(45) Date of Patent: Aug. 10, 2010

(54) PLANAR LIGHTING DEVICE INCLUDING LIGHT SOURCE/LIGHT GUIDE SLIDING MECHANISM

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 99 days.

(21) Appl. No.: 12/254,527

(22) Filed: Oct. 20, 2008

(65) Prior Publication Data

US 2009/0103328 A1 Apr. 23, 2009

(30) Foreign Application Priority Data

Oct. 19, 2007 (JP) ............................. 2007-272866

(51) Int. Cl.
*F21V 7/10* (2006.01)
*F21V 19/00* (2006.01)
*G09F 13/18* (2006.01)

(52) U.S. Cl. ....................... 362/634; 362/632; 362/628; 362/288; 362/306; 349/65; 40/546; 40/547

(58) Field of Classification Search ................. 362/628, 362/632, 633, 634, 561, 26, 97.2, 288, 306; 349/65; 40/546, 547

See application file for complete search history.

(56) References Cited

U.S. PATENT DOCUMENTS 5,993,020 A 11/1999 Koike
6,217,184 B1 4/2001 Koike et al.
6,309,081 B1 * 10/2001 Furihata .................... 362/634
6,409,356 B1 * 6/2002 Nishimura ................. 362/632
6,979,115 B2 * 12/2005 Ohizumi et al. ............. 362/634
7,153,018 B2 * 12/2006 Nomura ..................... 362/634
2002/0126470 A1 * 9/2002 Saito et al. ................... 362/31
2003/0007343 A1 * 1/2003 Ohwada et al. ............... 362/31
2009/0097277 A1 * 4/2009 Iwasaki ...................... 362/628

FOREIGN PATENT DOCUMENTS

| JP | 07-036037 | 2/1995 |
|---|---|---|
| JP | 08-248233 | 9/1996 |
| JP | 08-271739 | 10/1996 |
| JP | 11-153963 | 6/1999 |
| JP | 2003-090919 A | 3/2003 |
| JP | 2004-171948 A | 6/2004 |
| JP | 2005-108676 A | 4/2005 |
| JP | 2005-302322 A | 10/2005 |

* cited by examiner

*Primary Examiner*—Ismael Negron
(74) *Attorney, Agent, or Firm*—Sughrue Mion, PLLC

(57) ABSTRACT

The planar lighting device includes a light guide plate including two symmetrical, inclined planes increasingly distanced from the light exit plane with the increasing distance from the light entrance planes toward the center, a curved portion joining the inclined planes, and scattering particles dispersed therein; light sources; a housing; a securing unit securing the light sources and light guide plate to keep their distance constant, and a sliding mechanism allowing the securing unit to slide. Distance between the light entrance planes, thicknesses at the light entrance planes and at the central curved portion, its radius of curvature and taper of the inclined planes are all held within respective given ranges as well as scattering particle diameter and density, light use efficiency and middle-high ratio of the brightness distribution.

17 Claims, 25 Drawing Sheets

←― a方向

FIG.22A    FIG.22B
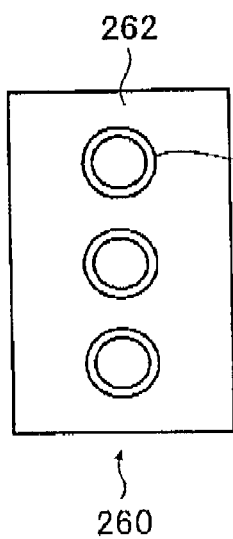
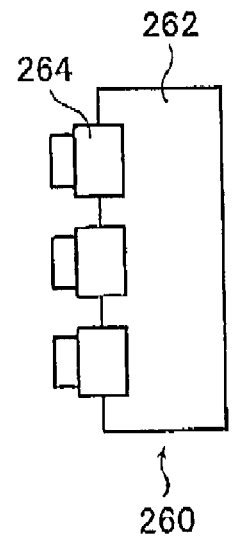
FIG.23A    FIG.23B
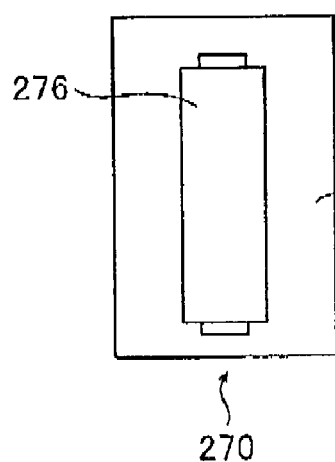
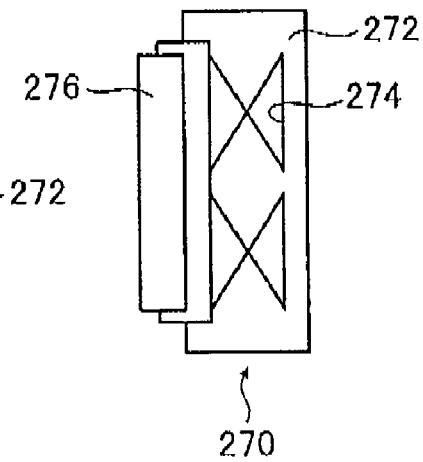

WIDTHWISE DIRECTION

PENDING DIRECTION

PLANAR LIGHTING DEVICE INCLUDING LIGHT SOURCE/LIGHT GUIDE SLIDING MECHANISM

The entire contents of literature cited in this specification are incorporated herein by reference.

BACKGROUND OF THE INVENTION

The present invention relates to a planar lighting device used for a liquid crystal display device and like devices.

Liquid crystal display devices use a backlight unit for radiating light from behind the liquid crystal display panel to illuminate the liquid crystal display panel. A backlight unit is configured using a light guide plate for diffusing light emitted by an illuminating light source to irradiate the liquid crystal display panel and optical parts such as a prism sheet and a diffusion sheet for rendering the light emitted from the light guide plate uniform.

Currently, large liquid crystal televisions predominantly use a so-called direct illumination type backlight unit comprising a light guide plate disposed immediately above the illuminating light source. This type of backlight unit comprises a plurality of cold cathode tubes serving as a light source provided behind the liquid crystal display panel whereas the inside of the backlight unit provides white reflection surfaces to ensure uniform light amount distribution and necessary brightness.

To achieve a uniform light amount distribution with a direct illumination type backlight unit, however, a thickness of about 30 mm in a direction perpendicular to the liquid crystal display panel is required, making further reduction of thickness difficult with the direct illumination type backlight unit.

Among backlight units that allow reduction of thickness thereof is a backlight unit using a light guide plate whereby light emitted by illumination light sources and admitted into the light guide plate is guided in given directions and emitted through a light exit plane that is different from the plane through which light is admitted.

There has been proposed a backlight of a type described above using a light guide plate formed by mixing scattering particles for diffusing light into a transparent resin, for which reference may be had, for example, to JP 07-36037 A, JP 08-248233 A, JP 08-271739 A, and JP 11-153963 A.

JP 07-36037 A, for example, discloses a light diffusion light guide light source device comprising a light diffusion light guide member having at least one light entrance plane region and at least one light exit plane region and light source means for admitting light through the light entrance plane region, the light diffusion light guide member having a region that has a tendency to decrease in thickness with the increasing distance from the light entrance plane.

JP 08-248233 A discloses a planar light source device comprising a light diffusion light guide member, a prism sheet provided on the side of the light diffusion light guide member closer to a light exit plane, and a reflector provided on the rear side of the light diffusion light guide member. JP 08-271739A discloses a liquid crystal display comprising a light emission direction correcting element formed of sheet optical materials provided with a light entrance plane having a repeated undulate pattern of prism arrays and a light exit plane given a light diffusing property. JP 11-153963 A discloses a light source device comprising a light diffusion light guide member having a scattering power therein and light supply means for supplying light through an end face of the light diffusion light guide member.

Also proposed in addition to the above light guide plates are a light guide plate having a greater thickness at the center thereof than at an end thereof at which light is admitted and the opposite end, a light guide plate having a reflection plane inclined in such a direction that the thickness of the light guide plate increases with the increasing distance from a part of the light guide plate at which light is admitted, and a light guide plate having a configuration such that the thickness of the light guide plate is greatest at a greatest distance from the location at which light is admitted (See, for example, JP 2003-90919 A, JP 2004-171948 A, JP 2005-108676 A, and JP 2005-302322 A).

SUMMARY OF THE INVENTION

While a thin design may be achieved with backlight units such as the tandem type, of which the thickness decreases with the increasing distance from the light source, those backlight units yielded lower light use efficiency than the direct illumination type because of the relative dimensions of the cold cathode tube to the reflector. Further, where the light guide plate used is shaped to have grooves for receiving cold cathode tubes, although such a light guide plate could be shaped to have a thickness that decreases with the increasing distance from the cold cathode tube, if the light guide plate is made thinner, brightness at locations immediately above the cold cathode tube disposed in the grooves increased, thus causing uneven brightness on the light exit plane to stand out. In addition, all these light guide plates posed further problems: complex configurations leading to increased machining costs. Thus, a light guide plate of any of such types adapted to be used for a backlight unit for a large liquid crystal television having a screen size of say 37 inches or larger, in particular 50 inches or larger, was considerably expensive.

JP 2003-90919 A, JP 2004-171948 A, JP 2005-108676 A, and JP 2005-302322 propose light guide plates growing thicker with the increasing distance from the light entrance plane to achieve stabler manufacturing or to limit brightness unevenness (unevenness in light amount) using multiple reflection. These light guide plates, made of a transparent material, allow light admitted from the light source to pass and leak through the opposite end and therefore need to be provided with prisms or dot patterns on the underside thereof.

Also proposed is a method whereby the light guide plate is provided with a reflection member near its light entrance plane on the opposite side from the light entrance plane to cause admitted light to undergo multiple reflection before allowing the light to exit through the light exit plane. To achieve a large light exit plane with these light guide plates by this method, however, the light guide plate needs to have an increased thickness, increasing weight and costs. Further, the light sources are projected into the light guide plate and perceived as such to cause uneven brightness and/or uneven illuminance.

On the other hand, the side light type backlight unit using a flat light guide plate contains fine scattering particles dispersed therein in order to efficiently emit admitted light through the light exit plane. Although such a flat light guide plate may be capable of securing a light use efficiency of 83% at a particle density of 0.30 wt %, its brightness dropped in an area about the center as illustrated by the illuminance distribution indicated by a solid line in FIG. 30 when it was adapted to provide a larger screen despite scattering particles evenly dispersed therein, thus allowing uneven brightness to stand out to a visible level.

To even out such uneven brightness, the density of the scattering particles needed to be reduced in order to increase the amount of light leaking from the forward end, thus reducing the light use efficiency and the brightness. For example, when the density of the scattering particles was 0.10 wt %, with the other conditions being equal, the brightness decreased and the light use efficiency lowered to 43%, although uneven brightness could be evened out considerably, as illustrated by a dotted line in FIG. 30.

A large display such as a large liquid crystal television requires a brightness distribution that is bright at a central area of the screen as compared with the periphery thereof, or a high-in-the-middle distribution such as a distribution representing a bell curve on the light exit plane. Although a flat light guide plate containing scattering particles dispersed therein may be capable of providing a flat brightness distribution by reducing the density of the scattering particles, it is incapable of achieving a high-in-the-middle brightness distribution.

It has also been proposed to use a light guide plate having a thickness that, conversely to the tandem type, increases with the increasing distance from the light source for a thin backlight unit. Although use of such a light guide plate does achieve a thinner design and a flat brightness over the whole screen, such a proposal did not provide any teaching or did not give the slightest consideration as to how one may achieve a high-in-the-middle brightness distribution whereby an area close to the center of the screen is brighter than the periphery thereof as required of thin, large-screen liquid crystal televisions.

Further, a large light guide plate expands and contracts greatly in response to ambient temperature and humidity changes; a light guide plate measuring about 50 inches, for example, repeats expansion and contraction of 5 mm or more. In worst cases, an expanded or contracted light guide plate pushes up the liquid crystal display panel, causing uneven brightness comparable in appearance to a pool. To avoid this, one might consider providing a great distance between the liquid crystal display panel and the backlight unit. This approach, however, makes it impossible to design a thinner liquid crystal display device.

It is an object of the invention to provide a light guide plate that solves the problems associated with the prior art mentioned above and which has a large and thin configuration, yields a high light use efficiency, emits light with minimized unevenness in brightness, and achieves a brightness distribution representing a high-in-the-middle curve or a bell curve, whereby an area close to the center of the screen is brighter than the periphery thereof as required of thin, large-screen liquid crystal televisions.

In order to achieve the above objects, according to a first aspect of the present invention, there is provided a planar lighting device comprising: a light guide plate including a light exit plane being rectangular, two light entrance planes respectively containing two opposite longer sides of the light exit plane and being disposed opposite each other, two inclined planes being symmetrical and being increasingly distanced from the light exit plane with an increasing distance from the two light entrance planes toward a center of the light exit plane, a curved portion joining the two inclined planes, and scattering particles for scattering light propagating inside the light guide plate and being contained within the light guide plate; two light sources disposed opposite the two light entrance planes of the light guide plate, respectively; securing means for integrating the two light sources and the light guide plate such that the two light sources are secured to the light guide plate with a distance between the two light sources and the two light entrance planes of the light guide plate kept constant; a housing for accommodating the two light sources and the two light guide plate integrated by the securing means, and a sliding mechanism provided between the housing and the securing means for allowing the securing means to slide with respect to the housing in a direction from the two light entrance planes of the light guide plate toward the two light sources as the light guide plate expands or contracts with the two light sources and the light guide plate integrated and a distance between the two light sources and the light guide plate kept constant; wherein a distance between the two light entrance planes is from 480 mm to 830 mm both inclusive, the scattering particles have a particle diameter of from 4.0 μm to 12.0 μm both inclusive and a particle density of from 0.008 wt % to 0.25 wt % both inclusive, a light use efficiency representing a ratio of light emitted through the light exit plane to light admitted through the two light entrance planes is 55% or higher, and wherein a middle-high ratio of brightness distribution at the light exit plane representing a ratio of brightness of light emitted through a central area of the light exit plane to brightness of light emitted through an area of the light exit plane near either light entrance plane is from 0% to 25% inclusive.

It is preferred that the light guide plate have a minimum thickness of from 0.5 mm to 3.0 mm both inclusive and a maximum thickness of from 1.0 mm to 6.0 mm both inclusive, the curved portion have a radius of curvature of from 1,500 mm to 45,000 mm both inclusive, and the inclined planes have a taper angle of from 0.1° to 2.2° both inclusive with respect to a line parallel to the light exit plane.

Preferably, the light exit plane of the light guide plate is curved outwardly toward the two inclined planes, the light exit plane has a radius of curvature of from 55,000 mm to 120,000 mm both inclusive, and wherein the curved portion has a radius of curvature of from 10,000 mm to 55,000 mm both inclusive.

Preferably, a line parallel to a tangent to the light exit plane at ends of the light exit plane adjacent respectively to the two light entrance planes form an angle of from 0.1° to 2.2° both inclusive with the two inclined planes.

Preferably, an angle formed by a tangent to the curved portion at a joint between each of the two inclined planes and the curved portion and a tangent to the light exit plane at an intersection where the light exit plane meets a straight line passing through the joint and parallel to the light entrance plane is equal to an angle formed by a line parallel to a tangent to the light exit plane at the ends of the light exit plane adjacent respectively to the two light entrance planes and the two inclined planes.

Preferably, the securing means integrates the two light sources and the light guide plate so as to be slidable with respect to the housing in a direction perpendicular to a direction from the two light entrance planes of the light guide plate toward the light sources as the light exit plane expands or contracts.

Preferably, the sliding mechanism is essentially composed of sliding members for nipping and holding the securing means by a stress generated by screwing the housing, and supposing that a frictional force T(x) generated between the sliding member and the securing means in a position spaced by a distance x from a position of screwing is represented by a following expression:

$$T(x) = \mu \cdot G(x)$$

where G(x) is a stress distribution resulting from the screwing in a position spaced by a distance x from the position of screwing, and supposing that a pushing force F generated by expansion/contraction of the light guide plate is represented by a following expression:

$$F = Y \cdot A\text{ave} \cdot (\Delta L/L)$$

where Y is Young's modulus of the light guide plate, Aave is an average sectional area of the light guide plate, L is a length of the light guide plate, and ΔL is a length of expansion/contraction of the light guide plate, then the sliding members are disposed in a position x from a position of screwing of the housing that satisfies a following expression:

$$T(x) = \mu \cdot G(x) < F = Y \cdot A\text{ave} \cdot (\Delta L/L)$$

Preferably, the light guide plate has a linear expansion coefficient satisfying $1/1000 < \Delta L/L < 5/1000$ and a Young's modulus of $1.5 MN/m2 < Y < 3 MN/m2$.

It is preferred that the planar lighting device further comprise guide means provided between the housing and one of the two light sources to allow the one of the two light sources to slide with respect to the housing in a direction from one of the two light entrance plane toward the one of the two light source as the light guide plate expands or contracts with a distance in a direction perpendicular to the light exit plane between the light exit plane and one of the two light sources and the housing kept constant.

Preferably, the one of the two light sources is disposed in a lower position in vertical direction with respect to another one of the two light sources.

Preferably, the securing means is essentially composed of projections secured to the light source, reinforcing members in a form of plate members secured to at least one of the surfaces of the light exit plane and the inclined plane of the light guide plate and engaging with the projections to engage the light guide plate with the projections.

Preferably, the securing means comprises a securing member for covering planes of the light source except for the light emission plane and supporting the light source, and wherein the guide means supports the securing member so as to be movable with respect to the housing in a direction from the light exit plane of the light guide plate toward the light source.

Preferably, the guide means is provided by two guide members disposed respectively on both-end faces perpendicular to a longitudinal direction of the light source.

Preferably, all members existent between the light sources and the housing are in contact with each other via a radiating grease.

Preferably, the rectangular light exit plane of the light guide plate has an inwardly curved surface.

Preferably, the light guide plate contains an optical member in form of a film in a recess provided in a surface of the light exit plane.

Preferably, the an optical reflection plane opposite the light exit plane of the light guide plate is formed by a curved plane curved toward a side of the light guide plate opposite from the light exit plane.

It is preferable that, in the light guide plate, a light guiding length between the two light entrance planes ranges from 300 mm to 320 mm both inclusive, a particle diameter of the scattering particles ranges from 4.0 μm to 12.0 μm both inclusive, a particle density of the scattering particles ranges from 0.1 wt % to 0.76 wt % both inclusive, and the particle diameter and the particle density of the scattering particles are within an area determined by six points (4.0,0.1), (4.0,0.32), (7.0, 0.14), (7.0,0.5), (12.0,0.25), and (12.0,0.76) in a graph where a horizontal axis indicates the particle diameter [μm] of the scattering particles and a vertical axis indicates the particle density [wt %] of the scattering particles.

It is preferable that, in the light guide plate, a light guiding length between the two light entrance planes ranges from 480 mm to 500 mm both inclusive, a particle diameter of the scattering particles ranges from 4.0 μm to 12.0 μm both inclusive, a particle density of the scattering particles ranges from 0.02 wt % to 0.22 wt % both inclusive, and the particle diameter and the particle density of the scattering particles are within an area determined by six points (4.0,0.02), (4.0,0.085), (7.0,0.03), (7.0,0.12), (12.0,0.06), and (12.0,0.22) in a graph where a horizontal axis indicates the particle diameter [μm] of the scattering particles and a vertical axis indicates the particle density [wt %] of the scattering particles.

It is preferable that, in the light guide plate, a light guiding length between the two light entrance planes ranges from 515 mm to 620 mm both inclusive, a particle diameter of the scattering particles ranges from 4.0 μm to 12.0 μm both inclusive, a particle density of the scattering particles ranges from 0.015 wt % to 0.16 wt % both inclusive, and the particle diameter and the particle density of the scattering particles are within an area determined by six points (4.0,0.015), (4.0, 0.065), (7.0,0.02), (7.0,0.09), (12.0,0.035), and (12.0,0.16) in a graph where a horizontal axis indicates the particle diameter [μm] of the scattering particles and a vertical axis indicates the particle density [wt %] of the scattering particles.

It is preferable that, in the light guide plate, a light guiding length between the two light entrance planes ranges from 625 mm to 770 mm both inclusive, a particle diameter of the scattering particles ranges from 4.0 μm to 12.0 μm both inclusive, a particle density of the scattering particles ranges from 0.01 wt % to 0.12 wt % both inclusive, and the particle diameter and the particle density of the scattering particles are within an area determined by six points (4.0,0.01), (4.0,0.05), (7.0,0.01), (7.0,0.06), (12.0,0.02), and (12.0,0.12) in a graph where a horizontal axis indicates the particle diameter [μm] of the scattering particles and a vertical axis indicates the particle density [wt %] of the scattering particles.

It is preferable that, in the light guide plate, a light guiding length between the two light entrance planes ranges from 785 mm to 830 mm both inclusive, a particle diameter of the scattering particles ranges from 4.0 μm to 12.0 μm both inclusive, a particle density of the scattering particles ranges from 0.008 wt % to 0.08 wt % both inclusive, and the particle diameter and the particle density of the scattering particles are within an area determined by six points (4.0,0.008), (4.0, 0.03), (7.0,0.009), (7,0,0.04), (12.0,0.02), and (12.0,0.08) in a graph where a horizontal axis indicates the particle diameter [μm] of the scattering particles and a vertical axis indicates the particle density [wt %] of the scattering particles.

It is preferable that, in the light guide plate, a light use efficiency indicating a ratio of light emitted through the light exit plane to light admitted through the two light entrance planes is 55% or greater, and a middle-high ratio represented by a brightness distribution at the light exit plane indicating a ratio of brightness of light emitted from an area about a center of the light exit plane to the brightness of light emitted at areas of the light exit plane close to the light entrance planes is above 0% and not greater than 25%.

The present invention provides a planar lighting device that has a thin configuration, yields a high light use efficiency, emits light with minimized unevenness in brightness, and achieve a brightness distribution representing a high-in-the-middle curve or a bell curve, whereby an area close to the center of the screen is brighter than the periphery thereof as required of thin, large-screen liquid crystal televisions.

BRIEF DESCRIPTION OF THE DRAWINGS

These and other objects, features, and advantages of the present invention will be apparent from the following detailed description and accompanying drawings in which:

FIG. 22A is a schematic front view illustrating another example of the guide member; FIG. 22B is a side view of the guide member illustrated in FIG. 22A.

FIG. 23A is a schematic front view illustrating another example of the guide member; FIG. 23B is a side view of the guide member illustrated in FIG. 23A.

DETAILED DESCRIPTION OF THE INVENTION

The planar lighting device of the invention will be described in detail below referring to an embodiment illustrated in the accompanying drawings.

While planar lighting devices described below by way of representative examples are a two-light entrance plane type whereby light is admitted through two sides of the light guide plate, these examples are not limitative of the scope of the present invention.

Figure 1:
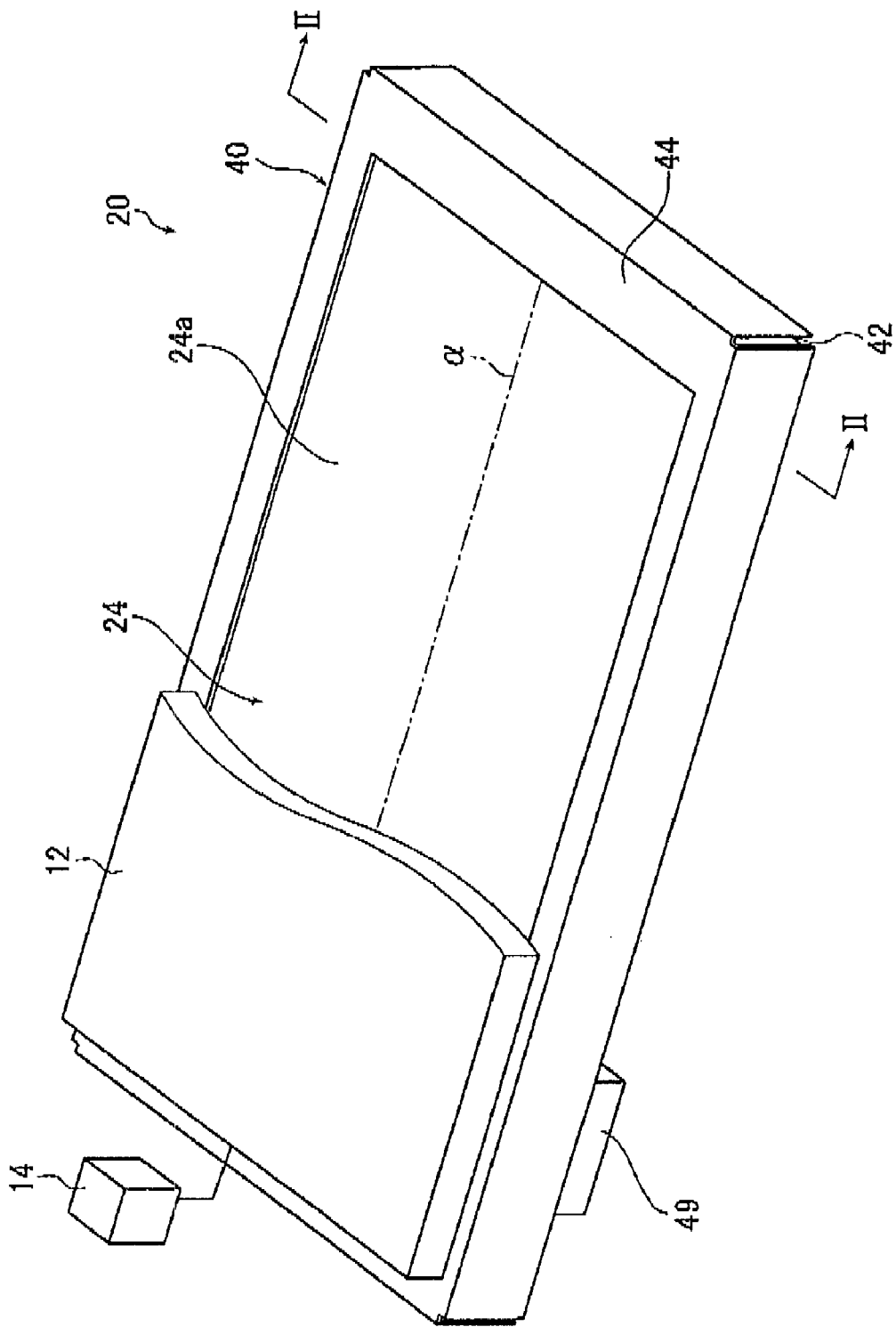
FIG. 1 is a schematic perspective view illustrating an embodiment of a liquid crystal display device using the planar lighting device of the invention.
Figure 2:
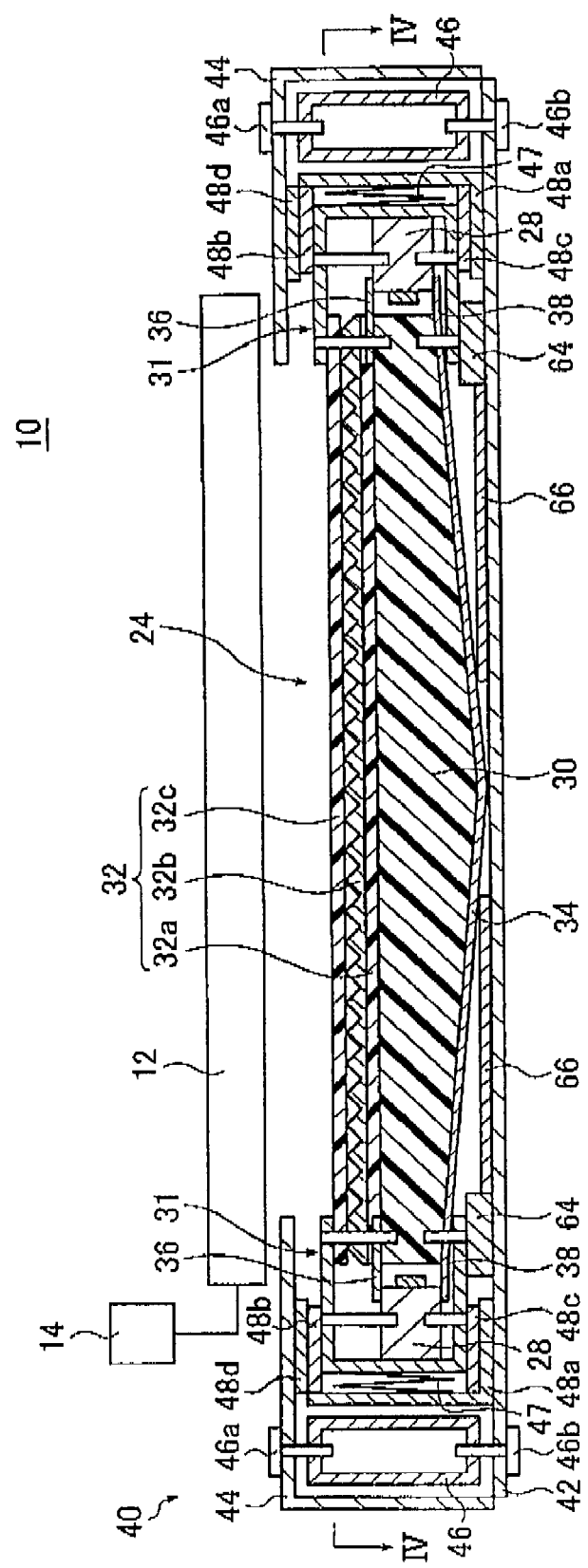
FIG. 2 is a cross sectional view of the liquid crystal display device illustrated in FIG. 1 taken along line II-II.
Figure 3:
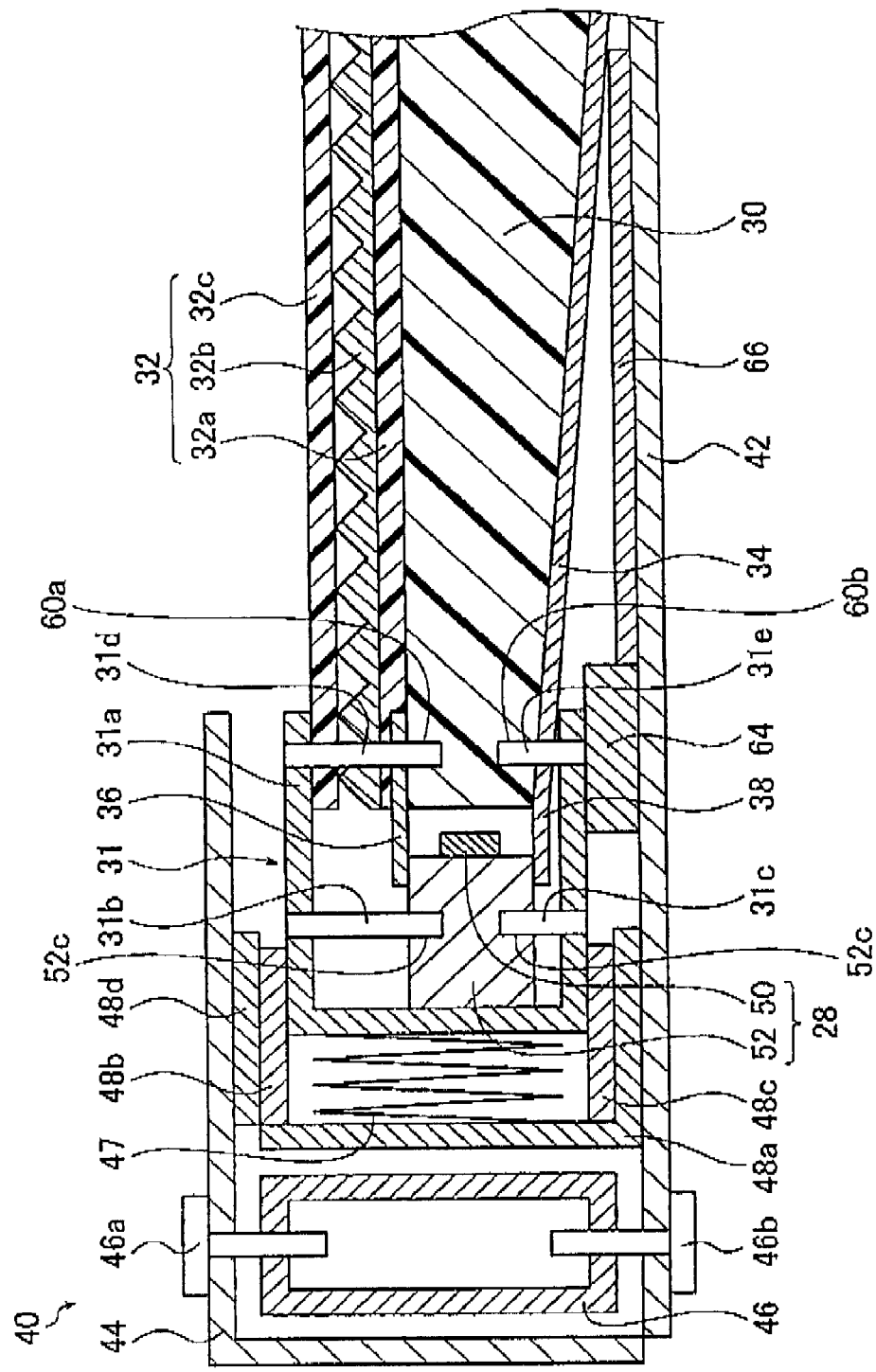
FIG. 3 illustrates enlarged a light source and part of the light guide plate, close to its light entrance plane, of the planar lighting device of the liquid crystal display device of FIG. 2.
Figure 4A:
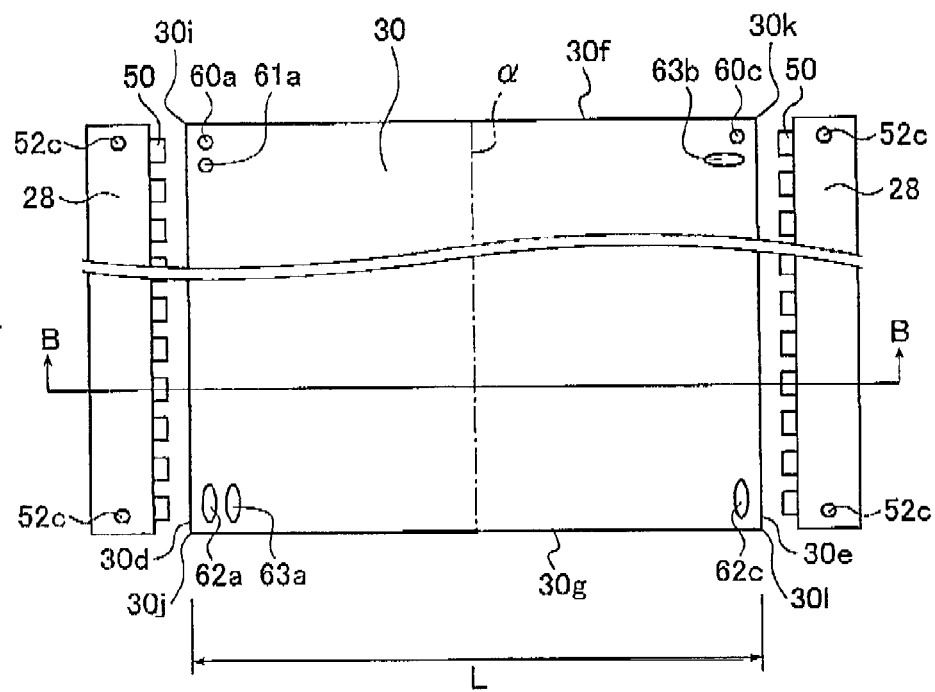
FIG. 4A is a top plan view illustrating the light sources and the light guide plate, partially omitted, of the planar lighting device of FIG. 2.
Figure 4B:
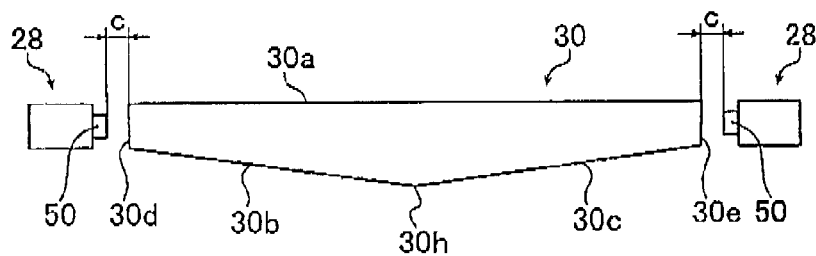
FIG. 4B is a cross sectional view of FIG. 4A taken along line B-B.

FIG. 1 is a schematic perspective view illustrating a liquid crystal display device provided with the planar lighting device of the invention; FIG. 2 is a cross sectional view of the liquid crystal display device illustrated in FIG. 1 taken along line II-II. FIG. 3 is a view of the planar lighting device (also referred to as "backlight unit" below) of FIG. 2, where a portion near a light source is illustrated enlarged. FIG. 4A is a top plan view illustrating, partially omitted, the light guide plate of the planar lighting device of FIG. 2 together with light sources disposed on two sides of the light guide plate; FIG. 4B is a cross sectional view of FIG. 4A taken along line B-B.

As illustrated in FIG. 1, a liquid crystal display device 10 comprises a backlight unit 20, a liquid crystal display panel 12 disposed on the side of the backlight unit closer to the light exit plane, and a drive unit 14 for driving the liquid crystal display panel 12. In FIG. 1, part of the liquid crystal display panel 12 is not shown to better illustrate the configuration of the planar lighting device.

In the liquid crystal display panel 12, electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 applies a voltage to transparent electrodes in the liquid crystal display panel 12 to change the orientation of the liquid crystal molecules, thereby controlling the transmittance of the light transmitted through the liquid crystal display panel 12.

The backlight unit 20 is a lighting device for illuminating the whole surface of the liquid crystal display panel 12 from behind the liquid crystal display panel 12 and comprises a light exit plane 24a having substantially a same shape as an image display surface of the liquid crystal display panel 12.

As illustrated in FIGS. 1, 2, 3, and 4A and 4B, the backlight unit 20 of the present invention comprises the main body of the lighting device 24 and a housing 40. The main body of the lighting device 24 includes two light sources 28, a light guide plate 30, securing means (or fixing means) 31, an optical member unit 32, and a reflection plate 34. The housing 40 includes a lower housing 42, an upper housing 44, a reinforcing member 46, and a sliding mechanism 48. In the illustrated example, heat sinks 64 and heat pipes 66 are provided between the reflection plate 34 and the lower housing 42.

As illustrated in FIG. 1, a power unit casing 49 is provided on the underside of the lower housing 42 of the housing 40 (see FIG. 2) to hold power supply units that supply the light sources 28 with electrical power.

Now, component parts constituting the backlight unit 20 will be described.

The main body of the lighting device 24 includes the light sources 28 for emitting light, a light guide plate 30 for emitting the light emitted by the light sources 28 to produce planar light, securing means (or fastening means) 31 for fastening the light guide plate 30 and the light sources 28 with the distances between them kept constant in the optical axis direction and in the direction perpendicular to the optical axis, an optical member unit 32 for scattering and diffusing the light emitted from the light guide plate 30 to obtain light with further reduced unevenness, and a reflection plate 34 for reflecting light leaked from the light guide plate 30 to admit the light back into the light guide plate 30.

The distance between the light guide plate 30 and the light sources 28 in the optical axis direction herein is the distance c as indicated in FIG. 4B between the light emission plane of the light source 28 and the light entrance plane (30d or 30e) of the light guide plate 30. The distance between the light guide plate 30 and the light sources 28 in the direction perpendicular to the optical axis is a distance between the respective optical axes of the light guide plate 30 and the light source 28 in the direction of thickness of the light guide plate.

First, the light sources 28 will be described.

Figure 5A:
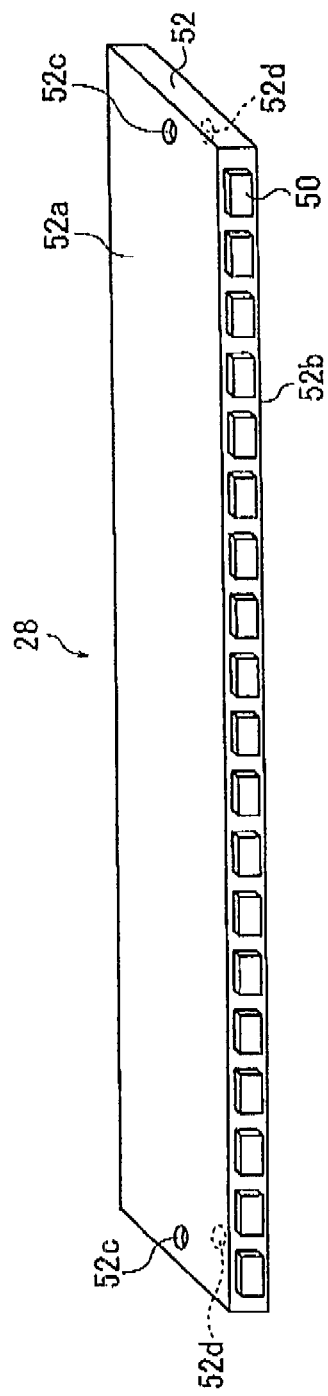
FIG. 5A is a perspective view illustrating a schematic configuration of the light source of the planar lighting device of FIG. 2.
Figure 5C:
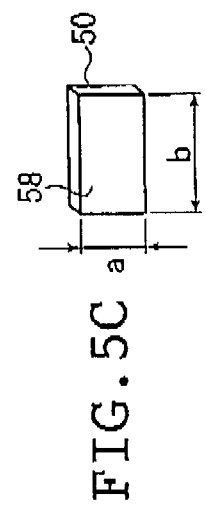
FIG. 5C is a schematic perspective view illustrating, enlarged, one of the LEDs forming the light source of FIG. 5A.
Figure 5B:
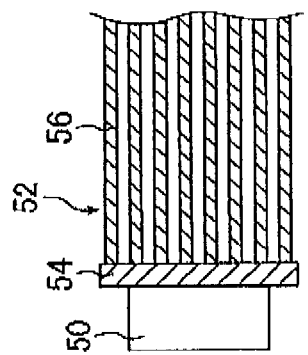
FIG. 5B is a sectional view of the light source of FIG. 5A.

FIG. 5A is a perspective view schematically illustrating a configuration of the light sources 28 of the planar lighting device 20 of FIGS. 1 and 2; FIG. 5B is a cross sectional view of the light source 28 illustrated in FIG. 5A; and FIG. 5C is a schematic perspective view illustrating, as enlarged, only one of the LEDs 50 forming the light source 28 of FIG. 5A.

As illustrated in FIG. 5A, the light source 28 comprises LED chips 50 and a light source support 52.

The LED chip 50 is a chip of a light emitting diode emitting blue Light the surface of which has a fluorescent substance applied thereon. It has a light emission face 58 with a given area through which white light is emitted.

Specifically, when blue light emitted through the surface of light emitting diode of the LED chip 50 is transmitted through the fluorescent substance, the fluorescent substance generates fluorescence. Thus, when blue light emitted by the LED chip 50 is transmitted through the fluorescent substance, the blue light emitted by the light emitting diode and the light radiated as the fluorescent substance generates fluorescence blend to produce and emit white light.

The LED chip 50 may for example be formed by applying a YAG (yttrium-aluminum garnet) base fluorescent substance to the surface of a GaN base light emitting diode, an InGaN base light emitting diode, etc.

As illustrated in FIG. 5B, the light source support 52 comprises an array base 54 and fins 56. The LED chips 50 described above are arranged in a single row on the array base 54 at given intervals. Specifically, the LED chips 50 constituting the light source 28 are arrayed along the length of a first light entrance plane 30d or a second light entrance plane 30e of the light guide plate 30 to be described, that is, parallel to a line in which the first light entrance plane 30d or the second light entrance plane 30e meets a light exit plane 30a and secured to the array base 54.

The array base 54 is a plate member disposed such that one surface thereof faces the light entrance plane 30d or 30e, which is a lateral end face of the light guide plate 30 at which the light guide plate 30 is thinnest. The LED chips 50 are carried on that lateral plane of the array base 54 facing the light entrance plane (30d or 30e) of the light guide plate 30.

The array base 54 according to the embodiment under discussion is formed of a metal having a good heat conductance as exemplified by copper and aluminum. The array base 54 also acts as a heat sink to absorb heat generated by the LED chips 50 and releases the heat to the outside.

The fins 56 are plate members each formed of a metal having a good heat conductance as exemplified by copper and aluminum. The fins 56 are connected to the array base 54 on the side thereof opposite from the LED chips 50 and spaced a given distance from neighboring fins 56.

A plurality of fins 56 provided in the light source support 52 ensure a large surface area and a high heat dissipation efficiency, increasing the efficiency with which the LED chips 50 are cooled.

While the embodiment under discussion uses the array base 54 of the light source support 52 as heat sink, a plate member without a heat-releasing function may be used to form the array base in place of the array base having a function of a heat sink, where the LED chips need not be cooled.

As illustrated in FIG. 5A, screw holes 52c are made in two places adjacent both ends of a top surface 52a of the light source support 52 (specifically, a top fin 56). Similarly, screw holes 52d are made in positions corresponding to the screw holes 52c in a bottom surface 52b of the light source support 52 (specifically, a bottom fin 56). As will be described, the screw holes 52c and 52d are used for securing or fixing the light source 28 to the securing means 31 with screws 31b and 31c as illustrated in FIG. 3.

As illustrated in FIG. 5C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 30 to be described, i.e., the direction perpendicular to the light exit plane 30a, are the shorter sides. Expressed otherwise, the LED chips 50 each have a shape defined by b>a where "a" denotes the length of the sides perpendicular to the light exit plane 30a of the light guide plate 30 and "b" denotes the length of the sides in the array direction. Now, let "q" be the distance by which the arrayed LED chips 50 are spaced apart from each other, then q>b hold. Thus, the length "a" of the sides of the LED chips 50 perpendicular to the light exit plane 30a of the light guide plate 30, the length "b" of the sides in the array direction, and the distance "q" by which the arrayed LED chips 50 are spaced apart from each other preferably have a relationship satisfying q>b>a.

Providing the LED chips 50 each having the shape of a rectangle allows a thinner design of the light source to be achieved while producing a large amount of light. A thinner light source, in turn, enables a thinner design of the planar lighting device to be achieved. Further, the number of LED chips that need to be arranged may be reduced.

While the LED chips 50 each preferably have a rectangular shape with the shorter sides lying in the direction of the thickness of the light guide plate 30 for a thinner design of the light source, the present invention is not limited thereto, allowing the LED chips to have any shape as appropriate such as a square, a circle, a polygon, and an ellipse.

While the LED chips 50, arranged in a single row, has a mono-layered structure in the embodiment under discussion, the present invention is not limited thereto: one may use multilayered LED arrays for the light source comprising LED arrays each carrying LED chips 50 on the array base 54. Where the LEDs are thus stacked, more LED arrays can be stacked when the LED chips 50 are each adapted to have a rectangular shape and the LED arrays are each adapted to have a reduced thickness. Where the LED arrays are stacked to form a multilayer structure, that is to say, where more LED arrays (LED chips) are packed into a given space, a large amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

Now, the light guide plate 30 will be described.

Figure 6:
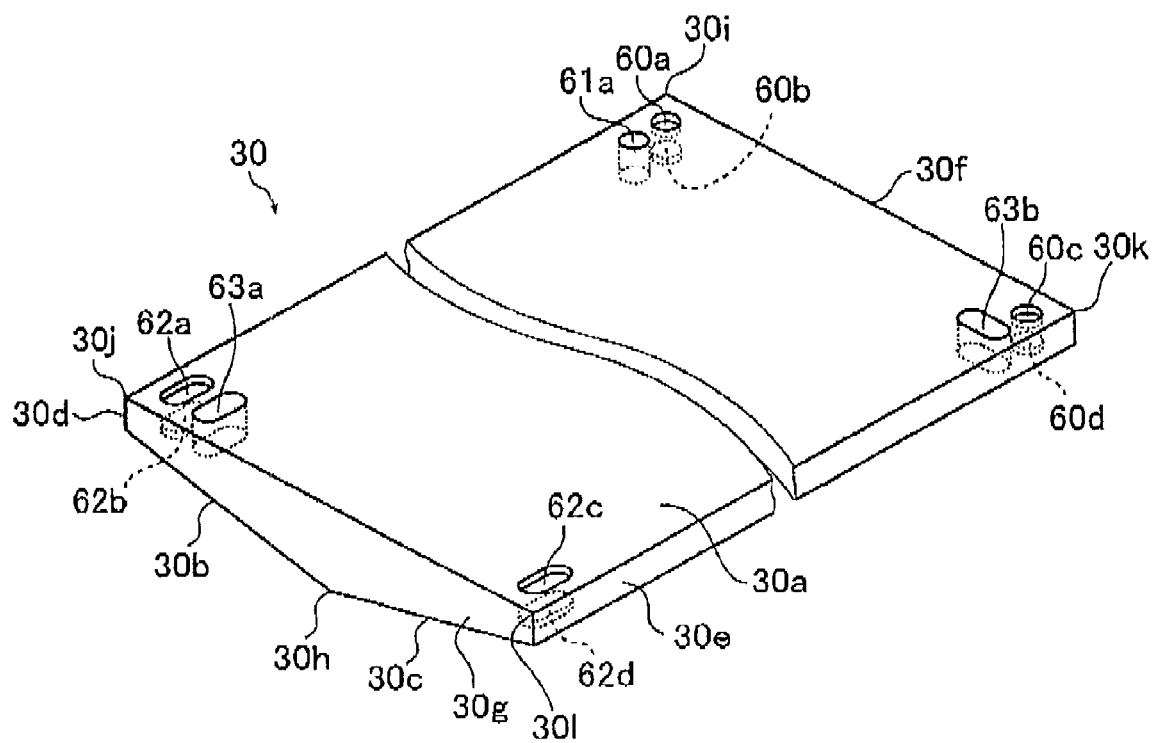
FIG. 6 is a perspective view illustrating the shape of the light guide plate of FIG. 4.
Figure 7A:
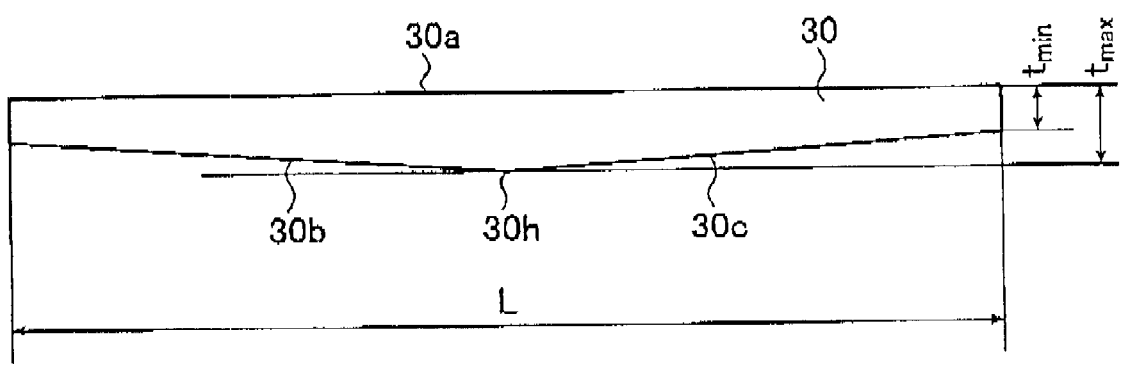
FIG. 7A is a schematic sectional view of the light guide plate of FIG. 2.
Figure 7B:
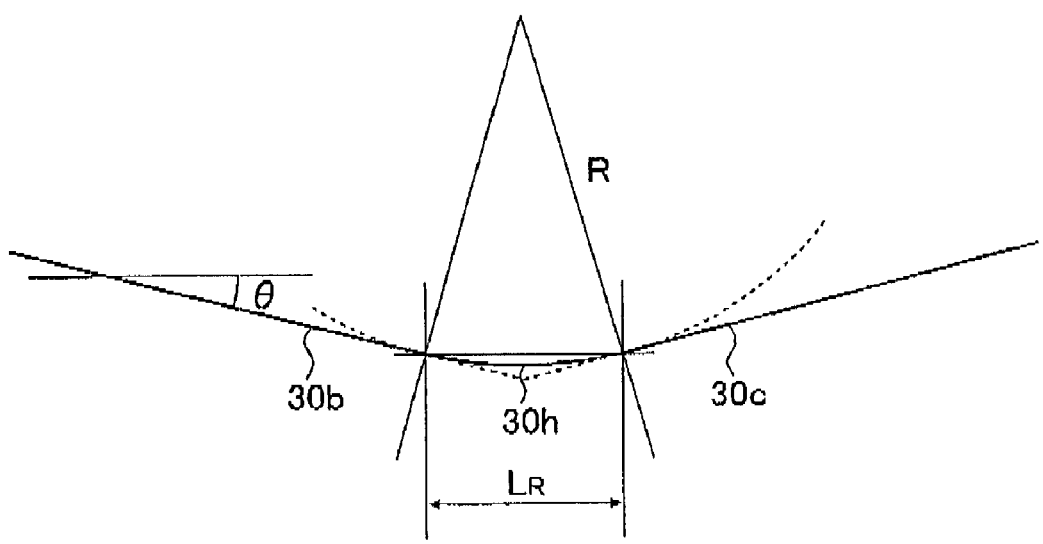
FIG. 7B is a sectional view illustrating, enlarged, part of the light guide plate of FIG. 7A.

FIG. 6 is a perspective view schematically illustrating the configuration of the light guide plate 30. FIG. 7A is a sectional view of the light guide plate 30; FIG. 7B is a sectional view illustrating part of the light guide plate 30 of FIG. 7A enlarged.

As illustrated in FIGS. 6 and 7, the light guide plate 30 comprises the light exit plane 30a, which is flat and substantially rectangular; two light entrance planes, the first light entrance plane 30d and the second light entrance plane 30e, formed on both sides of the light exit plane 30a and substantially perpendicular to the light exit plane 30a; two inclined planes, a first inclined plane 30b and a second inclined plane 30c, located on the opposite side from the light exit plane 30a, i.e., on the underside of the light guide plate so as to be symmetrical to each other with respect to a central axis, or the bisector α bisecting the light exit plane 30a (see FIGS. 1 and 4) in a direction parallel to the first light entrance plane 30d and the second light entrance plane 30e, and inclined a given angle with respect to the light exit plane 30a; and two lateral planes, a first lateral plane 30f and a second lateral plane 30g, formed substantially vertical to the light exit plane 30a on the sides of the light exit plane 30a on which the light entrance planes are not formed, i.e., on the two sides perpendicular to the sides where the light exit plane 30a and the light entrance planes meet. A curved portion 30h having a radius of curvature R is formed at a joint between two inclined planes, the first inclined plane 30b and the second inclined plane 30c (see FIG. 7B) to prevent occurrence of uneven brightness such as bright lines.

As illustrated in FIG. 6, a first circular hole 60a and a second circular hole 60c for securing the light guide plate 30 to the securing member 31a are made in the light exit plane 30a close to and inwardly of a corner 30i where the first light entrance plane 30d intersects the first lateral plane 30f and a corner 30k where the second light entrance plane 30e intersects the first lateral plane 30f, respectively. A first circular hole 60b and a second circular hole 60d are made in the rear plane of the light guide plate 30 in positions corresponding to the first circular hole 60a and the second circular hole 60c, respectively.

A first long hole 62a and a second long hole 62c long in a direction parallel to the light entrance planes 30d and 30e for securing the light guide plate 30 to the securing member 31a are made in the light exit plane 30a close to and inwardly of a corner 30j where the first light entrance plane 30d intersects the second lateral plane 30g, and a corner 30l where the second light entrance plane 30e intersects the second lateral plane 30f. A first long hole 62b and a second long hole 62d are made in the rear plane of the light guide plate 30 in positions corresponding to the first long hole 62a and the second long hole 62c, respectively.

A third circular hole 61a for connecting the light guide plate 30 to the upper housing 44 and the lower housing 42 of the housing 40 is made close to and inwardly of the corner 30i in which the first circular hole 60a is made.

Close to and inwardly of the corners 30i and 30k in which the first long hole 62a and the second circular hole 60c are made, a third long hole 63a and a fourth long hole 63b for connecting the light guide plate 30 to the upper housing 44 and the lower housing 42 of the housing 40 are made adjacent the first long hole 62a and the second circular hole 60c. The third long hole 63a and the fourth long hole 63b are long in a direction parallel to the light entrance plane 30e and in a direction perpendicular to the light entrance plane 30e, respectively.

The two light entrance planes 30d and 30e are located opposite each other adjacent the opposite longer sides of the substantially rectangular light exit plane 30a, respectively. The light emitted from the opposite light sources and admitted through the two light entrance planes 30d and 30e travels inside the light guide plate 30 parallel to the opposite shorter sides of the substantially rectangular light exit plane 30a.

The first inclined plane 30b and the second inclined plane 30c are axisymmetrical with respect to the bisector α and symmetrically inclined with respect to the light exit plane 30a. The curved portion 30h is also axisymmetrically curved with respect to the bisector α. The light guide plate 30 grows thicker with the increasing distance from the first light entrance plane 30d and the second light entrance plane 30e toward the center such that the light guide plate 30 is thickest ($t_{max}$) in a position thereof corresponding to the central bisector X, i.e., in the middle of the curved portion 30h and thinnest ($t_{min}$) at the two light entrance planes (the first light entrance plane 30d and the second light entrance plane 30e) on both-ends.

Thus, the light guide plate has a cross section axisymmetrical with respect to the central axis passing through the bisector α thereof.

In the present invention, a light guiding length L that the light travels between the first light entrance plane 30d and the second light entrance plane 30e needs to be 480 mm or greater since the liquid crystal display panel 4 for which the inventive light guide plate is intended has a screen size of 37 inches at minimum and needs to be 830 mm or less since the liquid crystal display panel 4 for which the inventive light guide plate is intended has a screen size of 65 inches at maximum. More specifically, it is preferable that the light guiding length L measures 480 mm to 500 mm both inclusive for a screen size of 37 inches, 515 mm to 620 mm both inclusive for screen sizes of 42 inches and 46 inches, 625 mm to 770 mm both inclusive for screen sizes of 52 inches and 57 inches, and 785 mm to 830 mm both inclusive for a screen size of 65 inches.

The minimum thickness $t_{min}$ of the light guide plate 30 at the light entrance planes 30d and 30e, where the light guide plate is thinnest, is preferably 0.5 mm to 3.0 mm both inclusive.

This is because if the minimum thickness is excessively small, the light entrance planes 30d and 30e are excessively small, and the amount of light admitted from the light sources 12 decreases, making the brightness of the light emitted through the light exit plane 30a insufficient, whereas if the minimum thickness is excessively great, the maximum thickness is excessively great, and the weight increases excessively, making the light guide plate unsuitable as an optical member of the liquid crystal display device and the like while failing to yield a light use efficiency of 55% or greater as the light is allowed to pass through the light guide plate.

The maximum thickness $t_{max}$ of the light guide plate 30 at the curved portion, where the light guide plate is thickest, is preferably 1.0 mm to 6.0 mm both inclusive.

This is because if the maximum thickness is excessively great, the weight increases excessively, making the light guide plate unsuitable as an optical member of the liquid crystal display device and the like while failing to yield a light use efficiency of 55% or greater as the light is allowed to pass through the light guide plate, whereas if the maximum thickness is excessively small, the curved portion 30h at the center has such a great radius of curvature R that it is unsuitable for molding and, as in the case of the flat light guide plate, a light use efficiency of 55% or greater is impossible to achieve at a particle density that permits a high-in-the-middle brightness distribution while, conversely, a high-in-the-middle distribution is impossible to achieve at a particle density that yields a light use efficiency of 55% or greater.

Accordingly, the inclination angle or the taper angle of the inclined rear planes 30b and 30c is preferably 0.1° to 0.8° both inclusive.

This is because if the taper angle is excessively great, the maximum thickness is greater than is necessary and the brightness exhibits an overly accentuated high-in-the-middle distribution curve, whereas if the taper angle is excessively small, as in the cases where the minimum thickness is excessively small, the radius R of the curved portion 30h (also referred to as "radius R of the central portion" below) is so great that it is unsuitable for molding and, as in the case of the flat light guide plate, a high-in-the-middle distribution is impossible to achieve at a particle density that yields a light use efficiency of 55% or greater while, conversely, a light use efficiency of 55% or greater is impossible to achieve at a particle density that permits a high-in-the-middle brightness distribution.

Thus, the radius of curvature R of the curved portion 30h is preferably 6,000 mm to 45,000 m both inclusive.

Now, let θ be the taper angle of the inclined rear planes 30b and 30c as illustrated in FIGS. 7A and 7B. Then $L_R=2R \sin θ$, $t_{max}$ (the maximum thickness)$=t_{min}-[(L_R/2)\tan θ+R \cos-R]$, and θ (taper angle)$=\tan^{-1}[(t_{max}-t_{min})/(L/2)]$ hold.

In the present invention, the light guide plate 30, shaped such that its thickness increases with the increasing distance from the first light entrance plane 30d and the second light entrance plane 30e toward the center thereof (the shape being referred to as "reversed wedge shape" below), makes it easier for the incoming light to travel still deeper into the light guide plate, thus improving the in-plane uniformity while maintaining the light use efficiency and further achieving a high-in-the-middle, bell-curve brightness distribution. In other words, such a shape achieves an even or a high-in-the-middle, bell-curve distribution where the conventional, flat light guide plate could only provide a distribution that is dark in the middle.

Further, a smooth joint achieved by providing the curved portion 30h between the inclined rear planes 30b and 30c eliminates a brightness line that would otherwise show along the central joint and enables an even or a high-in-the-middle, bell-curve distribution to be achieved.

Now, an example will be given below to show how light use efficiency and in-plane uniformity vary as the taper angle of a light guide plate having the shape of a reversed wedge is changed.

Table 1 shows light use efficiency and in-plane uniformity obtained by simulation with the light guide plate illustrated in FIG. 7, wherein the maximum thickness $t_{max}$ was changed, with the minimum thickness $t_{min}$ and the length of the light guide plate L kept the same, to change the taper angle θ of the inclined planes. The in-plane uniformity [%] is the ratio of a minimum brightness to a maximum brightness expressed as minimum brightness/maximum brightness.

TABLE 1

| | Tmin [mm] | Tmax [mm] | L [mm] | Taper angle | Light use efficiency | In-plane uniformity |
|---|---|---|---|---|---|---|
| Flat plate | 2 | 2 | 300 | NA | 74% | 67% |
| TP1 | 2 | 3 | 300 | 0.38° | 77% | 82% |
| TP2 | 2 | 4 | 300 | 0.76° | 77% | 85% |
| TP3 | 2 | 6 | 300 | 1.15° | 78% | 69% |

Figure 8:
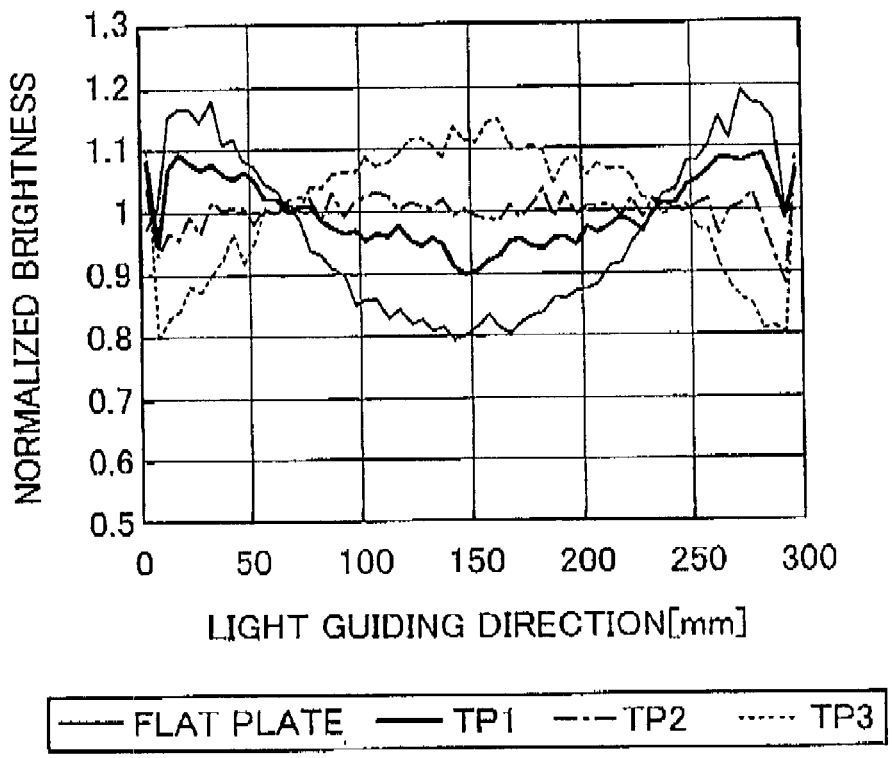
FIG. 8 is a graph illustrating relationships between brightness distribution and taper angle of the light guide plate obtained by simulation under conditions given in Table 1.

Further, FIG. 8 illustrates relationships between brightness distribution and taper angle obtained by simulation with the light guide plate described in Table 1. FIG. 8 indicates a normalized brightness on the vertical axis and the distance [mm] from one end of the light guide plate on the horizontal axis. The normalized brightness denotes a normalized value with the average brightness of TP2, one of the calculation examples, taken to be 1.

Table 1 and FIG. 8 show that the in-plane uniformity can be improved while maintaining the light use efficiency by adapting the light guide plate to have the shape of a reversed wedge.

Further, Table 2 shows light use efficiency and middle-high ratio of a light guide plate having the shape of a reversed wedge obtained by simulation as the taper angle θ of the light guide plate was changed.

Using the light guide plate 30 illustrated in FIGS. 4A and 4B, the light use efficiency and the brightness distribution of the light emitted through the light exit plane 30a was obtained with the taper angle [°] varied by changing the maximum thickness [mm] and the minimum thickness [mm] of the 22-inch light guide plate 30 to determine the middle-high ratio [%] of the brightness distribution, which represents a ratio of the brightness of the light emitted through a central area of the light exit plane 30a to the brightness of the light emitted through a periphery of the light exit plane 30a, i.e. areas close to the light entrance planes 30d and 30e. All the parameters but the taper angle [°] meet their respective preferred ranges as required according to the invention.

TABLE 2

|  | 1 | 2 | 3 |
| --- | --- | --- | --- |
| Screen size | 22" | 22" | 22" |
| Light guiding length [mm] | 288 | 288 | 288 |
| Maximum thickness [mm] | 3.57 | 0.89 | 4.91 |
| Minimum thickness [mm] | 2 | 0.5 | 0.5 |
| Particle diameter [μm] | 7 | 7 | 7 |
| Particle density [wt %] | 0.18 | 0.2 | 0.2 |
| Taper angle[°] | 0.80 | 0.20 | 2.19 |
| R of central portion [mm] | 4500 | 18000 | 1500 |
| Light use efficiency [%] | 56.8 | 58.6 | 62.2 |
| Middle-high ratio [%] | 14 | 13 | 22 |

It is apparent from Table 2 that when the taper angle [°] is in a range of 0.1° to 2.2° both inclusive, the light use efficiency [%] is over 56%, which meets a limited range according to the invention by being higher than 55%, while the middle-high ratio [%] is 13% to 22%, which also meets a limited range of above 0% and not greater than 25% according to the invention.

In the light guide plate 30 illustrated in FIGS. 4A and 4B, light entering the light guide plate 30 through the first light entrance plane 30d and the second light entrance plane 30e is scattered as it travels through the inside of the light guide plate 30 by scattering particles contained inside the light guide plate 30 as will be described later in detail and, directly or after being reflected by the first inclined plane 30b or the second inclined plane 30c, exits through the light exit plane 30a. In the process, some light may leak through the first inclined plane 30b and the second inclined plane 30c. However, it is then reflected by the reflection sheet (not shown) provided in such a manner as to cover the first inclined plane 30b and the second inclined plane 30c to enter the light guide plate 30 again.

The light guide plate 30 is formed of a transparent resin into which fine scattering particles for scattering light are kneaded and dispersed. Transparent resin materials that may be used to form the light guide plate 30 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 30 may be formed, for example, of TOSPEARL (trademark), silicone, silica, zirconia, or a derivative polymer. The light guide plate 30 containing the scattering particles is capable of emitting uniform illuminating light through the light exit plane with minimized unevenness in brightness.

The particle diameter of the scattering particles dispersed in the inventive light guide plate 30 needs to be 4.0 μm to 12.0 μm both inclusive because the scattering particles of a size selected within that range achieve a high scattering efficiency, has a great forward scattering property and a small wavelength dependency, and do not cause uneven color representation.

A suitable particle diameter for the scattering particles to be dispersed in the inventive light guide plate 30 is preferably determined considering the following in addition to the degree of wavelength dependency.

First of all, in a scattered light intensity distribution (angular distribution) of particles having a single particle diameter, a condition needs to be met that at least 90% of light is scattered within a forward angle of 0° to 5° because the inventive light guide plate 30 is required to guide light a distance of at least 140 mm from the first light entrance plane 30d and the second light entrance plane 30e when the light guide plate has a reversed wedge shape and at least 280 mm from the light entrance plane when light is admitted through one side of the light guide plate. If the light scattered within the forward angle of 0° to 5° fails to reach 90%, light cannot be guided deep enough into the light guide plate 30.

Thus, scattering particles having a particle diameter of less than 4.0 μm cause isotropic scattering and fail to meet the above condition. When an acrylic resin is used to provide a matrix and silicone resin is used to form particles, the particle diameter of the silicone resin scattering particles is preferably 4.5 μm or greater.

When the particle diameter of the scattering particles is greater than 12.0 μm, the forward scattering property of the particles intensifies so much that the mean free path within the system increases to reduce the number of scatterings, thus causing uneven brightness among the light source LEDs to show near the edges of the light exit plane near which light is admitted. Thus, the upper limit is set to 12.0 μm.

This is because when the particle density is excessively high, like phenomena result as in the case of the flat light guide plate and a high-in-the-middle brightness distribution cannot be achieved whereas when the particle density is excessively low, light is allowed to pass through, thus failing to meet a light use efficiency of 55% or greater.

Thus, selection of an optimum particle diameter of the scattering particles within a particle range determined as mentioned above (combination of particle refractive index and matrix refractive index) enables emission of light free from uneven wavelengths.

While the above examples use scattering particles all having a single particle diameter, the present invention is not limited in this way and allows a mixed use of scattering particles having a plurality of particle diameters.

Further, the density of the scattering particles needs to be 0.008 wt % to 0.76 wt % both inclusive because the light guide plate 30 of the invention has a light guiding length of 280 mm to 830 mm.

To be more specific, when the light guiding length is in a range of 280 mm$\leq$L$\leq$320 mm, the particle density of the scattering particles needs to be 0.1 wt % to 0.76 wt % both inclusive.

When the light guiding length of the light guide plate is 280 mm for a screen size of 22 inches and the particle diameter of the scattering particles is 4.5 μm, the particle density of the scattering particles is preferably 0.1 wt % to 0.32 wt % both inclusive and most preferably 0.14 wt %. When the particle diameter of the scattering particles is 7.0 μm, the particle density of the scattering particles is preferably 0.14 wt % to 0.5 wt % both inclusive and most preferably 0.21 wt %. Further, when the particle diameter of the scattering particles is 12.0 μm, the particle density of the scattering particles is preferably 0.25 wt % to 0.76 wt % both inclusive and most preferably 0.35 wt %.

When the light guide plate 30 has a light guiding length in a range of 480 mm L$\leq$830 mm, the density of the scattering particles needs to be 0.02 wt % to 0.22 wt % both inclusive.

Where the light guiding length L of the light guide plate, adapted for a 37-inch screen, is 480 mm, and the particle diameter of the scattering particles is 4.5 μm, the density of the scattering particles is more preferably 0.02 wt % to 0.085 wt % both inclusive, and most preferably 0.047 wt %. Where the particle diameter of the scattering particles is 7.0 μm, the density of the scattering particles is more preferably 0.03 wt % to 0.12 wt % both inclusive, and most preferably 0.065 wt %. Where the particle diameter of the scattering particles is 12.0 μm, the density of the scattering particles is more preferably 0.06 wt % to 0.22 wt % both inclusive, and most preferably 0.122 wt %.

Where the light guiding length L is 515 mm L≦620 mm, the density of the scattering particles is preferably 0.015 wt % to 0.16 wt % both inclusive.

Where the light guiding length L of the light guide plate, adapted for a 42-inch screen, is 560 mm, and the particle diameter of the scattering particles is 4.5 μm, the density of the scattering particles is more preferably 0.015 wt % to 0.065 wt % both inclusive, and most preferably 0.035 wt %. Where the particle diameter of the scattering particles is 7.0 μm, the density of the scattering particles is more preferably 0.02 wt % to 0.09 wt % both inclusive, and most preferably 0.048 wt %. Where the particle diameter of the scattering particles is 12.0 μm, the density of the scattering particles is more preferably 0.04 wt % to 0.16 wt % both inclusive, and most preferably 0.09 wt %.

Where the light guiding length L of the light guide plate, adapted for a 46-inch screen, is 590 mm, and the particle diameter of the scattering particles is 4.5 μm, the density of the scattering particles is more preferably 0.015 wt % to 0.060 wt % both inclusive, and most preferably 0.031 wt %. Where the particle diameter of the scattering particles is 7.0 μm, the density of the scattering particles is more preferably 0.02 wt % to 0.08 wt % both inclusive, and most preferably 0.043 wt %. Where the particle diameter of the scattering particles is 12.0 μm, the density of the scattering particles is more preferably 0.035 wt % to 0.15 wt % both inclusive, and most preferably 0.081 wt %.

Where the light guiding length L is 625 mm L≦770 mm, the density of the scattering particles is preferably 0.01 wt % to 0.12 wt % both inclusive.

Where the light guiding length L of the light guide plate, adapted for a 52-inch screen, is 660 mm, and the particle diameter of the scattering particles is 4.5 μm, the density of the scattering particles is more preferably 0.010 wt % to 0.050 wt % both inclusive, and most preferably 0.025 wt %. Where the particle diameter of the scattering particles is 7.0 μm, the density of the scattering particles is more preferably 0.015 wt % to 0.060 wt % both inclusive, and most preferably 0.034 wt %. Where the particle diameter of the scattering particles is 12.0 μm, the density of the scattering particles is more preferably 0.030 wt % to 0.120 wt % both inclusive, and most preferably 0.064 wt %.

Where the light guiding length L of the light guide plate, adapted for a 57-inch screen, is 730 mm, and the particle diameter of the scattering particles is 4.5 μm, the density of the scattering particles is more preferably 0.010 wt % to 0.040 wt % both inclusive, and most preferably 0.021 wt %. Where the particle diameter of the scattering particles is 7.0 μm, the density of the scattering particles is more preferably 0.010 wt % to 0.050 wt % both inclusive, and most preferably 0.028 wt %. Where the particle diameter of the scattering particles is 12.0 μm, the density of the scattering particles is more preferably 0.020 wt % to 0.100 wt % both inclusive, and most preferably 0.053 wt %.

Where the light guiding length L is 785 mm L≦830 mm, the density of the scattering particles is preferably 0.006 wt % to 0.08 wt % both inclusive.

Where the light guiding length L of the light guide plate, adapted for a 65-inch screen, is 830 mm, and the particle diameter of the scattering particles is 4.5 μm, the density of the scattering particles is more preferably 0.008 wt % to 0.030 wt % both inclusive, and most preferably 0.016 wt %. Where the particle diameter of the scattering particles is 7.0 μm, the density of the scattering particles is more preferably 0.009 wt % to 0.040 wt % both inclusive, and most preferably 0.022 wt %. Where the particle diameter of the scattering particles is 12.0 μm, the density of the scattering particles is more preferably 0.020 wt % to 0.080 wt % both inclusive, and most preferably 0.041 wt %.

It is apparent from the foregoing that the particle diameter and density of the scattering particles dispersed in the light guide plate 30 need to meet a given relationship depending upon the light guiding length between the two light entrance planes 30d, 30e of the light guide plate 30 according to the invention.

Figure 9:
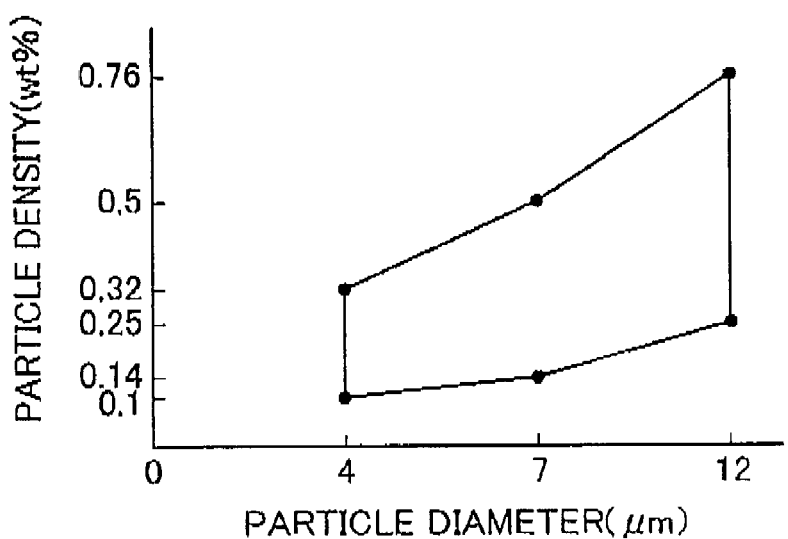
FIG. 9 is a graph illustrating a relationship between particle diameter and particle density [wt %] of the scattering particles dispersed in the inventive light guide plate.

Thus, where, according to the invention, the light guiding length of the light guide plate 30 is 280 mm to 320 mm both inclusive, the particle diameter of the scattering particles needs to be 4.0 μm to 12.0 μm both, and the density of the scattering particles needs to be 0.1 wt % to 0.76 wt % both inclusive as described above, and the particle diameter and density of the scattering particles need to be in a region defined by six points (4.0, 0.1), (4.0, 0.32), (7.0, 0.14), (7.0, 0.5), (12.0, 0.25) and (12.0, 0.76) as illustrated in the graph of FIG. 9 where the horizontal axis indicates the particle diameter (μm) of the scattering particles and the vertical axis indicates the particle density of the scattering particles.

Figure 10A:
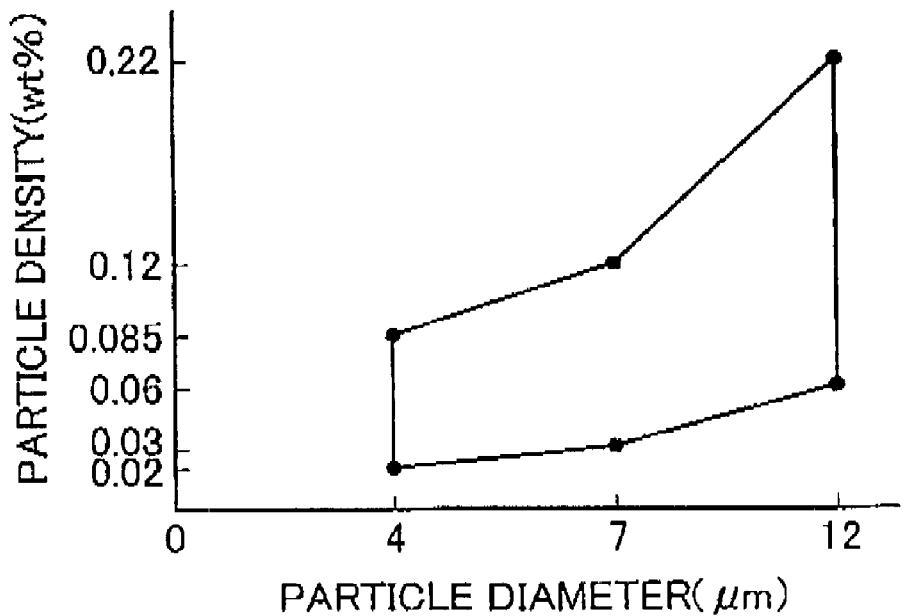
FIGS. 10A and 10B are graphs each illustrating a relationship between particle diameter and particle density (wt %) of the scattering particles dispersed in the inventive light guide plate.
Figure 10B:
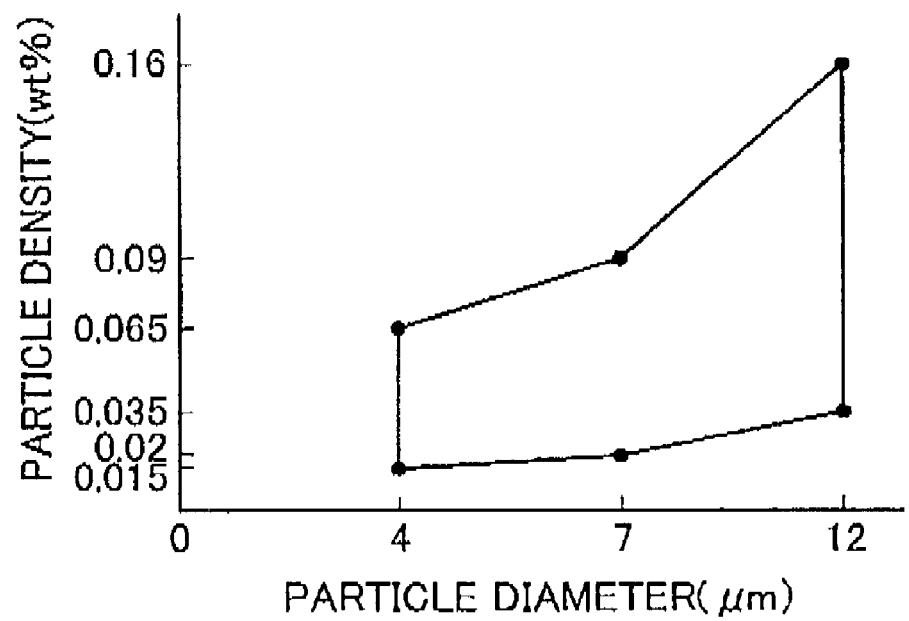
Figure 11A:
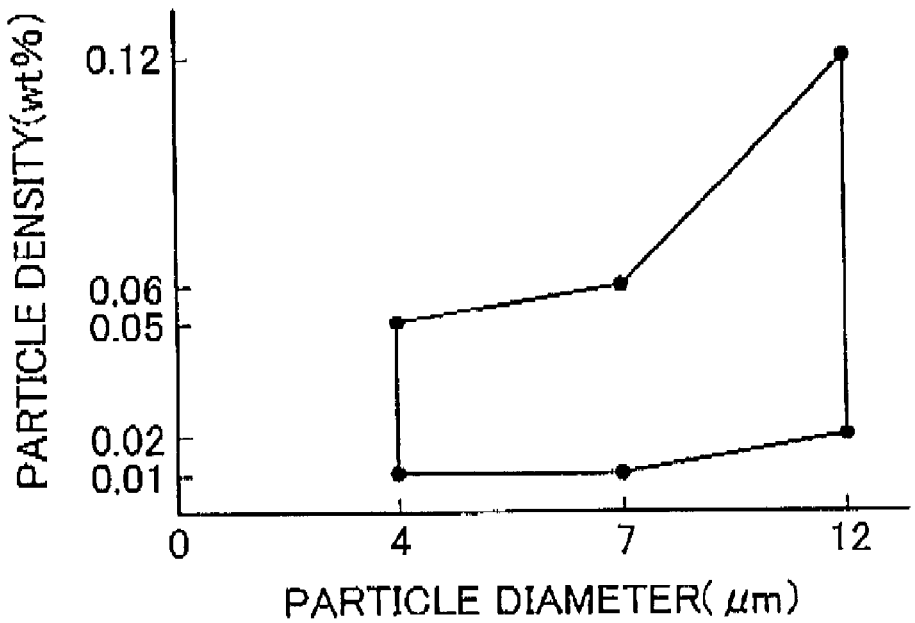
FIGS. 11A and 11B are graphs each illustrating a relationship between particle diameter and particle density (wt %) of the scattering particles dispersed in the inventive light guide plate.
Figure 11B:
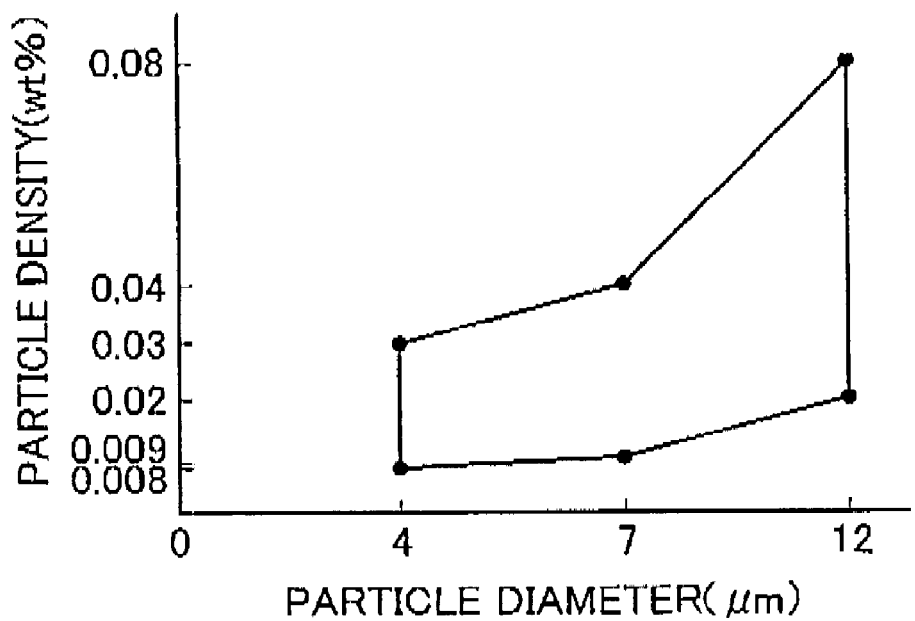

Further, where, according to the invention, the light guiding length of the light guide plate 30 is 480 mm to 500 mm both inclusive, the particle diameter of the scattering particles needs to be 4.0 μm to 12.0 μm both inclusive, and the density of the scattering particles needs to be 0.02 wt % to 0.22 wt % both inclusive as described above. In addition, the particle diameter and the particle density of the scattering particles need to be in an area determined by six points (4.0, 0.02), (4.0, 0.085), (7.0, 0.03), (7.0, 0.12), (12.0, 0.06), and (12.0, 0.22) as illustrated in FIG. 10A, where the horizontal axis indicates the particle diameter (μm) of the scattering particles and the vertical axis indicates the particle density (W %) of the scattering particles.

Where the light guiding length of the light guide plate 30 is 515 mm to 620 mm both inclusive, the particle diameter of the scattering particles needs to be 4.0 μm to 12.0 μm both inclusive, and the density of the scattering particles needs to be 0.015 wt % to 0.16 wt % both inclusive as described above. In addition, the particle diameter and the particle density of the scattering particles need to be in an area determined by six points (4.0,0.015), (4.0,0.065), (7.0,0.02), (7.0,0.09), (12.0, 0.035), and (12.0,0.016) as illustrated in FIG. 10B, where the horizontal axis indicates the particle diameter (μm) of the scattering particles and the vertical axis indicates the particle density (W %) of the scattering particles.

Where the light guiding length of the light guide plate 30 is 625 mm to 770 mm or smaller, the particle diameter of the scattering particles needs to be 4.0 μm to 12.0 μm both inclusive, and the density of the scattering particles needs to be 0.01 wt % to 0.12 wt % both inclusive as described above. In addition, the particle diameter and the particle density of the scattering particles need to be in an area determined by six points (4.0,0.01), (4.0,0.05), (7.0,0.01), (7.0,0.06), (12.0,0.02), and (12.0,0.12) as illustrated in FIG. 11A, where the horizontal axis indicates the particle diameter (μm) of the scattering particles and the vertical axis indicates the particle density (W %) of the scattering particles.

Where the light guiding length of the light guide plate 30 is 785 mm to 830 mm both inclusive, the particle diameter of the scattering particles needs to be 4.0 μm to 12.0 μm both inclusive, and the density of the scattering particles needs to be 0.008 wt % to 0.08 wt % both inclusive as described above. In addition, the particle diameter and the particle density of the scattering particles need to be in an are a determined by six points (4.0,0.008), (4.0,0.03), (7.0,0.009), (7.0,0.04), (12.0, 0.02), and (12.0,0.08) as illustrated in FIG. 11B, where the horizontal axis indicates the particle diameter (μm) of the scattering particles and the vertical axis indicates the particle density (W %) of the scattering particles.

The particle diameter and the particle density of the scattering particles need to be confined within an area determined by the six points illustrated in FIGS. 9, 10A, 10B and 11A and 11B because a higher particle density outside the area fails to achieve a high-in-the-middle distribution as in the case of the flat light guide plate while a lower particle density outside the area fails to yield a light use efficiency of 55% or greater as light is allowed to pass through, whereas scattering particles having a smaller diameter outside the area improves the light use efficiency but fails to achieve a high-in-the-middle distribution while scattering particles having a greater diameter outside the area achieves a high-in-the-middle distribution but only yields a low light use efficiency.

Thus, selection of an appropriate particle density of the scattering particles from within a particle diameter range determined according to the invention as mentioned above enables emission of light with an increased light use efficiency as compared with cases where the scattering particles are dispersed in the flat light guide plate. The invention achieves a light use efficiency of at least 55%, specifically 70% or greater.

Thus, selection of an appropriate combination of particle diameter and particle density ensures that light from the LED light source is emitted from the light guide plate free from uneven brightness with a light mixing distance of about 10 mm.

The light guide plate 30 of the invention having scattering particles dispersed therein needs to meet a light use efficiency of at least 55%, the light use efficiency indicating a ratio of light emitted through the light exit plane to light admitted through the two light entrance planes. This is because under a light use efficiency of 55%, a light source capable of generating a greater output is needed to obtain a required brightness, and a light source capable of generating a greater output not only assumes a higher temperature and consumes a greater amount of electricity but causes the light guide plate 30 to warp or expand in a significant manner, making it impossible to achieve a required brightness distribution, i.e., a high-in-the-middle or bell-curve brightness distribution.

Further, the middle-high ratio represented by the brightness distribution as measured at the light exit plane indicating the ratio of brightness of the light emitted from an area about the center of the light exit plane to the brightness of the light emitted from areas of the light exit plane close to the light entrance planes needs to be 0% exclusive to 25% inclusive because a distribution meeting such a condition is the brightness distribution required of a thin, large-screen liquid crystal television, i.e., a high-in-the-middle, bell-curve distribution whereby an area closer to the center of the screen is bright as compared with the periphery thereof.

The light guide plate 30 having such a property may be manufactured by using an extrusion molding or an injection molding.

In the light guide plate 30, at least one surface of the first light entrance plane 30d and the second light entrance plane 30e, through which light is admitted, the light exit plane 30a, and the first inclined plane 30b and the second inclined plane 30c, which reflect light, preferably has a surface roughness Ra of less than 380 nm, thus, Ra<380 nm.

When the first light entrance plane 30d and the second light entrance plane 30e, through which light is admitted, each have a surface roughness Ra of less than 380 nm, diffuse reflection on the surfaces of the light entrance planes can be ignored or, in other words, diffuse reflection on the surfaces of the light entrance planes can be prevented and, thus, light admission efficiency can be improved.

Further, when the light exit plane 30a is given a surface roughness Ra of less than 380 nm, transmission by diffuse reflection through the surface of the light exit plane can be ignored or, in other words, transmission by diffuse reflection on the surface of the light exit plane can be prevented and, therefore, light is allowed to travel further deep into the light guide plate by total reflection.

Further, when the first inclined plane 30b and the second inclined plane 30c, both serving to reflect light, is given a surface roughness Ra of less than 380 nm, diffuse reflection can be ignored or, in other words, diffuse reflection on these reflective surfaces can be prevented and, therefore, all the reflected light components are allowed to travel further deep into the light guide plate.

The light guide plate of the invention, basically configured as described above, may be designed as follows. Note that a light guide plate used to describe a design method do not have holes for connecting the light guide plate to the upper housing 42 and the lower housing 44 of the housing 40. However, the holes are made in limited areas of the light guide plate such that basically the same light will be emitted through the light exit plane.

Figure 12:
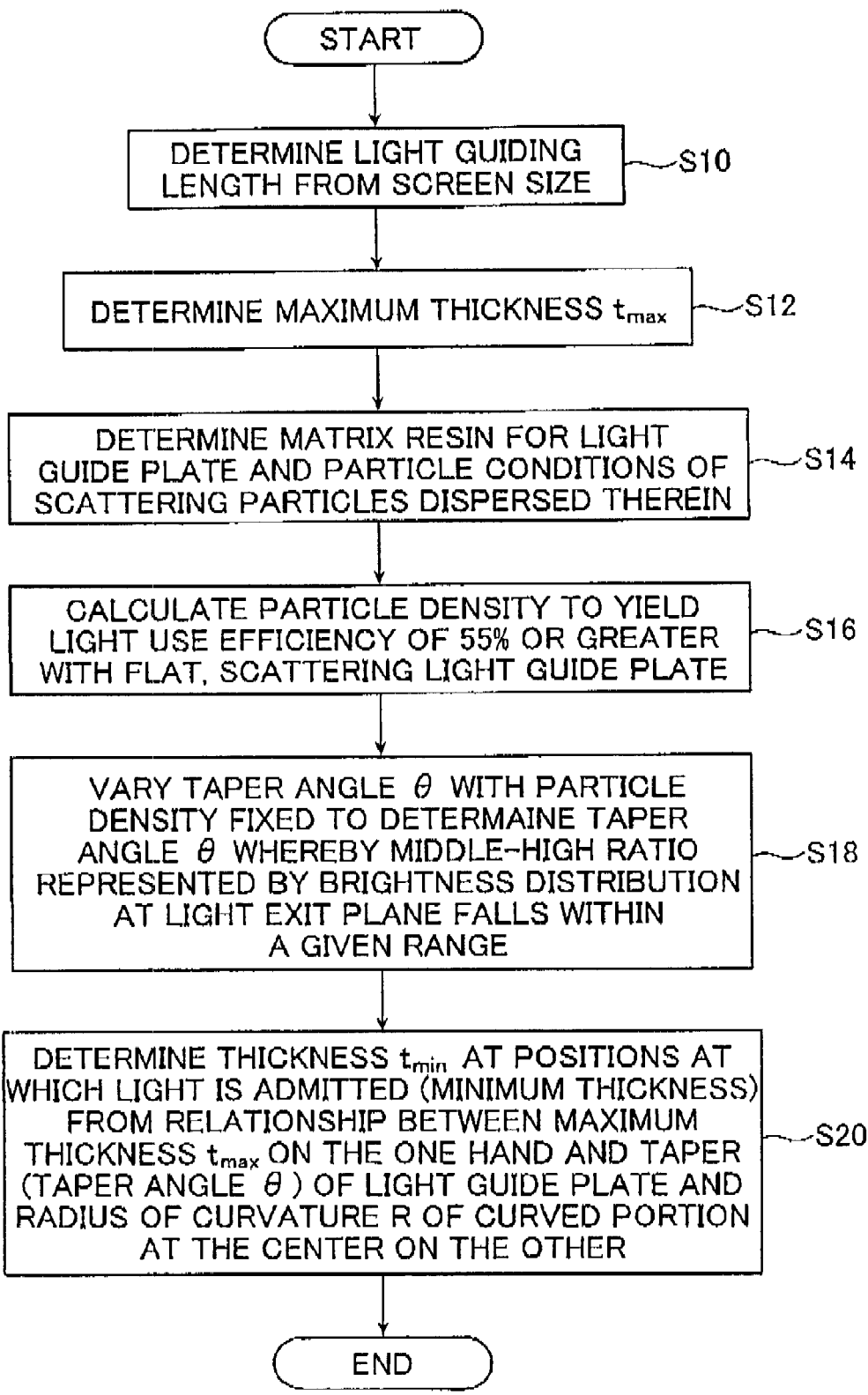
FIG. 12 is a flowchart illustrating an example of designing sequence for designing the light guide plate of the invention.

FIG. 12 is a flowchart illustrating an example of designing sequence for the light guide plate of the invention.

As illustrated in FIG. 12, a light guiding length is determined in Step 10 by adding a light mixing distance of about 10 mm to the length of the shorter side of the screen size of the liquid crystal display device to which the backlight unit using the inventive light guide plate is applied.

Next, a maximum thickness $t_{max}$ of the light guide plate is determined from the screen size in Step 12.

Then, a matrix resin used for the light guide plate and particle conditions of the added scattering particles are determined in Step 14.

Then, a particle density is determined in Step 16 that yields a light use efficiency of 55% or greater with the flat light guide plate containing scattering particles dispersed therein (dispersing light guide plate) and having the light guiding length determined earlier. The light use efficiency is expressed as E=Iout/Iin×100 [%], where I out and Iin denote outgoing and incoming luminous fluxes [1 m], respectively. While the particle density is determined by simulation, when there is a difference between a light use efficiency E as actually measured and a light use efficiency E as obtained by simulation, the design value of the particle density should be determined considering the difference. When there is such a difference, it is preferable to have previously found the difference between a light use efficiency E as actually measured and a light use efficiency E as obtained by simulation.

Next, in Step 18, the taper angle θ or the maximum thickness tmax of the inclined rear planes (reversed wedge shape) of the inventive light guide plate is varied, with the design value of the particle density fixed, to obtain a brightness distribution at the light exit plane of the light guide plate and determine the taper angle θ whereby the middle-high ratio represented by the brightness distribution thus obtained falls within a given range. At this time, the radius of curvature R of the curved portion at the center is determined according to the light guiding length to match with the tapered planes. The middle-high ratio D is expressed as 0<D≦25, D=[(Lcen−Ledg)/Lcen]×100 [%] The middle-high ratio D denotes a middle-high ratio represented by the brightness distribution (a degree to which the middle stands out), and Lcen and Ledg denote brightnesses as observed at about the center and at both sides of the screen (areas close to the entrance planes), respectively. While the taper angle θ is determined by simulation, when there is a difference between a particle density as actually measured and a particle density as obtained by simulation, the brightness distribution should be considered and the ratio D determined taking into account the difference to determine the taper angle θ. When there is such a difference, it is preferable to have previously found the difference between a particle density as actually measured and a particle density as obtained by simulation is preferably obtained.

Subsequently, in Step 20, a thickness at positions at which light is admitted (minimum thickness) tmin is determined from the relationship between the maximum thickness of the light guide plate tmax on the one hand and the taper (taper angle) and the radius of curvature R of the curved portion at the center on the other to select LEDs having a light emission face smaller than the thus determined thickness tmin at positions at which light is admitted.

The light guide plate of the invention can be designed following the procedure described above.

Figure 13:
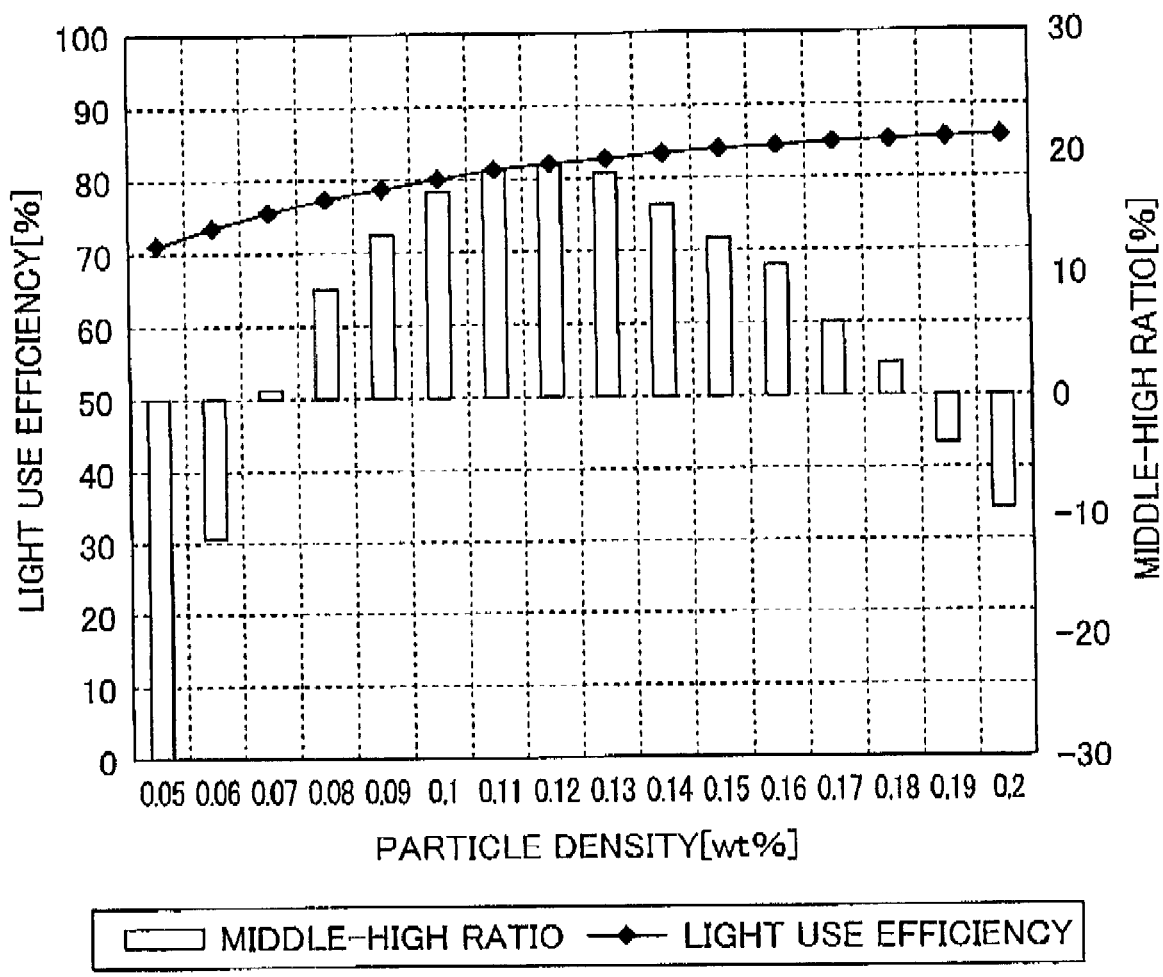
FIG. 13 is a graph illustrating a relationship between density (wt %) of particles dispersed in the inventive light guide plate on the one hand and light use efficiency (%) and middle-high ratio [%] on the other.

FIG. 13 illustrates a relationship between particle density [wt %] on the one hand and a light use efficiency [%] and the middle-high ratio [%] on the other in the case of a light guide plate used for a screen size of 37 inches and having a maximum thickness of 3.5 mm and a light guiding length of 480 mm.

As is apparent from the drawing, the light use efficiency is greater than 70% in a particle density range of 0.05 wt % to 0.2 wt % while the middle-high ratio is negative, indicating that the brightness distribution is low in the middle, in particle density ranges of 0.05 wt % to 0.07 wt % and 0.19 wt % to 0.2 wt %. It will be understood that when the middle-high ratio of 10% or greater is required, for example, design should be made such that the particle density falls within a range of 0.08 wt % to 0.16 wt %.

Table 3 shows light guiding length [mm], maximum thickness [mm], particle density [wt %], taper, radius of curvature R of the central curved portion [mm], light use efficiency [%], and the middle-high ratio [%] of light guide plates designed as described above for screen sizes of 37 inches, 42 inches, 46 inches 52 inches, 57 inches, and inches, respectively

TABLE 3

| | Screen size | | | | | |
|---|---|---|---|---|---|---|
| | 37" | 42" | 46" | 52" | 57" | 65" |
| Light guiding length [mm] | 480 | 560 | 590 | 660 | 730 | 830 |
| Maximum thickness [mm] | 3.48 | 3.48 | 3.48 | 3.5 | 3.48 | 3.48 |
| Particle density [wt %] | 0.065 | 0.048 | 0.043 | 0.035 | 0.028 | 0.022 |
| Taper | 0.00477 | 0.00411 | 0.0039 | 0.00351 | 0.00317 | 0.00279 |
| Radius of curvature R of central curved portion [mm] | 15000 | 20000 | 22000 | 28000 | 33000 | 42000 |
| Light use efficiency [%] | 61.5 | 61 | 61 | 60 | 61 | 59 |
| Middle-high ratio [%] | 19 | 15 | 14.5 | 14 | 14.2 | 13.5 |

Any of the light guide plates given in Table 3, meeting the ranges as provided by the invention, is thin despite of its large screen, yields a high light use efficiency, emits light with minimized unevenness in brightness and achieves a high-in-the-middle or bell-curve distribution whereby an area about the center of the screen is brighter than the periphery, as is required of thin, large-screen liquid crystal televisions.

The light guide plate of the invention is basically configured as above.

Next, the optical member unit 32 will be described.

The optical member unit 32 serves to reduce the brightness unevenness of the illumination light emitted through the light exit plane 30*a* of the light guide plate 30 to achieve emission of light with reduced brightness unevenness through a light emission plane 24*a* of the main body of the lighting device 24. As illustrated in FIG. 2, the optical member unit 32 comprises a diffusion sheet 32*a* for diffusing the illumination light emitted through the light exit plane 30*a* of the light guide plate 30 to reduce brightness unevenness, a prism sheet 32*b* having micro prism arrays formed parallel to the lines where the light exit plane and the light entrance planes meet, and a diffusion sheet 32*c* for diffusing the illumination light emitted through the prism sheet 32*b* to reduce brightness unevenness.

Preferably, the optical member unit 32 has similar circular holes and long holes in positions corresponding to the first circular hole 60*a*, the second circular hole 60*c*, the first long hole 62*a*, and the second long hole 62*c* made in the light exit plane 30*a* of the light guide plate 30 to secure the light source 28 and the light guide plate 30 to the securing member 31*a*. To connect the light guide plate 30 to the upper housing 44 and the lower housing 42 of the housing 40, the optical member unit 32 preferably has similar circular holes and long holes, though not shown, in positions corresponding to the third circular hole 61*a*, the third long hole 63*a*, and the fourth long hole 63*b* made in the light exit plane 30*a* of the light guide plate 30.

The diffusion sheets 32a and 32c and the prism sheet 32b may be provided by making use, for example, of the diffusion sheets and the prism sheets disclosed in paragraphs [0028] through [0033] of JP 2005-234397 A by the Applicant of the present application.

While the optical member unit in the embodiment under discussion comprises the two diffusion sheets 32a and 32c and the prism sheet 32b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 30a of the light guide plate 30.

For example, the optical members may also be formed of transmittance adjusting members each comprising a number of transmittance adjusters consisting of diffusion reflectors distributed according to the brightness unevenness in addition to or in place of the diffusion sheets and the prism sheet described above.

Now, the reflection plate 34 of the main body of the lighting device will be described.

The reflection plate 34 is provided to reflect light leaking through the first inclined plane 30b and the second inclined plane 30c of the light guide plate 30 back into the light guide plate 30 and helps enhance the light use efficiency. The reflection plate 34 is shaped according to the contour of the first inclined plane 30b and the second inclined plane 30c of the light guide plate 30 to cover the first inclined plane 30b and the second inclined plane 30c. In the embodiment under discussion, the reflection plate 34 is shaped to contour the sectionally triangular shape formed by the first inclined plane 30b and the second inclined plane 30c as illustrated in FIG. 2.

The reflection plate 34 may be formed of any material as desired, provided that it is capable of reflecting light leaking through the inclined planes of the light guide plate 30. The reflection plate 34 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

Upper light guide reflection plates 36 are disposed in the respective securing members 31a between the light guide plate 30 and the diffusion sheet 32a, on the side of the light guide plate 30 closer to the light exit plane 30a, covering the end portions of the light sources 28 and the light exit plane 30a, i.e., the end portion thereof closer to the first light entrance plane 30d and the end portion thereof closer to the second light entrance plane 30e. Thus, the upper light guide reflection plates 36 are disposed to cover an area extending from part of the light exit plane 30a of the light guide plate 30 to part of the array bases 54 of the light sources 28 in a direction parallel to the direction of the optical axis. Briefly, two upper light guide reflection plates 36 are disposed respectively at both-end portions of the light guide plate 30.

The upper light guide reflection plates 36 thus provided prevent light emitted by the light sources 28 from leaking toward the light exit plane 30a instead of entering the light guide plate 30.

Thus, light emitted from the LED chips 50 of the light sources 28 is efficiently admitted through the first light entrance plane 30d and the second light entrance plane 30e of the light guide plate 30, increasing the light use efficiency.

The lower light guide reflection plates 38 are provided on the side of the light guide plate 30 opposite from the light exit plane 30a, i.e., on the same side as the first inclined plane 30b and the second inclined plane 30c and extend into the securing member 31a to cover part of the light sources 28. The ends of the lower light guide reflection plates 38 closer to the center of the light guide plate 30 are connected to the reflection plate 34.

The lower light guide reflection plates 38 prevent light emitted by the light sources 28 from leaking toward the first inclined plane 30b and the second inclined plane 30c of the light guide plate 30 instead of entering the light guide plate 30. Thus, light emitted from the LED chips 50 of the light sources 28 is efficiently admitted through the first light entrance plane 30d and the second light entrance plane 30e of the light guide plate 30, increasing the light use efficiency.

Thus, light emitted from the LED chips 50 of the main light sources 28 is efficiently admitted through the first light entrance plane 30d and the second light entrance plane 30e of the light guide plate 30, increasing the light use efficiency.

The upper light guide reflection plates 36 and the lower light guide reflection plates 38 may be formed of any of the above-mentioned materials used to form the reflection plate 34.

While the reflection plate 34 is connected to the lower light guide reflection plates 38 in the embodiment under discussion, their configuration is not so limited; they may be formed of separate materials.

The upper guide reflection plates 36 and the lower light guide reflection plates 38 include similar circular holes and long holes in positions corresponding to the first circular holes 60a and 60b, the second circular holes 60c and 60d, the first long holes 62a and 62b, and the second long holes 62c and 62d made in the light exit plane 30a of the light guide plate 30 to secure the upper guide reflection plates 36 and the lower light guide reflection plates 38 to the respective securing members 31a provided to integrate the light source 28 and the light guide plate 30. The upper guide reflection plates 36 and the lower light guide reflection plates 38 include similar circular holes and long holes, though not shown, in positions corresponding to the third circular hole 61a, the third long hole 63a, and the fourth long hole 63b disposed in the light exit plane 30a of the light guide plate 30 to connect the light guide plate 30 to the upper housing 44 and the lower housing 42 of the housing 40.

The shapes and the widths of the upper light guide reflection plates 36 and the lower light guide reflection plates 38 are not limited specifically, provided that light emitted by the light sources 28 is reflected and directed toward the first light entrance plane 30d or the second light entrance plane 30e such that light emitted by the light sources 28 can be admitted through the first light entrance plane 30d or the second light entrance plane 30e and then guided toward the center of the light guide plate 30.

While, in the embodiment under discussion, the upper light guide reflection plates 36 are disposed between the light guide plate 30 and the diffusion sheet 32a, the location of the upper light guide reflection plates 36 is not so limited; each of them may be disposed between the sheets constituting the optical member unit 32 or between the optical member unit 32 and the securing member 31a.

Next, the securing means 31 will be described.

The securing means 31 includes the securing member 31a for securing and integrating the light source 28 and the light guide plate 30, the screws 31b and 31c for securing the light source 28 to the securing member 31a, and fastener pins 31d and 31e for securing the light guide plate 30 to the securing member 31a.

The securing member 31a secures and integrates the light source 28 and the light guide plate 30, keeping the distances between them constant in the optical axis direction and in the direction perpendicular thereto, and is allowed to slide over the upper sliding member 48b and the lower sliding member 48c of the sliding mechanism 48, which are secured to the housing 40 with the securing member 48a of the lower sliding member 48c and 48d according to expansion/contraction of the light guide plate 30. The securing member 31a is a columnar member having a U-shaped sectional profile.

The securing member 31a is in a sliding contact with the upper sliding member 48b and the lower sliding member 48c, thereby preventing a warp of the light guide plate 30 even when the light guide plate 30 expands/contracts in the direction perpendicular to the light entrance planes 30d and 30e of the light guide plate 30.

The frictional force generated in the contact surface increases with the area of contact between the securing member 31a and the upper sliding member 48b and the lower sliding member 48c. The frictional force generated in the contact surface decreases with the contact area. Thus, the securing member 31a is preferably shaped such that the area of contact between the securing member 31a and the upper sliding member 48b and the lower sliding member 48c increases as the light guide plate 30 expands, thereby increasing the frictional force generated in the contact surface to limit sliding of the securing member 31a, and that the area of contact between the securing member 61a and the upper sliding member 48b and the lower sliding member 48c decreases as the light guide plate 30 contracts, thereby reducing the frictional force generated in the contact surface to facilitate sliding of the securing member 31a.

As illustrated in FIG. 2, the light source 28 is integrally secured to the securing means 31 by the screws 31b and 31c. The light guide plate 30, the optical member unit 32, and the reflection plate 34 are integrally secured to the securing means 31 by the fastener pins 31d and 31e.

Specifically, the light source 28 is positioned and secured to the securing member 31a as the screws 31b and 31c engage in the screw holes 52c and 52d and the screw holes of the securing member 31a.

The light guide plate 30 is positioned and secured to the securing member 31a on both sides of the first lateral plane 30f of the light guide plate 30 as the fastener pins 31d and 31e fitted in the engagement holes made in the securing member 31a fit in the first circular holes 60a and 60b and the second circular holes 60c and 60d respectively made in the light exit plane 30a and the rear plane of the light guide plate 30. Diameters of the first circular holes 60a and 60b and the second circular holes 60c and 60d are substantially equal to outer diameters of the fastener pins 31d and 31e. Thus, the light guide plate 30 is positioned by the securing member 31a on the side containing the first lateral plane 30f in both directions perpendicular and parallel to the first light entrance plane 30d and the second light entrance plane 30e. Thus, the securing member 31a fastens and integrates the light source 28 and the light guide plate 30, thereby keeping constant the distance between the light emission plane of the light source 28 and the first light entrance plane 30d and the second light entrance plane 30e of the light guide plate 30.

On both sides of the second lateral plane 30g of the light guide plate 30, the fastener pins 31d and 31e fitted in the engagement holes made in the securing member 31a are inserted into the first long holes 62a and 62b and the second long holes 62c and 62d respectively made in the light exit plane 30a and the rear plane of the light guide plate 30. The first long holes 62a and 62b and the second long holes 62c and 62d are long in a direction parallel to the first light entrance plane 30d and the second light entrance plane 30e of the light guide plate 30, and the diameters thereof as measured in a direction perpendicular to the first light entrance plane 30d and the second light entrance plane 30e are substantially equal to the outer diameters of the fastener pins 31d and 31e. Thus, the fastener pins 31d and 31e are fixedly or immovably fitted in the first long holes 62a and 62b and the second long holes 62c and 62d, respectively, in the direction perpendicular to the first light entrance plane 30d and the second light entrance plane 30e of the light guide plate 30, and movably inserted in these holes in the parallel direction.

Thus, on both sides of the second lateral plane 30g, the light guide plate 30 is positioned and secured by the securing member 31a in the direction perpendicular to the first light entrance plane 30d and the second light entrance plane 30e. In the parallel direction, the light guide plate 30 is movable, i.e., not fixedly positioned by the securing member 31a.

Thus, the securing member 31a integrates and secures the light source 28 and the light guide plate 30 in the direction perpendicular to the first light entrance plane 30d and the second light entrance plane 30e of the light guide plate 30, thereby keeping constant the distance between the light exit plane of the light source 28 and the first light entrance plane 30d and the second light entrance plane 30e of the light guide plate 30.

The fastener pins 31d and 31e move (slide) in the first long holes 62a and 62b and the second long holes 62c and 62d in the direction parallel to the first light entrance plane 30d and the second light entrance plane 30e of the light guide plate 30 as the light guide plate 30 expands or contracts, thereby preventing a warp of the light guide plate 30 that might otherwise be caused by its expansion/contraction.

Thus, adjacent both sides of the light guide plate 30, the first lateral plane 30f and the second lateral plane 30g of the light guide plate 30, the securing member 31a integrates and fixes the light source 28 and the light guide plate 30, thereby keeping constant the distance between the light exit plane of the light source 28 and the first light entrance plane 30d and the second light entrance plane 30e of the light guide plate 30. Thus, the light sources 28 disposed opposite the first light entrance plane 30d and the second light entrance plane 30e are prevented from being destroyed by expansion/contraction of the light guide plate 30. Moreover, light admission efficiency of light emitted from the light sources 28 to the first light entrance plane 30d and the second light entrance plane 30e of the light guide plate 30 is prevented from being reduced.

Even though the light source 28 and the light guide plate 30 are thus fixed and integrated, when the light guide plate 30 expands or contracts in the direction parallel to the light entrance planes (30d and 30e) of the light guide plate 30, the positions of the fastener pins 31d and 31e move in the long holes in the longer axis direction according to the expansion/contraction of the light guide plate 30. Thus, the light guide plate 30 can freely expand or contract to suppress warp of the light guide plate 30, minimizing brightness unevenness of light emitted from the light guide plate 30.

Even when the light guide plate 30 is adapted to have greater dimensions, the light guide plate 30 is allowed to freely expand or contract in the direction parallel to the light entrance planes (30d and 30e) of the light guide plate, whereby a warp of the light guide plate 30 can be suppressed.

The circular holes and the long holes made in the optical member unit 32 and the reflection plate 34 (upper light guide reflection plates 38 and lower light guide reflection plates 36) corresponding to the circular holes 60a to 60d and the long holes 62a to 62d made in the light guide plate 30 are provided to pass the pins 31d and 31e for securing the securing member 31a, the light guide plate 30, the optical member unit 32, and the reflection plate 34.

The circular holes 60a to 60d are provided close to and inwardly of the corners 30i and 30k of the light guide plate 30. Thus, even when the liquid crystal display device 10 or the backlight unit 20 is installed with the direction parallel to the light entrance planes 30d and 30e vertically oriented, damage of the light guide plate 30 that might be caused by vertical displacement of the light guide plate 30 can be prevented.

This arrangement of the circular holes is in no way limitative. Damage to the light guide plate 30 can be prevented by arranging the circular holes in positions depending upon the arrangement and position of the liquid crystal display device 10, hence the backlight unit 20 such that the light guide plate 30 is not displaced.

According to the embodiment, the screw holes 52c and 52d are made in the two places of the top surface 52a and the bottom surface 52b of the light source support 52 of the light source 28 to secure the light source 28 and the securing member 31a. However, other arrangements and numbers of screw holes may be employed, provided that the light source 28 and the securing member 31a can be secured.

While the screws are used for securing the light source 28 and the securing member 31a according to the embodiment, fasteners for the light source 28 and the securing member 31a are not limited to the screws. Various known fasteners may be used. For example, the light source 28 and the securing member 31a may be secured by using adhesives. Thus, the structure can be simplified since there is no need to make any screw holes in the light source support 52.

The method for securing the light guide plate 30 and the securing member 31a is not limited to the circular holes and the pins. For example, in place of the circular holes and the pins, adhesives may be applied to areas adjacent the corners of the light exit plane 30a and the rear plane of the light guide plate 30 to secure the light guide plate 30 and the securing member 31a.

Next, the housing 40 will be described.

As illustrated in FIG. 2, the housing 40 accommodates and secures therein the main body of the lighting device 24 by holding it from above and both sides thereof, i.e., the light exit plane 24a and the first inclined plane 30b and the second inclined plane 30c of the light guide plate 30. The housing 40 includes the lower housing 42, the upper housing 44, the reinforcing members 46, and the sliding mechanism 48.

The lower housing 42, 3A, and 3B, is open at the top and has a configuration including a bottom section 42a and lateral sections 42b provided upright on the four sides of the bottom section 42a. Briefly, it has substantially the shape of a rectangular box open on one side. As illustrated in FIG. 2, the bottom section 42a and the lateral sections 42b support the main body of the lighting device 24 placed therein from above on the underside and on the lateral sides 42b and covers the faces of the main body of the lighting device 24 except the light exit plane 24a, i.e., the plane opposite from the light exit plane 24a of the main body of the lighting device 24 (rear side) and the lateral sections 42b.

The upper housing 44 has the shape of a rectangular box; it has an opening at the top that is slightly smaller than the rectangular light exit plane 30a of the light guide plate 30 and which is the light exit plane 24a of the main body of the lighting device 24. The upper housing 44 is open on the bottom side.

As illustrated in FIG. 2, the upper housing 44 is placed from above the main body of the lighting device 24 and the lower housing 42, that is, from the light exit plane side, to cover the main body of the lighting device 24 and the lower housing 42, which holds the former, as well as four lateral sections of the lower housing 42.

The reinforcing member 46 is a bar-shaped member having a rectangular cross section and disposed between the upper housing 44 and the lower housing 42.

As illustrated in FIG. 2, the reinforcing member 46 is connected to the upper housing 44 and the lower housing 42 by screws 46a and 46b.

Thus providing the reinforcing members 46 between the lower housing 42 and the upper housing 44 increases the rigidity of the housing 40 and prevents the light guide plate 30 from warping due to expansion/contraction thereof. As a result, for example, light can be efficiently emitted without, or with a minimized brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

Securing the lower housing 42 and the upper housing 44 and the reinforcing member 46 by tightening the screws 46a and 46b generates stress for tightly holding the securing means 31, especially the securing member 31a, in the sliding mechanism 48.

The lower housing 42, the upper housing 42, and the reinforcing member 46 of the housing 40 may be formed of various materials including metals and resins. Note that the material preferably is lightweight and offers high rigidity.

The sliding mechanism 48 allows the securing member 31a of the securing means 31 to slide according to expansion/contraction of the light guide plate 30 in the direction perpendicular to the light entrance planes 30d and 30e of the light guide plate 30, and includes a spring member 47, the securing member 48a and 48d for the respective sliding members 48b and 48c, the upper sliding member 48b, and the lower sliding member 48c.

The spring member 47 is disposed between the securing member 48a for the sliding member 48c and the securing member 31a to press the securing members 31a provided on both sides of the light guide plate, the first light entrance plane 30d and the second light entrance plane 30e, from both sides toward the center of the light guide plate 30, and to position the securing member 31a with respect to the housing 40 in the direction perpendicular to the light entrance planes 30d and 30e of the light guide plate 30.

The spring member 47 is likewise disposed also between the first lateral plane 30g and the second lateral plane 30f of the light guide plate 30 and the housing 40 to position the securing member 31a with respect to the housing 40 in the direction parallel to the light entrance planes 30d and 30e of the light guide plate 30.

The securing members 48a and 48d hold the upper sliding member 48b and the lower sliding member 48c for sliding the securing means 31 (securing member 31a). The securing members 48a and 48d are disposed between the lower housing 42 and the upper housing 44. The upper sliding member 48b is disposed on the underside of the securing member 48d, and the lower sliding member 48c is disposed on the top surface of the securing member 48a.

The upper sliding member 48b and the lower sliding member 48c sandwich the securing means 31 (securing member 31a), and allow the securing means 31 (securing member 31a) to slide as the light guide plate 30 expands or contracts in the direction perpendicular to the light entrance planes. As illustrated in FIG. 2, the upper sliding member 48b and the lower sliding member 48c are plate members.

Though not illustrated in FIGS. 2 and 3, the third circular hole 61a, the third long hole 63a, and the fourth long hole 63b are preferably provided near the three corners 30i, 30j, and 30k of the light guide plate 30, as illustrated in FIGS. 4A and 6, to connect the light guide plate 30 to the upper housing 44 and the lower housing 42 of the housing 40. As described above similar circular holes and long holes (not shown) are preferably made corresponding to the third circular hole 61a, the third long hole 63a, and the fourth long hole 63b of the light guide plate 30 in the optical member unit 32 which includes the diffusion sheet 32a, the prism sheet 32b, and the diffusion sheet 32c, and in the upper light guide reflection plates 36 and the lower light guide reflection plates 38. In the upper housing 44 and the lower housing 42 of the housing 40, circular holes (not shown) for securing pins are made in positions corresponding to the third circular hole 61a, the third long hole 63a, and the fourth long hole 63b of the light guide plate 30 housed therein. The third circular hole 61a, the third long hole 63a, the fourth long hole 63b of the light guide plate 30, and the corresponding circular holes and longs holes of the optical member unit 32, the upper light guide reflection plates 36, and the lower light guide reflection plates 38 are fitted with pins (not shown) respectively having diameters substantially equal to the diameters of the their respective holes (shorter diameter in the case of long holes). Those pins are also fitted in the circular holes made in the upper housing 44 and the lower housing 42 of the housing 40.

The light guide plate 30 is immovably secured to the housing 40 by pins (not shown) fixed to the housing 40 and fitted in the circular hole 61a made in the corner 30i of the light guide plate 30 as illustrated in FIGS. 4A and 6.

The long hole 63a long in the direction parallel to the light entrance planes 30d and 30e is made in the corner 30j of the light guide plate 30, while no hole for connection with the housing 40 is made in the corner 30l. Thus, since the pin (not shown) fixed to the housing 40 and fitted in the long hole 63a is movable in the long hole 63a in the direction parallel to the light entrance planes 30d and 30e, the light guide plate 30 can move in the direction parallel to the light entrance planes 30d and 30e with respect to the housing 40 as it expands or contracts. Therefore, a warp that might otherwise be caused by expansion/contraction of the light guide plate 30 can be prevented.

The long hole 63b long in the direction perpendicular to the light entrance planes 30d and 30e is made in the corner 30k of the light guide plate 30, while no hole is made for connection with the housing 40 in the corner 30l. Thus, since the pin (not shown) secured to the housing 40 and fitted in the long hole 63b is movable in the long hole 63b in the direction perpendicular to the light entrance planes 30d and 30e, the light guide plate 30 can move in the direction perpendicular to the light entrance planes 30d and 30e with respect to the housing 40 as it expands or contracts. Therefore, a warp that might otherwise be caused by expansion/contraction of the light guide plate 30 can be prevented.

Thus, the light guide plate 30 can be held expandable and contractible in the housing 40.

As described above, similar circular holes and long holes (not shown) are made corresponding to the third circular hole 61a, the third long hole 63a, and the fourth long hole 63b of the light guide plate 30 in the optical member unit 32 which includes the diffusion sheet 32a, the prism sheet 32b and the diffusion sheet 32c, and in the upper guide reflection plates 36 and the lower light guide reflection plates 38. Thus, even when the light guide plate 30 and the optical member unit 32 such as the diffusion sheet 32a, the prism sheet 32b, and the diffusion sheet 32c have different expansion/contraction rates, a holding mechanism capable of preventing any deflection and warp thereof is achieved.

As described above, the light guide plate 30 is held freely expandable/contractible in the housing 40. In addition, the sliding mechanism 48 is disposed between the housing 40 and the securing member 31a integrating the light guide plate 30 and the light source 28. Thus, even when the light guide plate 30 expands or contracts in the direction perpendicular to the light entrance planes 30d and 30e of the light guide plate 30, the securing member 31a can slide by the sliding mechanism 48 according to the expansion/contraction of the light guide plate 30. Thus, a warp of the light guide plate 30 caused by its expansion/contraction in the direction perpendicular to the light entrance plane can be suppressed, and brightness unevenness of light emitted from the light exit plane 30a of the light guide plate 30 can be suppressed. Moreover, since the light guide plate 30 can freely expand or contract in the direction perpendicular to the light entrance plane of the light guide plate 30 even in the case of a large light guide plate, brightness unevenness of light emitted from the light exit plane 30a of the light guide plate 30 can be suppressed.

The light guide plate 30 and the light source 28 are secured to the securing member 31a to keep constant the distance between them in the optical axis direction and in the direction perpendicular thereto. Thus, even when the securing member 31a slides, the distance between the light guide plate 30 and the light source 28 in the optical axis direction can be kept constant. Such a configuration prevents destruction of the light source that might occur should it be pressed by the light entrance planes 30d and 30e of the light guide plate 30 as the light guide plate 30 expands or contracts in the direction perpendicular to the light entrance planes and/or reduction of light admission efficiency of light emitted from the light source 28 to the light guide plate 30.

According to the embodiment the sliding mechanism 48 includes, as illustrated in FIG. 2, the upper sliding member 48b and the lower sliding member 48c, whereby a frictional force can be generated between the upper sliding member 48b and the lower sliding member 48c and the securing member 31a according to an expanding/contracting force of the light guide plate 30.

The contact areas of the light guide plate 30 with the upper sliding member 48b and the lower sliding member 48c of the sliding mechanism 48 are small when expansion/contraction of the light guide plate 30 is small, and large when expansion/contraction of the light guide plate 30 is large. A frictional force applied between the upper sliding member 48b and the lower sliding member 48c and the securing member 31a is small when the contact area is small, and large when the contract area is large. Thus, a frictional force applied between the light guide plate 30 and the upper sliding member 48b and the lower sliding member 48c of the sliding mechanism 48 is small when expansion/contraction of the light guide plate 30 is small, and large when expansion/contraction of the light guide plate 30 is large.

Thus, a frictional force corresponding to an expanding/contracting force of the light guide plate 30 can be generated between the upper sliding member 48b and the lower sliding member 48c of the sliding mechanism 48 and the securing member 31a by shaping the upper sliding member 48b and the lower sliding member 48c of the sliding mechanism 48 as shown in FIG. 2 to provide resistance to expansion of the light guide plate 30.

Figure 14:
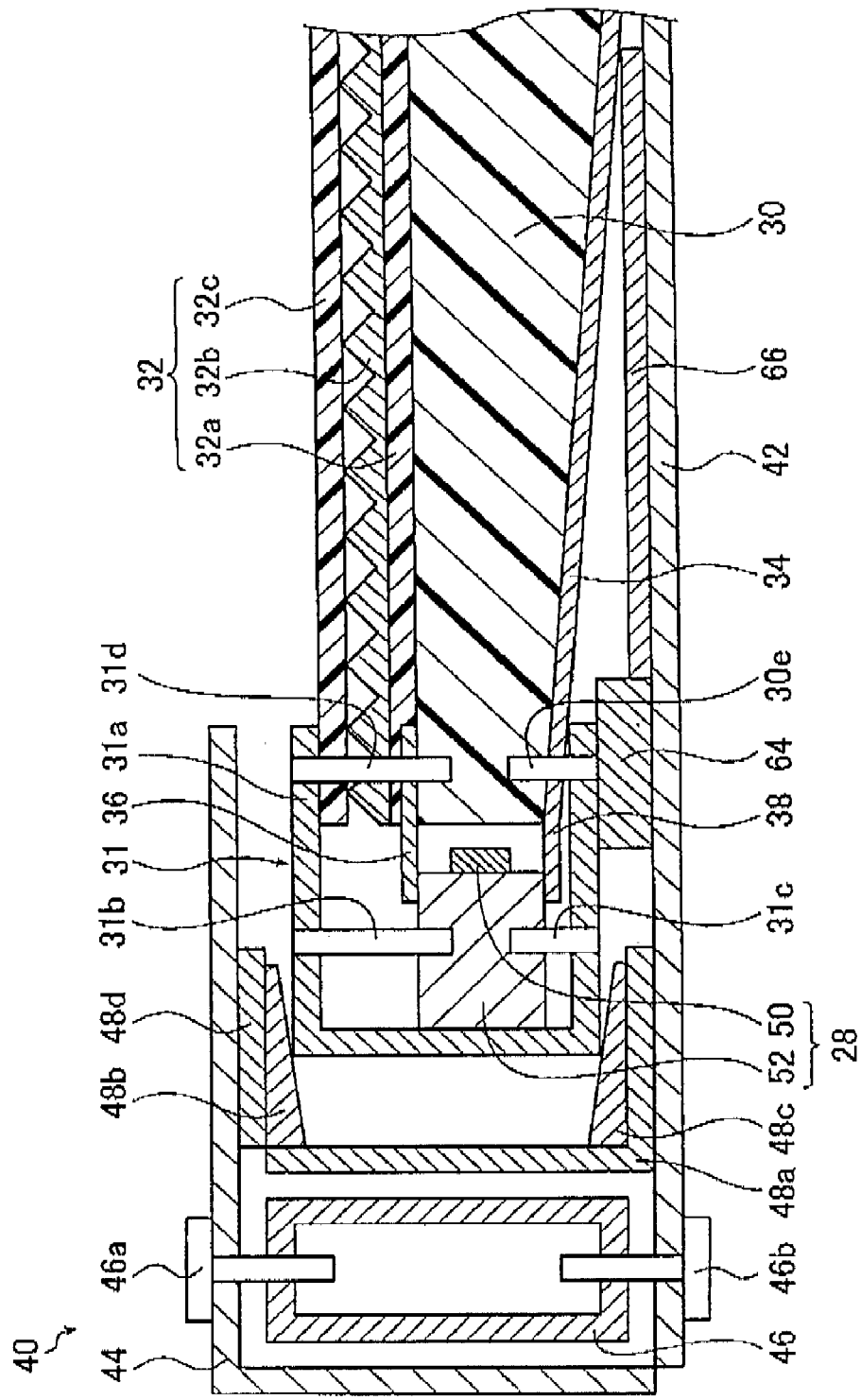
FIG. 14 illustrates enlarged a light source and part of the light guide plate, close to its light entrance plane, of another embodiment of the planar lighting device according to the invention.

While, according to the embodiment, the frictional force corresponding to the expanding/contracting force of the light guide plate 30 is generated by using the plate-shaped upper sliding member 48b and the plate-shaped lower sliding member 48c of the shapes as illustrated in FIG. 2, the upper sliding member 48b and the lower sliding member 48c are not limited to these shapes. For example, the upper sliding member 48b and the lower sliding member 48c may each be formed to have a triangular cross section as illustrated in FIG. 14.

Where the upper sliding member 48b and the lower sliding member 48c each have a triangular cross section as illustrated in FIG. 14, when expansion of the light guide plate 30 is small, a distance between the upper sliding member 48b and the lower sliding member 48c is great, and thus a frictional force applied between the upper sliding member 48b and the lower sliding member 48c and the securing member 31a is small. When expansion of the light guide plate 30 is great, the securing member 31a must slide through a narrow space between the upper sliding member 48b and the lower sliding member 48c, and thus a frictional force applied between the upper sliding member 48b and the lower sliding member 48c and the securing means 31 is great. In other words, even when the upper sliding member 48b and the lower sliding member 48c are each formed to have a triangular cross section, a frictional force corresponding to the expanding/contracting force of the light guide plate 30 can be generated between the upper sliding member 48b and the lower sliding member 48c and the securing member 31a. Since the upper sliding member 48b and the lower sliding member 48c each having a triangular cross section apply pressing forces onto the securing member 31a, the sliding mechanism 48 according to the embodiment illustrated in FIG. 14 need not include the spring material 47 unlike the case of the sliding mechanism 48 illustrated in FIG. 3.

In the illustrated example, various materials such as Teflon (trademark) and metal can be used to form the upper sliding member 48b and the lower sliding member 48c. Without separately installing the upper sliding member 48b and the lower sliding member 48c, oil may be applied on the lower and upper housings 42 and 44 to constitute the upper sliding member 48b and the lower sliding member 48c.

According to the embodiment, the upper sliding member 48b and the lower sliding member 48c are respectively disposed on the underside of the upper housing 44 and on the top surface of the lower housing 42. However, the present invention is not limited to this configuration. For example, a structure where only the upper sliding member 48b or only the lower sliding member 48c is provided may be employed. In this way, the structure of the housing 40 can be simplified.

The lower housing 42, the upper housing 44, and the reinforcing member 46 are connected together by the screws 46a and 46b. The stress applied when tightening the screws 46a and 46b determines the stress for holding the securing means 31 (securing member 31a) between the upper sliding member 48b and the lower sliding member 48c. Such screw fastening stress may be used to control the frictional force generated between the securing member 31a and the upper sliding member 48b and the lower sliding member 48c.

In this case, when the frictional force between the securing member 31a and the upper sliding member 48b and the lower sliding member 48c is greater than an expanding/contracting force of the light guide plate 30, the securing member 31a cannot slide on the upper or lower sliding member 48b or 48c. Consequently, a warp of the light guide plate 30 generated when the light guide plate 30 expands or contracts cannot be suppressed.

Stress applied by the screws 46a and 48b on the upper sliding member 48b and the lower sliding member 48c varies from place to place because of a stress distribution even if the pressing forces of the screws 46a and 46b are constant.

Thus, the positions of the upper sliding member 48b and the lower sliding member 48c are preferably determined according to the magnitude of stress applied by the screws 46a and 46b and the stress distribution. A method of determining the positions of the upper sliding member 48b and the lower sliding member 48c will be described in detail.

A pushing force F generated by expansion/contraction of the light guide plate 30 is represented by the following equation, where Y is Young's modulus of the light guide plate 30, is a length, $\Delta L$ is expansion, an Aave is an average sectional area:

$$F = Y \cdot Aave \cdot (\Delta L/L)$$

Now, let G be the force to hold the light guide plate 30 concentrated at the ends of the upper sliding member 48b and the lower sliding member 48c and let $\mu$ be a coefficient of static friction of the contact surface. Then, $$F > \mu \cdot G$$

is the condition for the securing member 31a securing the light guide plate 30 to start sliding on the upper sliding member 48b and the lower sliding member 48c.

An example of force F generated by expansion/contraction of the light guide plate 30 will be described using a light guide plate having an actual shape. When an acrylic material is used to form the light guide plate 30, and Teflon (trademark) is used for the upper sliding member 48b and the lower sliding member 48c, Young's modulus of the light guide plate 30 is 1.5 MPa to 3 MPa=1.5 MN/m2 to 3 MN/m2, and a coefficient of static friction of the upper sliding member 48b and the lower sliding member 48c is 0.01. In this case, a value of the coefficient of static friction is a value when the upper sliding member 48b and the lower sliding member 48c of the securing member 31a are provided. A volumetric expansion coefficient of the light guide plate 30 is set to 0.3% per 24 hours. The light guide plate used as an example had a width of 2 mm in the direction perpendicular to the light exit plane 30a of the light guide plate 30, and a width of 3.6 mm in the direction perpendicular to the light exit plane 30a on the bisector α of the light guide plate 30. Table 4 shows the measurements of the size of the light guide plate, the average sectional area Aave, and the force F generated by expansion/contraction of the light guide plate 30.

TABLE 4

|  | Aave [m$^2$] | F [kgw] |
| --- | --- | --- |
| 42 inches | 0.0028 | 2.57 |
| 46 inches | 0.0031 | 2.85 |
| 52 inches | 0.0035 | 3.21 |
| 57 inches | 0.0038 | 3.49 |
| 65 inches | 0.0043 | 3.99 |

Next, the condition for the securing member 31a to start sliding on the upper sliding member 48b and the lower sliding member 48c with the stress distribution taken into consideration will be described.

The screws 46a and 46b are screws having a diameter of 3 mm. When the securing member 31a is secured by tightening the screws, the fastening force amounts to about 60 kg. This is a force directly applied onto the screw thread, and the force is distributed by washers over area about the screws. It is assumed that in reality, fastening forces of the screws 46a and 46b are not directly applied to an object to be pressed, but a distributed pressure is applied to a very small area to generate perpendicular resistance. Suppose that the stress distribution may be represented unidimensionally as G(x), then the screw fastening force in a position x=0 may be regarded considered an approximate screw fastening force. A frictional force T(x) in a position spaced by a distance x from the screws 46a and 46b is represented as follows:

$$T(x)=\mu \cdot G(x)$$

and the condition for the securing member 31a securing the light guide plate 30 and the light source 28 to start sliding on the upper sliding member 48b and the lower sliding member 48c is represented as follows:

$$T(x)=\mu \cdot G(x)<F=Y \cdot A\text{ave} \cdot (\Delta L/L) \quad (1)$$

Figure 15:
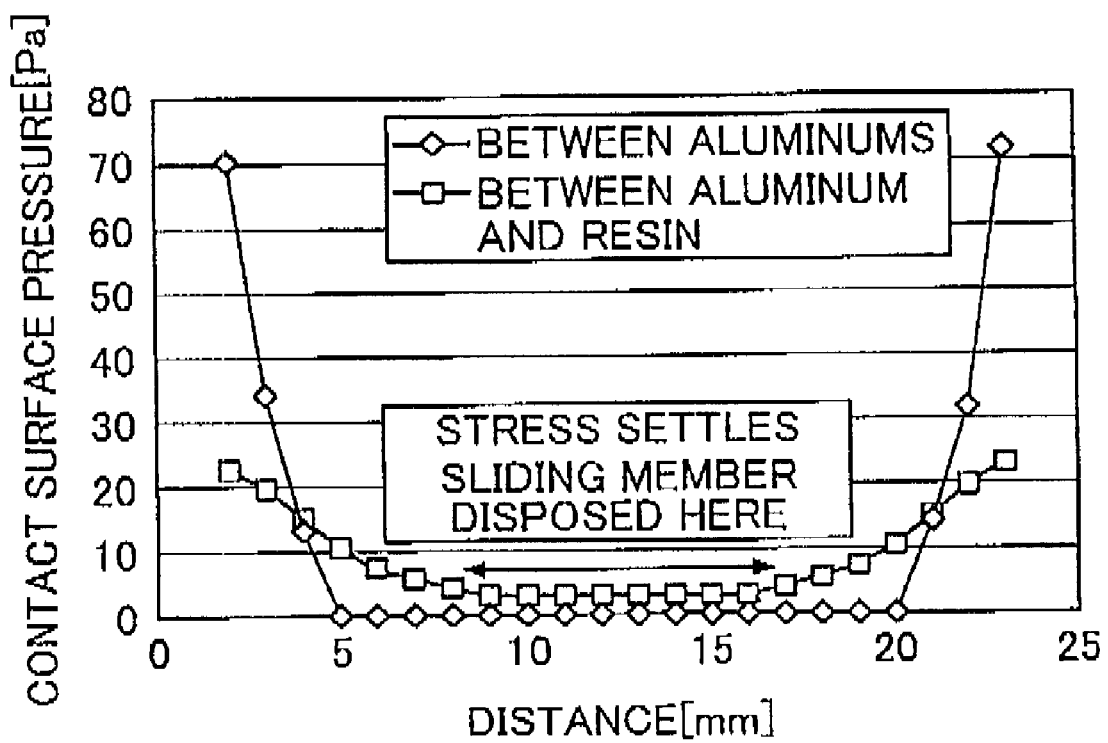
FIG. 15 is a graph illustrating stress distributions measured from the screwing position.

FIG. 15 illustrates measurements of stress distributions obtained where screws were tightened in positions of x=0 and x=25. The vertical axis indicates magnitude of stress, while the horizontal axis indicates the distance from the screwing position. Two solid lines each indicate a case where materials of the securing member 31a and the upper sliding member 48b and the lower sliding member 48c are both aluminum, and a case where a material for one member is aluminum while a material for the other member is a resin. As illustrated in FIG. 15, in the stress distribution G(x), stress declines from the screwing position, settles in the center, and increases again toward the other screwing position. The sliding mechanism 48 is dispose data location where the stress settles. Thus, disposing the upper sliding member 48b and the lower sliding member 48c in places of small stress makes it easier for the expanding/contracting force of the light guide plate 30 and the frictional force applied between the securing member 31a and the sliding mechanism 48 to satisfy the equation (1). Since the stress remains constant in the range where it settles, positioning of the upper sliding member 48b and the lower sliding member 48c is facilitated, increasing the certainty with which the securing member 31a slides in the sliding mechanism 48.

As described above, the positions of the upper sliding member 48b and the lower sliding member 48c of the sliding mechanism 48 are determined considering the expanding/contracting force of the light guide plate, the fastening stress of the screws 46a and 46b, and the stress distribution. Thus, the securing member 31a is allowed to slide on the upper sliding member 48b and the lower sliding member 48c in the sliding mechanism 48 according to the expanding/ontracting force of the light guide plate 30.

The planar lighting device 10 of the embodiment further includes the heat sink 64 connected to the bottom portion of the securing member 48a to absorb heat of the light source 28, and the heat pipe 66 disposed between the reflection plate 34 and the lower housing 42 and connected to the heat sink 64 to radiate heat.

The heat sink 64 absorbs heat radiated from the light source 28 through the securing member 48a to radiate heat or conduct heat to the heat pipe 66.

The heat pipe 66 radiates the heat conducted from the heat sink 64 connected to one end of the heat pipe 66 from the other end thereof.

By disposing the heat sink 64 and the heat pipe 66, the heat generated from the light source 28 can be efficiently transferred to the heat pipe 66 and radiated therefrom. Thus, since the light source is cooled even when light emission efficiency of the light source is low, the amount of light emitted from the light source can be increased, thereby achieving a large backlight unit. Cooling of the light source can further increase the amount of light emitted from the light source, thereby achieving a large backlight unit.

The heat sink may be cooled by a method not limited to the air-cooling method. A water-cooling method can also be used.

The power unit casing 49 (see FIG. 1) for holding a power source (not shown) of the light source is attached to the underside of the lower housing 42.

The planar lighting device 20 is basically configured as described above.

In the planar lighting device 20, light emitted by the light sources 28 provided on both sides of the light guide plate 30 strikes the light entrance planes, i.e., the first light entrance plane 30d and the second light entrance plane 30e, of the light guide plate 30 while light emitted by the auxiliary light sources 29 provided on the other two sides of the light guide plate 30 strikes the lateral planes, i.e., the first auxiliary light entrance plane 30h and the second auxiliary light entrance plane 30i. Then, the light admitted through the respective planes is scattered by scatterers contained inside the light guide plate 30 as will be described later in detail as the light travels through the inside of the light guide plate 30 and, directly or after being reflected by the first inclined plane 30b or the second inclined plane 30c, exits through the light exit plane 30a. In the process, part of the light leaking through the first inclined plane 30b and the second inclined plane 30c is reflected by the reflection plate 34 to enter the light guide plate 30 again.

Thus, light emitted through the light exit plane 30a of the light guide plate 30 is transmitted through the optical member 32 and emitted through the light emission plane 24a of the main body of the lighting device 24 to illuminate the liquid crystal display panel 12.

The liquid crystal display panel 12 uses the drive unit 14 to control the transmittance of the light according to the position so as to display characters, figures, images, etc. on its surface.

According to the embodiment, a warp of the light guide plate 30 caused by possible expansion/contraction thereof is precluded by providing the securing means 31 and the sliding mechanism 48 thereby to reduce brightness unevenness of light emitted through the light exit plane 30a of the light guide plate 30. The light guide plate 30 may have another configuration as illustrated in FIGS. 6A and 16B such that a light exit plane 100a of a light guide plate 100 is a curved plane curved downwardly or curved toward the inclined planes (reflection plate 34) from the light entrance planes toward the center or, more specifically, the light exit plane 100a may be a plane having the form of an arc in a plane perpendicular to the lines where the light entrance planes meet the light exit plane. Expressed otherwise, the light guide plate may be an inwardly curved plane having curved toward the reflection plate.

Thus, in case the light guide plate 100 expands/contracts to develop a warp, the light exit plane 100a of the light guide plate 100 warps so as to curve toward the reflection plate 34 (downward in the drawing) when the light guide plate 100 is adapted to have the inwardly curved light exit plane 100a curved toward the reflection plate 34. Accordingly, the light guide plate 100 warps away from the liquid crystal display panel, i.e., downward in the drawing, which prevents the light guide plate 100 from pushing up the liquid crystal display panel and thus prevents occurrence of uneven brightness in the light emitted from the liquid crystal display device in a more preferable manner.

The configuration according to the embodiment where the light exit plane 100a of the light guide plate is an inwardly curved plane curved toward the reflection plate 34 prevents the light exit plane from pushing up the liquid crystal display panel and thus prevents occurrence of uneven brightness that might be caused as the light guide plate touches the liquid crystal display panel should the light guide plate not be provided with the securing means and the sliding mechanism, although the distance between the light guide plate and the light sources then cannot be kept constant.

Figure 16A:
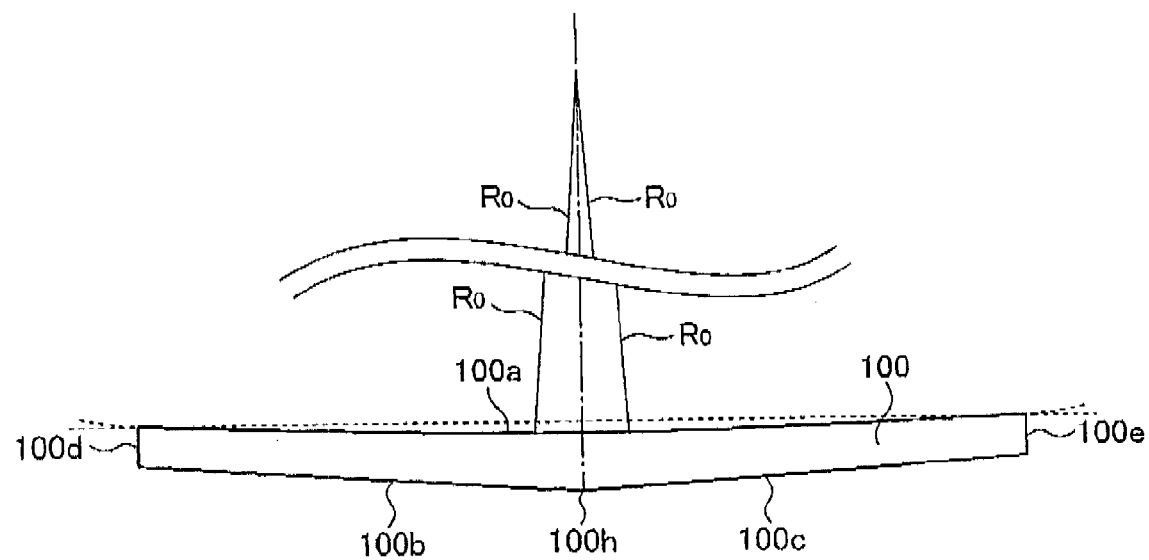
FIG. 16A is a schematic sectional view of another example of the light guide plate according to the invention.
Figure 16B:
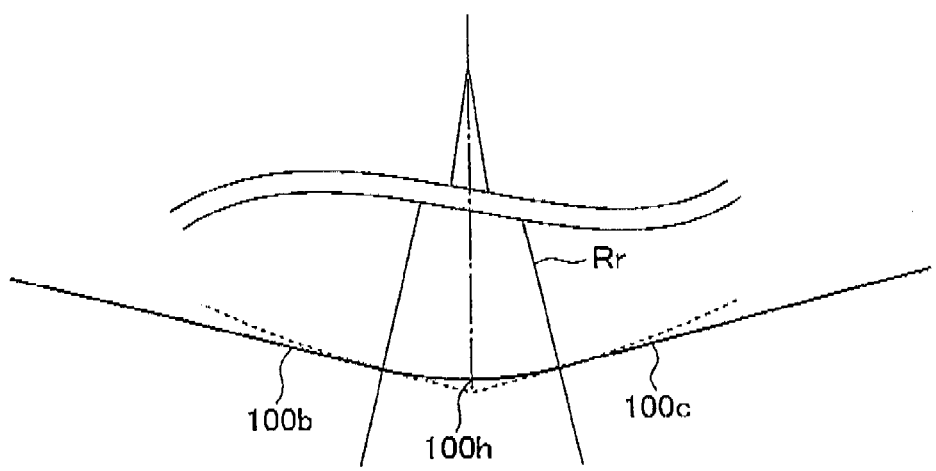
FIG. 16B is a sectional view illustrating, enlarged, part of the light guide plate of FIG. 16A.

Preferably, the radius of curvature Ro of the light exit plane 100a is greater than the radius of curvature Rr of the curved portion 100h as illustrated in FIGS. 16A and 16B, and is 55000 mm to 120000 mm both inclusive whereas the radius of curvature Rr of the curved portion 100h is 10000 mm to 55000 mm both inclusive.

Also when the light exit plane 101a of the light guide plate 100 is formed to be an inwardly curved plane curved toward the reflection plate, the angle formed by a tangent to the curved portion 100h at the joint where the inclined plane 100b joins the curved portion 100h and a tangent to the light exit plane 100a at the intersection where the light exit plane 100a meets a line passing through the joint and parallel to the light entrance planes can be made equivalent, by adapting the radii of curvature of the light exit plane 100a and the curved portion 100h to lie in the above respective ranges, to the angle as in the case of the light guide plate having a flat light exit plane in a preferable manner, thus allowing light to propagate deep into the light guide plate 100.

Preferably, the radius of curvature of the curved portion 100h is smaller than that in the case of the light guide plate having a flat light exit plane and having a same configuration except for the curved portion.

Preferably, the geometry other than the radius of curvature of the curved portion 100h, particle diameter, and particle density lie in similar ranges to those described earlier.

Where the light guide plate has a curved light exit plane as illustrated in FIG. 16, the angle formed by a line parallel to a tangent to the light exit plane 100a at one end thereof adjacent the light entrance plane 100d or 100e (i.e., the intersection where the light exit plane and the light entrance plane meets) and the inclined plane 100b (or the inclined plane 100c) is preferably 0.1° to 2.2° both inclusive.

Where the angle formed by the light exit plane 100a and the inclined plane 100b or 100c is 0.1° to 2.2° both inclusive, light admitted through the light entrance planes is allowed to reach still deeper into the light guide plate.

Where the light guide plate has a curved light exit plane, the angle formed by a tangent to the curved portion 100h at the joint between the inclined plane 100b or 100c and the curved portion 100h and a tangent to the light exit plane 100a at the intersection where the light exit plane 100a meets a straight line passing through the joint and parallel to the light entrance plane is preferably equivalent to the angle formed by a line parallel to the tangent to the light exit plane 100a at either end of the light exit plane adjacent the corresponding light entrance plane and the inclined plane 100b or 100c. The above tangents and angles formed by the lines are the tangents and the angles formed by the lines lying in a plane perpendicular to the lines where the light exit plane meets the light entrance planes. In the above case, the joints between the curved portion and the inclined lines need not necessarily provide smooth joints.

When the light guide plate has a configuration where the above two angles are equivalent, the reflection angle of the light inside the light guide plate can be equivalent to that in the case of the light guide plate having a flat light exit plane, and the optical path of the light admitted into the light guide plate can be equivalent to that in the case of the light guide plate having a flat light exit plane. Thus, the light guide plate having a curved light exit plane can emit light providing an intensity distribution equivalent to that in the case of the light guide plate having a flat light exit plane. Further, the intensity distribution equivalent to that in the case of the light guide plate having a flat light exit plane permits emission of light yielding an increased light use efficiency and representing a high middle-high ratio through the light exit plane.

When adapting the light exit plane to be a curved plane, it is preferable to determine the angle formed by a tangent to the curved plane at the joint between either inclined plane and the curved portion and a tangent to the light exit plane at the intersection where the light exit plane meets a straight line passing through the joint and parallel to the light entrance planes by using as a reference the light guide plate having a flat light exit plane and yielding a good light use efficiency and middle-high ratio.

Specifically, light use efficiency and middle-high ratio equivalent to those of the reference light guide plate having a flat light guide plate are achieved by adapting the angle formed by a tangent to the curved plane at the joint between either inclined plane and the curved portion and a tangent to the light exit plane at the intersection where the light exit plane meets a straight line passing through the joint and parallel to the light entrance planes to be greater than or equal to the angle formed by a line parallel to the light exit plane and a tangent to the curved plane at the joint between the curved portion and either inclined plane in the reference light guide plate having a flat light guide plate.

For example, the light guide plate may have a curved light exit plane measuring 42 inches with a radius of curvature of 75000 mm, a light guiding length L of 550 mm, a minimum thickness of 2 mm (at which light is admitted), and inclined planes having a taper angle of 0.42°. In another example, the light guide plate may have a light guiding length L of 550 mm, a minimum thickness of 2 mm (at which light is admitted), a light exit plane with a radius of curvature of 75000 mm, and inclined planes with a taper angle of 0.62° (since the inclination angle at the ends of the light exit plane having a radius of curvature of 75,000 mm is 0.2°, the angle at the ends of the light exit plane formed by a tangent to the light exit plane at the intersection where the light exit plane and either light entrance plane meet and the inclined planes is 0.42°), (the taper angle being the angles formed by the inclined planes and a plane parallel to the flat plane passing through the intersection where the light exit plane and the light entrance planes meet) by using a reference light guide plate having a radius of curvature of 15,000 mm, joints between the inclined planes and the curved portion located at a distance of 200 mm from the center of the light guide plate, a maximum thickness of 3.9 mm (thickness at the center), a light use efficiency of 60% and a middle-high ratio of 87%. Alternatively, the light guide plate may have a radius of curvature of 10,000 mm, joints between the inclined planes and the curved portion located at a distance of 200 mm from the center of the light guide plate, a maximum thickness of 3.9 mm (thickness at the center), and a maximum thickness of 3.9 mm (thickness at the center), with the angle formed by a tangent to the curved portion 100h at the joint between the inclined plane 100b or 100c and the curved portion 100h and a tangent to the light exit plane at the intersection where the light exit plane meets a straight, line passing through the joint and parallel to the light entrance planes greater than the angle formed, in the reference light guide plate, by a line parallel to the light exit plane and a tangent to the curved portion at the joint between the curved portion and the inclined planes, the angle making it easier for totally reflected light components to reach deeper into the light guide plate. Thus, the intensity distribution of the emitted light acquires a still more accentuated high-in-the-middle curve while the light use efficiency and the middle-high ratio can be equivalent to those yielded by a reference light guide plate having a flat light exit plane or, specifically, a light use efficiency of 60% and a middle-high ratio of 87% are achieved.

In the embodiment under discussion, the light exit plane 30a of the light guide plate 30 has the longer sides adjacent the light entrance planes and the shorter sides adjacent the lateral planes in order to emit light through the light exit plane with an enhanced brightness and efficiency. The invention, however, is not limited to such a configuration; the light exit plane may be formed into a square; or the sides thereof adjacent the light entrance planes may be the shorter sides and the sides thereof adjacent the lateral planes may be the longer sides.

The light guide plate may be fabricated by mixing a plasticizer into a transparent resin.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved surfaces.

Where the light guide plate is given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl) phthalate (DOP (DEHF)), di-n-octyl phthalate (DnOP), diisononyl phthalate (DINP), dinonyl phthalate (DNP), diisodecyl phthalate (DIDP), phthalate mixed-base ester (C6 to C11) (610P, 711P, etc.) and butyl benzyl phthalate (BBP). Besides phthalic acid esters, the plasticizer is also exemplified by dioctyl adipate (DOA), diisononyl adipate (DINA), dinormal alkyl adipate (C6, 8, 10) (610A), dialkyl adipate (C7, 9) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

While the inventive planar lighting device has been described above in detail, the invention is not limited in any manner to the above embodiment and various improvements and modifications may be made without departing from the spirit of the present invention.

Figure 17:
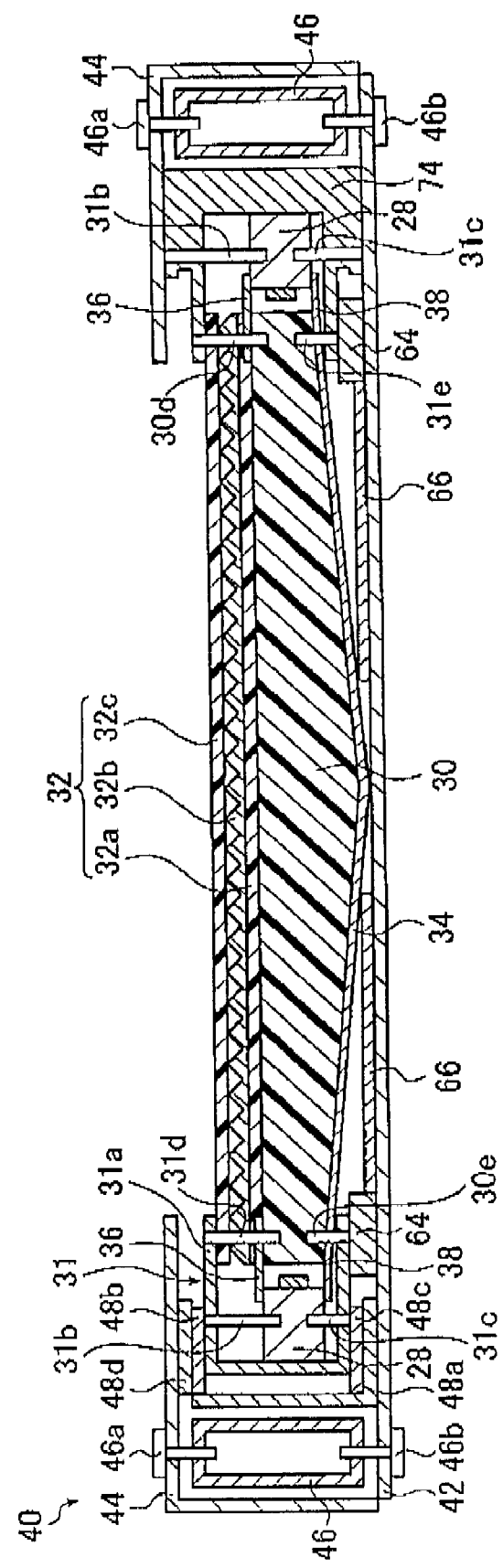
FIG. 17 is a schematic sectional view illustrating a configuration of another embodiment of the planar lighting device according to the invention.

Fox example, although, according to the above embodiment, the two securing means 31 (securing members 31a) provided on the side closer to the first light entrance plane 30d and the side closer to the second light entrance plane 30e of the light guide plate 30 are adapted to slide in the sliding mechanism 48 installed in the housing 40, the securing means 31 and the sliding mechanism 48 on one side may be integrated as a fixed end 74, and fixed to the housing 40 as illustrated in FIG. 17. Thus, positioning of the light guide plate 30 with respect to the housing 40 can be facilitated.

Figure 18:
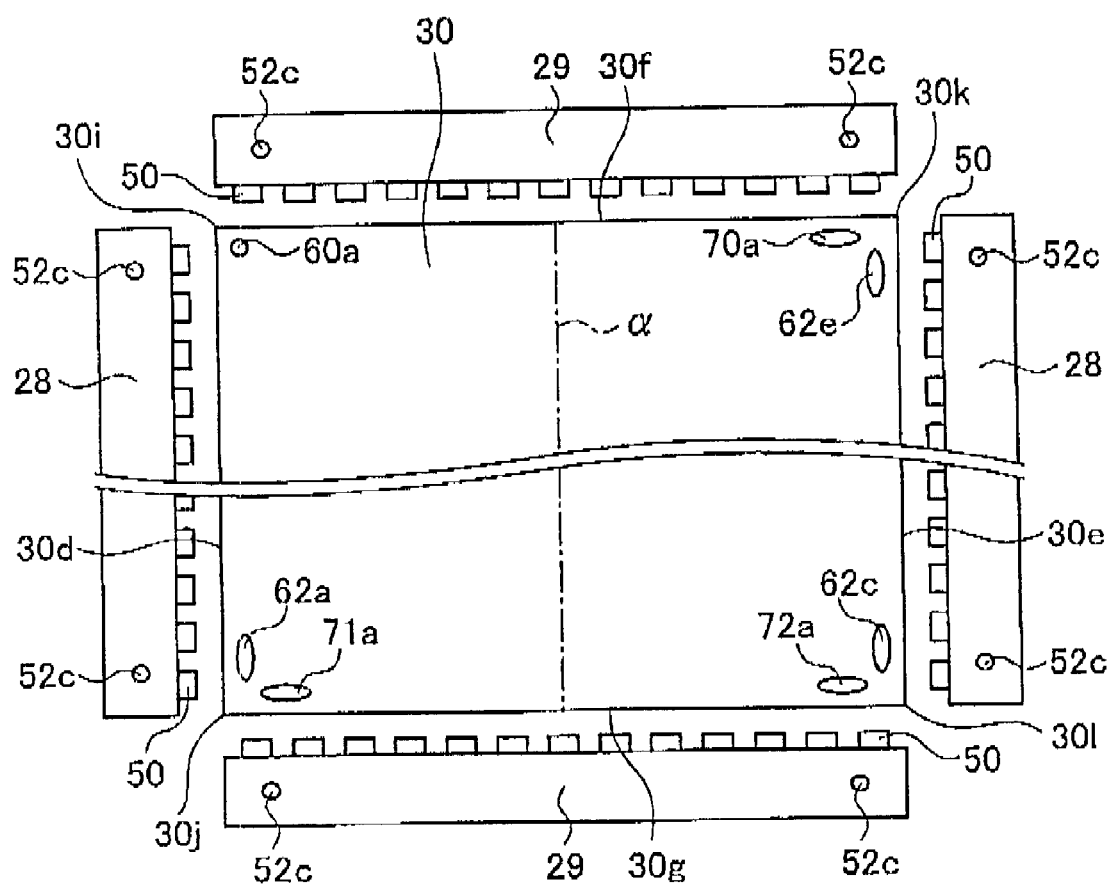
FIG. 18 is a schematic plan view illustrating a shape of another embodiment of the light guide plate and the light sources used in the planar lighting device according to the invention.

According to the embodiment, the light sources 28 are disposed only opposite the light entrance planes 30d and 30e. However, this arrangement is in no way limitative of the present invention. As illustrated in FIG. 18, the light sources 28 disposed opposite the light entrance planes 30d and 30e may be provided as main light sources, and auxiliary light sources 29 may be disposed opposite the first lateral plane 30g and the second lateral plane 30f such that the first lateral plane 30g and the second lateral plane 30f may be provided respectively as a third light entrance plane and a fourth light entrance plane. Thus, brightness of light emitted through the light exit planes can be further enhanced.

Also when the auxiliary light source 29 is provided, the securing means 31 and the sliding mechanism 48 are provide as in the case of the light source 28 illustrated in FIG. 2, and screw holes 52c and 52d are made in a light source support 52 as illustrated in FIG. 18. To keep constant a distance between the light source 28 and the light entrance planes 30d and 30e of the light guide plate 30 and a distance between the auxiliary light source 29 and the light entrance planes 30f and 30g of the light guide plate 30, a first circular hole 60a, a first long hole 62a, and a second long hole 62c are made in the corners 30i, 30j, and 30l of the light exit plane 30a of the light guide plate 30, and a fifth long hole 62e substantially similar in shape to the first long hole 62a and the second long hole 62c is made in place of the second circular hole 60c made in the corner 30k of the light guide plate 30. In addition, a sixth long hole 70a, a seventh long hole 71a, and an eighth long hole 72a each having longer diameters in a direction orthogonal to the longer diameters of the first long hole 62a, the second long hole 62c, and the fifth long hole 62e are respectively made in the corners 30k, 30j, and 30l of the light guide plate 30. Thus destruction of the main light sources 28 and the auxiliary light sources 29 caused by expansion/contraction of the light guide plate 30, a reduction of light admission efficiency to the light entrance planes by the main light sources 28 and the auxiliary light sources 29, brightness unevenness of light emitted from the light exit plane 30a can be prevented. Though not shown, circular holes and long holes are similarly made in the inclined planes 30b and 30c defining the rear planes of the light guide plate 30 in positions corresponding to the circular holes and the long holes made in the light exit plane 30a of the light guide plate 30.

In the example illustrated in FIG. 18, a third circular hole 61a, a third long hole 63a, and a fourth long hole 63b, though not shown, may be made in the light guide plate 30 to connect the light guide plate 30 to the upper housing 44 and the lower housing 42 of the housing 40 as in the case of the examples illustrated in FIGS. 4A and 6. Although the third circular hole 61a, the third long hole 63a, and the fourth long hole 63b illustrated in FIGS. 4A and 6 are through-holes, these holes may be two separate holes each made in the light exit plane 30a and the rear plane of the light guide plate 30.

The one circular hole 60a, six long holes 62a, 62c, 62e, 70a, 71a, and 72a described above and corresponding one circular hole and six long holes made in the rear plane are circular holes and long holes for securing the light guide plate 30 to the securing member 31a to integrate it with the main light sources 28 and the auxiliary light sources 29, and keeping constant the distance between the main light source 28 and the light entrance planes 30d and 30e of the light guide plate 30, and a distance between the auxiliary light source 29 and the light entrance planes obtained by substituting the light entrance planes 30f and 30g of the light guide plate 30. Thus, the circular holes and the long holes of the light exit plane 30a and the circular holes and the long holes of the rear plane may be through-holes, provided that they serve the above purpose.

Further, while each LED chip of the light sources is formed, for example, by applying YAG fluorescent substance to the light emission face of a blue LED, the LED chip may be formed otherwise without limitations to such a configuration. For example, the LED chip used herein may be formed using a different monochromatic LED such as a red LED or a green LED with a fluorescent substance.

Further, an LED unit formed using three kinds of LEDs, i.e., a red LED, a green LED, and a blue LED, may be used. In that case, light beams emitted by the three kinds of LEDs are blended to produce white light.

Alternatively, a semiconductor laser (LD) may be used instead of an LED.

Further, one may provide between the light guide plate 30 and each of the light sources (main light sources 28 and/or auxiliary light sources 29) a portion formed of a material having a refractive index close to that of the light guide plate 30. Alternatively, part of the light entrance planes and/or the lateral planes of the light guide plate may be formed of a material having a smaller refractive index than the other parts.

Where the part through which light emitted by the light source is admitted is adapted to have a smaller refractive index than the other parts, light emitted by the light source can be admitted more efficiently, and the light use efficiency can be further enhanced.

Further, two or more light guide plates may be juxtaposed by connecting their lateral planes to provide a single light exit plane formed by a plurality of light guide plates. In that case, the auxiliary light sources may be provided only on the lateral planes of the outermost light guide plates.

Now, the light guide plate having a flat light exit plane of the planar lighting device illustrated in FIG. 2 will be described referring to specific examples. The light guide plates referred to below do not have holes for connecting the light guide plate to the upper housing 42 and the lower housing 44 of the housing 40. Note, however, that basically the same light will be emitted through the light exit plane because the holes are made only in limited areas of the light guide plate.

In the measurements of the examples, the light sources 28 and the light guide plate 30 each having a configuration illustrated in FIG. 2 were used to find the light use efficiency [%] indicating the ratio of the light emitted through the light exit plane 30a to the light admitted through the two light entrance planes 30d and 30e and the brightness distribution of the light emitted through the light exit plane 30a in order to obtain the middle-high ratio[%] expressed by the brightness distribution observed at the light exit plane 30a indicating the ratio of brightness of the light emitted from an area about the center of the light exit plane 30a to the light emitted at the periphery, i.e., areas close to the light entrance planes 30d and 30e, by varying the light guiding length [mm], the shape, i.e., the maximum thickness [mm], the minimum thickness [mm], the taper, and the radius of curvature R of the central curved portion of the light guide plate 30, and the particle diameter [µm] and the particle density [wt %] of the scattering particles dispersed in the light guide plate 30.

EXAMPLES

Example 1

In Example 1, the light guide plate 30 having a light guiding length L of 480 mm for a screen size of 37 inches was used to obtain the taper, the radius of curvature R of the central portion (curved portion) [mm], the light use efficiency [%], and the middle-high ratio [%] by varying the maximum thickness [mm], the minimum thickness [mm], the particle diameter [µm], and the particle density [wt %] as shown in Tables 5 and 6. Tables 5 and 6 show the results.

Table 5 shows examples 11 to 16 according to the invention related to Example 1; Table 6 shows Comparative Examples 11 to 15 related to Example 1.

TABLE 5

| | Example 1 | | | | | |
|---|---|---|---|---|---|---|
| | Examples according to the invention | | | | | |
| | 11 | 12 | 13 | 14 | 15 | 16 |
| Screen size | 37" | 37" | 37" | 37" | 37" | 37" |
| Light guiding length [mm] | 480 | 480 | 480 | 480 | 480 | 480 |
| Maximum thickness [mm] | 3.48 | 1.49 | 3.51 | 3.48 | 3.48 | 3.48 |
| Minimum thickness [mm] | 2 | 0.5 | 1 | 2 | 2 | 2 |
| Particle diameter [µm] | 7 | 7 | 7 | 4.5 | 9 | 12 |
| Particle density [wt %] | 0.065 | 0.049 | 0.097 | 0.047 | 0.084 | 0.122 |
| Taper | 0.477 | 0.358 | 0.716 | 0.477 | 0.477 | 0.477 |
| Central portion R [mm] | 15000 | 27000 | 7000 | 15000 | 15000 | 15000 |
| Light use efficiency [%] | 61.5 | 63 | 65 | 61.2 | 61.6 | 61.5 |
| Middle-high ratio [%] | 19 | 22 | 23 | 19 | 19.2 | 19.2 |

TABLE 6

Comparative Example

| | Comparative examples | | | | | |
|---|---|---|---|---|---|---|
| | 11 | 12 | 13 | 14 | 15 | 16 |
| Screen size | 37" | 37" | 37" | 37" | 37" | 37" |
| Light guiding length [mm] | 480 | 480 | 480 | 480 | 480 | 480 |
| Maximum thickness [mm] | 3.48 | 6.48 | 1.2 | 1.45 | 3.48 | 3.48 |
| Minimum thickness [mm] | 2 | 5 | 1 | 1 | 2 | 2 |
| Particle diameter [μm] | 7 | 7 | 7 | 7 | 2 | 15 |
| Particle density [wt %] | 0.25 | 0.065 | 0.25 | 0.032 | 0.035 | 0.178 |
| Taper | 0.477 | 0.477 | 0.095 | 0.233 | 0.477 | 0.477 |
| Central portion R [mm] | 15000 | 15000 | 144000 | 57000 | 15000 | 15000 |
| Light use efficiency [%] | 62 | 50 | 62 | 52 | 63 | 51 |
| Middle-high ratio [%] | −6.1 | 5 | −15 | 8 | −8 | 9 |

As will be apparent from Tables 5 and 6, the particle diameter [μm] and the particle density [wt %] of Examples 11 to 16 according to the invention are all within the limited ranges as set according to the invention as are the maximum thickness [mm] and the minimum thickness [mm]. Thus, the light use efficiency [%] is greater than 61%, hence greater than 55% and the middle-high ratio [%] is in a range of 19% to 23%, meeting the range as set according to the invention, i.e., 0% exclusive to 25% inclusive.

In contrast, Comparative Example 11 fails to achieve a high-in-the-middle brightness distribution because the particle density is greater than the range as set according to the invention and, therefore, like phenomena occur as in the case of the flat light guide plate.

Comparative Example 12, having a maximum thickness [mm] and a minimum thickness [mm] both over the upper limits of 6.0 mm and 3.0 mm, respectively, allows light to pass through the light guide plate and therefore yields a light use efficiency of only 50%, failing to meet the limited range of 55% or greater. In addition, Comparative Example 12 is not suitable for use as an optical member for liquid crystal televisions because of its excessive weight.

Comparative Example 13 has a taper angle of smaller than 0.1°, which is below the limited range as set according to the invention, and the central curved portion thereof has an excessively great radius of curvature R no longer suitable for molding. In addition, Comparative Example 13 fails to achieve a high-in-the-middle distribution at a particle density yielding a light use efficiency of 55% or greater.

Comparative Example 14, comparable to a flat plate, has an excessively great radius of curvature R no longer suitable for molding and fails to yield a light use efficiency of 55% or greater at a particle density achieving a high-in-the-middle distribution.

Comparative Example 15, containing particles having a diameter below the limited range as set according to the invention, yields a high light use efficiency but fails to achieve a high-in-the-middle brightness distribution, whereas Comparative Example 16, containing particles having a diameter above the limited range as set according to the invention, achieves a high-in-the-middle brightness distribution but yields a low light use efficiency.

Example 2

In Example 2, light guide plates 30 having light guiding lengths L of 560 mm and 590 mm for screen sizes of 42 inches and 46 inches, respectively, were used to obtain the taper, the radius of curvature R of the central portion (curved portion), the light use efficiency [%], and the middle-high ratio [%] by varying the maximum thickness [mm], the minimum thickness [mm], the particle diameter [μm], and the particle density [wt %] as shown in Tables 7 and 8. Tables 7 and show the results.

Table 7 shows examples 21 to 24 according to the invention related to Example 2; Table 8 shows Comparative Examples 21 to 23 related to Example 2.

TABLE 7

Example 2

| | Examples according to the invention | | | |
|---|---|---|---|---|
| | 21 | 22 | 23 | 24 |
| Screen size | 42" | 46" | 42" | 46" |
| Light guiding length [mm] | 560 | 590 | 560 | 590 |
| Maximum thickness [mm] | 3.48 | 3.48 | 3.48 | 3.5 |
| Minimum thickness [mm] | 2 | 2 | 2 | 1.5 |
| Particle diameter [μm] | 7 | 7 | 12 | 7 |
| Particle density [wt %] | 0.048 | 0.043 | 0.09 | 0.054 |
| Taper | 0.411 | 0.39 | 0.411 | 0.486 |
| Central portion R [mm] | 20000 | 22000 | 20000 | 15000 |
| Light use efficiency [%] | 61 | 61 | 61 | 59 |
| Middle-high ratio [%] | 15 | 14.5 | 15 | 14 |

TABLE 8

| | Comparative Example | | |
|---|---|---|---|
| | 21 | 22 | 23 |
| Screen size | 42" | 46" | 42" |
| Light guiding length [mm] | 560 | 590 | 560 |
| Maximum thickness [mm] | 3.48 | 3.48 | 6.76 |
| Minimum thickness [mm] | 2 | 2 | 1 |
| Particle diameter [µm] | 7 | 7 | 7 |
| Particle density [wt %] | 0.148 | 0.133 | 0.085 |
| Taper | 0.411 | 0.39 | 1.228 |
| Central portion R [mm] | 20000 | 22000 | 3500 |
| Light use efficiency [%] | 63 | 63 | 58 |
| Middle-high ratio [%] | −8.5 | −9.5 | 29 |

As will be apparent from Tables 7 and 8, the particle diameter [µm] and the particle density [wt %] of Examples 21 to 24 according to the invention are all within the limited ranges as set according to the invention as are the maximum thickness [mm] and the minimum thickness [mm]. Thus, the light use efficiency [%] is in a range of % to 61%, hence greater than 55%, in all the examples according to the invention, and the middle-high ratio [%] is in a range of 14% to 15%, meeting the range as set according to the invention, i.e., 0% exclusive to 25% inclusive.

In contrast, Comparative Examples 21 and 22 fail to achieve a high-in-the-middle brightness distribution because the particle density is greater than the range as set according to the invention and, therefore, like phenomena occur as in the case of the flat light guide plate.

Comparative Example 23, having a maximum thickness [mm] and a taper angle both over the upper limits of 6.0 mm and 0.8°, respectively, such that the excessively great taper makes the maximum thickness greater than is required, resulting in not only an overly accentuated high-in-the-middle distribution curve but an excessive weight unsuitable for use as an optical member in liquid crystal televisions.

Example 3

In Example 3, light guide plates 30 having light guiding lengths L of 660 mm and 730 mm for screen sizes of 52 inches and 57 inches, respectively, were used to obtain the taper, the radius of curvature R of the central portion (curved portion), the light use efficiency [%], and the middle-high ratio [%] by varying the maximum thickness [mm], the minimum thickness [mm], the particle diameter [µm], and the particle density [wt %] as shown in Tables 9 and 10. Tables 9 and 10 show the results.

Table 9 shows examples 31 and 32 according to the invention related to Example 3; Table 10 shows Comparative Examples 31 to 35 related to Example 3.

TABLE 9

| | Example 3 | |
|---|---|---|
| | Example according to the invention | |
| | 31 | 32 |
| Screen size | 52" | 57" |
| Light guiding length [mm] | 660 | 730 |
| Maximum thickness [mm] | 3.5 | 3.48 |
| Minimum thickness [mm] | 2 | 2 |
| Particle diameter [µm] | 7 | 7 |
| Particle density [wt %] | 0.035 | 0.028 |
| Taper | 0.351 | 0.317 |
| Central portion R [mm] | 28000 | 33000 |
| Light use efficiency [%] | 60 | 61 |
| Middle-high ratio [%] | 14 | 14.2 |

TABLE 10

| | Comparative Example | | | | |
|---|---|---|---|---|---|
| | 31 | 32 | 33 | 34 | 35 |
| Screen size | 52" | 57" | 52" | 52" | 57" |
| Light guiding length [mm] | 660 | 730 | 660 | 660 | 730 |
| Maximum thickness [mm] | 3.5 | 3.48 | 5.49 | 2.15 | 3.24 |
| Minimum thickness [mm] | 2 | 2 | 0.5 | 1.9 | 3 |
| Particle diameter [µm] | 7 | 7 | 7 | 7 | 7 |
| Particle density [wt %] | 0.107 | 0.008 | 0.045 | 0.02 | 0.0015 |
| Taper | 0.351 | 0.317 | 0.955 | 0.087 | 0.078 |
| Central portion R [mm] | 28000 | 33000 | 3800 | 220000 | 260000 |
| Light use efficiency [%] | 63 | 42 | 59 | 61 | 42 |
| Middle-high ratio [%] | −11.2 | 11 | 30 | −8 | 56 |

As will be apparent from Tables 9 and 10, the particle diameter [µm] and the particle density [wt %] of Examples 31 to 32 according to the invention are all within the limited ranges as set according to the invention as are the maximum thickness [mm] and the minimum thickness [mm]. Thus, the light use efficiency [%] is in a range of 60% to 61%, hence greater than 55%, in all the examples, and the middle-high ratio [%] is in a range of 14% to 14.2%, meeting the range as set according to the invention, i.e., 0% exclusive to 25% inclusive.

In contrast, Comparative Example 31 fails to achieve a high-in-the-middle brightness distribution because the particle density is greater than the range as set according to the invention and, therefore, like phenomena occur as in the case of the flat light guide plate.

Comparative Example 32 has a particle density lower than the limited range as set according to the invention, allowing light to pass through the light guide plate, and therefore fails to yield a light use efficiency required to be at least 55%.

Comparative Example 33 has a taper angle exceeding the upper limit 0.8° of the limited range as set according to the invention and exhibits an overly accentuated high-in-the-middle distribution curve.

Comparative Examples 34 and 35 have a taper angle below the lower limit 0.1 of the limited range as set according to the invention, making the radius of curvature R of the central curved portion excessively great and hence unsuitable for molding. Comparative Example 34 fails to achieve a high-in-the-middle distribution at a particle density yielding a light use efficiency of 55% or greater. Comparative Example 35, comparable to a flat plate, fails to yield a light use efficiency of 55% or greater at a particle density achieving a high-in-the-middle distribution.

Example 4

In Example 4, light guide plates 30 having light guiding lengths L of 660 mm and 730 mm for screen sizes of 52 inches and 57 inches, respectively, were used to obtain the taper, the radius of curvature R of the central portion (curved portion), the light use efficiency [%], and the middle-high ratio [%] by varying the maximum thickness [mm], the minimum thickness [mm], the particle diameter [μm], and the particle density [wt %] as shown in Tables 9 and 10. Tables 9 and 10 show the results.

Table 11 shows examples 41 and 44 according to the invention related to Example 4; Table 12 shows Comparative Examples 41 to 45 related to Example 4.

TABLE 11

Example 4

| | Example according to the invention | | | |
|---|---|---|---|---|
| | 21 | 22 | 23 | 24 |
| Screen size | 42" | 46" | 42" | 46" |
| Light guiding length [mm] | 560 | 590 | 560 | 590 |
| Maximum thickness [mm] | 3.48 | 3.48 | 3.48 | 3.5 |
| Minimum thickness [mm] | 2 | 2 | 2 | 1.5 |
| Particle diameter [μm] | 7 | 7 | 12 | 7 |
| Particle density [wt %] | 0.048 | 0.043 | 0.09 | 0.054 |
| Taper | 0.411 | 0.39 | 0.411 | 0.486 |
| Central portion R [mm] | 20000 | 22000 | 20000 | 15000 |

TABLE 11-continued

Example 4

| | Example according to the invention | | | |
|---|---|---|---|---|
| | 21 | 22 | 23 | 24 |
| Light use efficiency [%] | 61 | 61 | 61 | 59 |
| Middle-high ratio [%] | 15 | 14.5 | 15 | 14 |

TABLE 12

Comparative Example

| | Comparative example | | |
|---|---|---|---|
| | 21 | 22 | 23 |
| Screen size | 42" | 46" | 42" |
| Light guiding length [mm] | 560 | 590 | 560 |
| Maximum thickness [mm] | 3.48 | 3.48 | 6.76 |
| Minimum thickness [mm] | 2 | 2 | 1 |
| Particle diameter [μm] | 7 | 7 | 7 |
| Particle density [wt %] | 0.148 | 0.133 | 0.085 |
| Taper | 0.411 | 0.39 | 1.228 |
| Central portion R [mm] | 20000 | 22000 | 3500 |
| Light use efficiency [%] | 63 | 63 | 58 |
| Middle-high ratio [%] | −8.5 | −9.5 | 29 |

As will be apparent from Tables 11 and 12, the particle diameter [μm] and the particle density [wt %] of Examples 41 to 44 according to the invention are all within the limited ranges as set according to the invention as are the maximum thickness [mm] and the minimum thickness [mm]. Thus, the light use efficiency [%] is in a range of 57% to 68%, hence greater than 55%, in all the examples, and the middle-high ratio [%] is in a range of 11% to 24%, meeting the range as set according to the invention, i.e., 0% exclusive to 25% inclusive.

In contrast, Comparative Example 41 has a particle density below the limited range as set according to the invention, allowing light to pass through the light guide plate, and therefore fails to meet the condition for the light use efficiency, which is required to be at least 55%.

Comparative Example 42 has a maximum thickness [mm] and a minimum thickness both over the upper limits of 6.0 mm and 3.0 mm, respectively, and therefore allows light to pass through the light guide plate, resulting in a low light use efficiency of 50%, which fails to meet the condition of 55% or greater, and an excessive weight unsuitable for use as an optical member in liquid crystal televisions.

Comparative Example 43 has a maximum thickness [mm] less than the lower limit 1.0 mm of the limited range as set according to the invention, making the radius of curvature R of the central curved portion excessively great beyond the limited range as set according to the invention and hence unsuitable for molding and fails to achieve a high-in-the-middle distribution at a particle density yielding a light use efficiency of 55% or greater.

Comparative Example 44, containing particles having a diameter below the limited range as set according to the invention, yields a high light use efficiency but fails to achieve a high-in-the-middle brightness distribution whereas Comparative Example 45, containing particles having a diameter over the limited range as set according to the invention, achieves a high-in-the-middle brightness distribution but yields only a low light use efficiency.

The results described above will show that all the examples according to the invention have an appropriate shape for each range of the light guiding length of the light guide plate; have a maximum thickness [mm], a minimum thickness [mm], a taper, a radius of curvature R of the central curved portion, and a particle diameter [μm] and a particle density [wt %] of the scattering particles dispersed in the light guide plate all meeting the limited ranges as set according to the invention; yield a light use efficiency [%] of 55% or greater; and achieve the middle-high ratio [%] in the range of 0% exclusive to 25% inclusive. Thus, all the examples according to the invention possess excellent properties.

In contrast, all the Comparative Examples fail to meet the limited range of at least one of the above conditions as set according to the invention, failing to meet the condition for the light use efficiency [%], which is required to be 55% or greater, nor do they meet the condition for the middle-high ratio [%], which is required to be in the range of 0% exclusive to 25% inclusive. Thus, the above Comparative Examples all fail to exhibit excellent properties.

The effects of the present invention will be apparent from the above description.

In the above embodiments, the securing means 31 is allowed to slide in the sliding mechanism 48 such that the light sources 28 remain in position with respect to the light exit plane 30a in a direction perpendicular to the light exit plane by means of the fastener pin 31d in case the light guide plate is deformed. The invention is not limited thereto, however. In place of or in addition to the sliding mechanism and the fastener pin, guide means may be provided to hold one of the light sources in position to prevent displacement in a direction perpendicular to the light exit plane 30a.

Now, another embodiment of the invention will be described referring to FIG. 19.

Figure 19A:
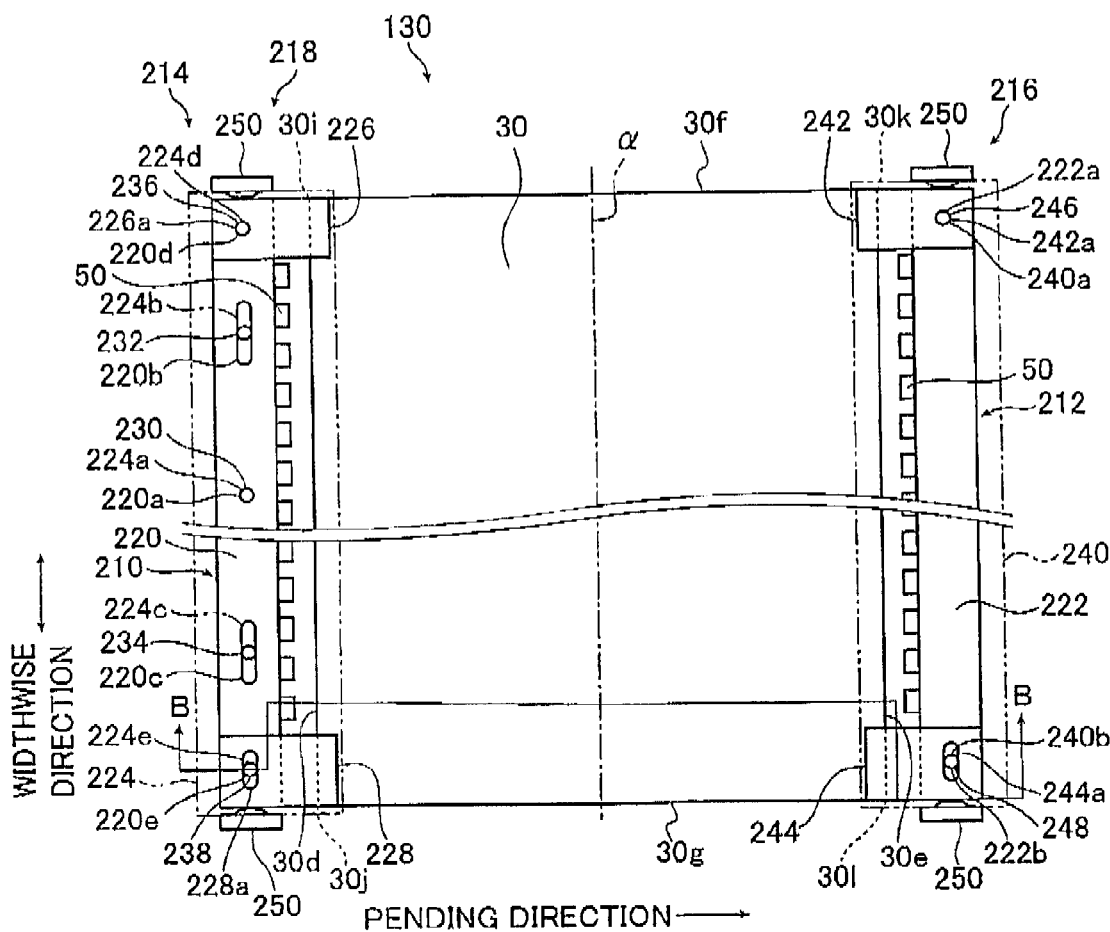
FIG. 19A is a schematic plan view illustrating light sources, light guide plate, reinforcing members, and guide means of another example of the planar lighting device as partially omitted.
Figure 19B:
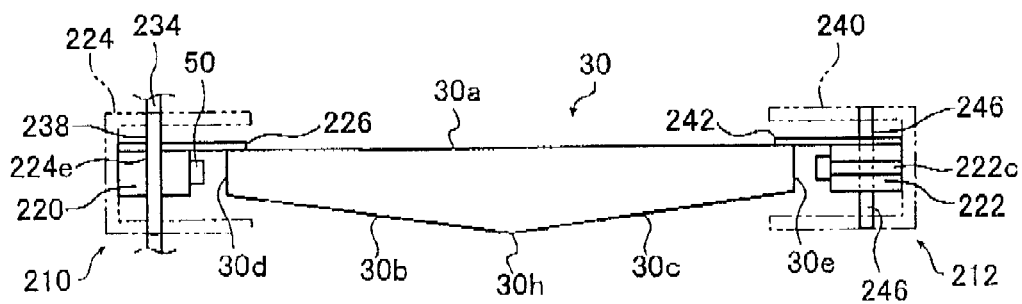
FIG. 19B is a sectional view taken along line B-B of FIG. 19A.

FIG. 19A is a schematic top plan view illustrating, partly omitted, light sources, a light guide plate, reinforcing members, and guide means of a planar lighting device 130; FIG. 19B is a sectional view taken along line B-B of FIG. 19A. The planar lighting device 130, an embodiment now to be described, is represented in FIG. 19A such that it is installed with the left-hand side facing upward.

The planar lighting device 130 illustrated in FIG. 19A comprises an upper main light source 210, a lower main light source 212, a light guide plate 30, first securing means (upper securing means) 214, second securing means (lower securing means) 216, and guide means 218. The planar lighting device 130 also comprises, though not shown, the optical member unit, the reflection plate, the lower housing, the upper housing, and the reinforcing members (housing reinforcing members) as does the planar lighting device 10. Description of the light guide plate 30, having basically the same configuration as the backlight unit 20 described earlier, will not be repeated here. As illustrated in FIG. 19A, the light guide plate 30 is installed such that the first light entrance plane 30d is positioned above the second light entrance plane 30e in vertical direction.

The upper main light source 210 is disposed opposite the first light entrance plane 30d of the light guide plate 30, and the lower main light source 212 is disposed opposite the second light entrance plane 30e of the light guide plate 30. Since the light guide plate 30 is installed such that the first light entrance plane 30d is positioned above the second light entrance plane 30e, the upper main light source 210 is disposed above the lower main light source 212 in a vertical direction.

The upper main light source 210 comprises LED chips 50 and a light source support 220, which carries on its plane opposite the first light entrance plane 30d the LED chips 50 arranged in a row.

The lower main light source 212 comprises LED chips 50 and a light source support 222, which carries on its plane opposite the second light entrance plane 30e the LED chips 50 arranged in a row. The light source supports 220 and 222 according to the embodiment under discussion are each formed of a plate member. The light source supports 220 and 222 of the upper main light source 210 and the lower main light source 212 each carry LEDs arrayed from one end to the other throughout the length thereof (region corresponding to the reinforcing members to be described).

The light source support 220 has a circular hole 220a and two long holes 220b and 220c to be fitted with three fastener pins that are secured to a housing to be described. The circular hole 220a is made at the center of a plane that is parallel to the light exit plane 30a. The two long holes 220b and 220c are provided at a given distance from the circular hole 220a with their longer diameters aligned with the longitudinal direction of the light source support 220. The long hole 220b and the long hole 220c are formed to be symmetrical to a plane passing through the circular hole 220a and perpendicular to the bisector α of the light guide plate.

The light source support 220 further comprises near one end in its longitudinal direction a circular hole 220d to be fitted with a fastener pin 236 to be described and near the other end a long hole 220e to be fitted with a fastener pin 238 to be described.

The light source support 222 further comprises near one end in its longitudinal direction a circular hole 220d to be fitted with a fastener pin 246 to be described and near the other end a long hole 220e to be fitted with a fastener pin 248 to be described.

The first securing means 214 comprises a fixed end 224, first reinforcing members 226 and 228, and fastener pins 230, 232, 234, 236, and 238.

The fixed end 224 is a columnar member having a U-shaped sectional profile as is the fixed end 74 described earlier and is pressed by the lower housing and the tipper housing so as to be held by the housing. Further, the fixed end 224 is held by the lower housing and the upper housing so as to be slidable in the longitudinal direction.

The fixed end 224 houses the upper main light source 210 in its U-shaped space and has circular holes 224a, 224d, 224e and long holes 224b and 224c formed therein that correspond to the circular holes 220a, 220d, 220e and long holes 220b and 220c formed in the light source support 220 of the upper main light source 210.

The first reinforcing member 226 is a plate member having one end thereof closer to the first light entrance plane 30d secured to the light exit plane 30a near the corner 30j of the light guide plate the other end extending outwardly from the light exit plane 30a extends to a position opposite the light source support 220. The first reinforcing member 226 has a circular hole 226a made in a position corresponding to the circular hole 220d.

The first reinforcing member 228 is a plate member having one end thereof closer to the first light entrance plane 30d secured to the light exit plane 30a near the corner 30j of the light guide plate, with the other end extending outwardly from the light exit plane 30a.

The first reinforcing member 228 extends from the light exit plane 30a to a position opposite the light source support 220 and has a long hole 228a made in a position corresponding to the circular hole 220e such that the longer diameter thereof extends parallel to the longitudinal direction of the light source support 220.

The first reinforcing member 226 and the first reinforcing member 228 are secured to the light guide plate with an adhesive according to the embodiment under discussion. The first reinforcing members are preferably formed of a super engineer plastic or a metal. The metals that may be used here include aluminum alloy and stainless steel. The first reinforcing members formed of a super engineer plastic or a metal has an increased rigidity and is resistant to deformation caused, for example, by humidity and heat.

Although the reinforcing members are attached to the light exit plane of the light guide plate according to the embodiment under discussion, the example is not limitative; the reinforcing members may be attached to the rear side of the light guide plate, i.e., the first inclined plane and the second inclined plane. Alternatively, the reinforcing members may be provided on both sides, by attaching them to the light exit plane and the rear side. The reinforcing members provided on both sides, attached to the light exit plane and the rear side, provide support for the light guide plate and prevention of deformation and break of the light guide plate with increased certainty.

The fastener pin 230 is fixed to the housing and inserted through the circular hole 220a of the light source support 220 and the circular hole 224a of the fixed end 224.

The fastener pin 232 is fixed to the housing and inserted through the circular hole 220b of the light source support 220 and the long hole 224b of the fixed end 224. The fastener pin 234 is fixed to the housing and inserted through the long hole 220c of the light source support 220 and the long hole 224c of the fixed end 224.

The fastener pin 236 is inserted through the circular hole 220d of the light source support 220 and the circular hole 224d of the fixed end 224 to be secured. The fastener pin 236 is also inserted through the circular hole 226a of the first reinforcing member 226 that is provided between the light source support 220 and the fixed end 224.

The fastener pin 238 is inserted through the circular hole 220e of the light source support 220 and the circular hole 224e of the fixed end 224 to be secured. The fastener pin 238 is also inserted through the long hole 228a of the first reinforcing member 228 that is provided between the light source support 220 and the fixed end 224.

The first securing means 214 is configured as described above. Accordingly, the fastener pin 236 is inserted through the circular hole 226a of the first reinforcing member 226 to fix the position of the first reinforcing member 226 secured to the light guide plate 30 in a direction parallel to the line where the first light entrance plane 30d and the light exit plane 30a meet; the fastener pin 238 is inserted through the long hole 228a of the first reinforcing member 228 such that the first reinforcing member 228 is movable in a direction parallel to the line where the first light entrance plane 30d and the light exit plane 30a meet; thus the light guide plate 30 can be supported free to expand and contract with respect to the upper main light source 210 and the fixed end 224 in a direction parallel to the line where the first light entrance plane 30d and the light exit plane 30a meet. Further, the first reinforcing member 226 and the first reinforcing member 228 keep the distance between the upper main light source 210 and the first light entrance plane 30d constant in a direction perpendicular to the first light entrance plane 30d. Thus, the distance between the upper main light source 210 and the first light entrance plane 30d can be kept constant.

The light source support 220 and the fixed end 224 is secured to the housing so as to be capable of expanding and contracting with respect to the housing in a direction parallel to the line where the first light entrance plane 30d and the light exit plane 30a meet. This is achieved by adapting the holes provided in the light source support 220 and the fixed end 224 for inserting the fastener pin 230 therethrough to be circular holes and the holes for inserting the fastener pins 232 and 234 to be long holes. Further, since the light source support 220 and the fixed end 224 are secured to the housing so as to be capable of expanding and contracting, the expansion and contraction are limited and thus development of warps in the light source support 220 and the fixed end 224 is prevented.

According to the embodiment under discussion, although the fixed end is held by the housing by urging the fixed end 224 onto the lower housing and the upper housing as well as by means of the fastener pins, the fixed end may be held such that it is not held by the housing except with the fastener pins.

The fastener pins may vary in diameter, have a tapered shape or be provided with a stopper depending upon the locations where they are used in order to prevent displacement of the light source support, the first reinforcing members and the fixed ends with respect to the fastener pins. Further, the fastener pins may be adapted to be slidable with respect to the long holes and tightly fitted in the circular holes to prevent displacement.

The securing means 216 comprises a securing member 240, second reinforcing members 242, 244, and fastener pins 246, 248.

The securing member 240 is movably provided with respect to the housing. The securing member 240 is a columnar member having a U-shaped sectional profile and houses the lower main light source 212. The securing member 240 secures the lower main light source 212 to a given position inside the securing member 240 with fastener pins 246, 248 to be described.

The securing member 240 has circular holes 240a, 240b formed therein corresponding to the circular holes 222a, 220b provided in the light source support 222 of the lower light source 212.

The second reinforcing members 242 is a plate member having one end thereof closer to the second entrance plane 30e secured to the light exit plane 30a near the corner 30k of the light guide plate, with the other end extending outwardly from the light exit plane 30a. The second reinforcing members 242 extends from the light exit plane 30a to a position opposite the light source support 222 and has a circular hole 242a made in a position corresponding to the circular hole 222a.

The second reinforcing members 244 is a plate member having one end thereof closer to the second entrance plane 30e secured to the light exit plane 30a near the corner 30l of the light guide plate, with the other end extending outwardly from the light exit plane 30a. The second reinforcing members 244 extends from the light exit plane 30a to a position opposite the light source support 222 and has a long hole 244a made in a position corresponding to the circular hole 222b such that the longer diameter thereof extends parallel to the longitudinal direction of the light source support 220.

The second reinforcing member 242 and the second reinforcing member 244 are configured in substantially the same manner as the first reinforcing members described earlier; the second reinforcing members 242, 244 are secured to the light guide plate with an adhesive according to the embodiment under discussion.

The fastener pin 246 is inserted through the circular hole 222a of the light source support 222 and the circular hole 220a of the securing member 240 to be secured. The fastener pin 246 is also inserted through the circular hole 242a of the second reinforcing member 242 that is provided between the light source support 222 and the securing member 240.

The fastener pin 248 is inserted through the circular hole 222b of the light source support 222 and the circular hole 240b of the securing member 240 to be secured. The fastener pin 246 is also inserted through the long hole 242a of the second reinforcing member 242 that is provided between the light source support 222 and the securing member 240.

The second securing means 216 is configured as described above. Accordingly, the fastener pin 246 is inserted through the circular hole 242a of the second reinforcing member 242 to fix the position of the second reinforcing member 242 secured to the light guide plate 30 in a direction parallel to the line where the second light entrance plane 30e and the light exit plane 30a meet; the fastener pin 248 is inserted through the long hole 2-44a of the second reinforcing member 244 such that the second reinforcing member 244 is movable in a direction parallel to the line where the second light entrance plane 30e and the light exit plane 30a meet; thus the light guide plate 30 can be supported free to expand and contract with respect to the lower main light source 212 and the securing member 240 in a direction parallel to the line where the second light entrance plane 30e and the light exit plane 30a meet (i.e., vertical direction). Further, the second reinforcing member 242 and the second reinforcing member 244 keep the distance between the lower main light source 212 and the second light entrance plane 30e constant in a direction perpendicular to the light entrance plane 30e. Thus, the distance between the lower main light source 212 and the second light entrance plane 30e can be kept constant.

In case of expansion or contraction in a direction vertical to the second light entrance plane 30e of the light guide plate 30, i.e., in vertical direction according to the embodiment under discussion, the second securing means 218 supporting the lower main light source 212, which is movably provided with respect to the housing, can move together with the lower main light source 212 while keeping the distance between the second light entrance plane 30e and the lower main light source 212 constant as the light guide plate expands or contracts. Accordingly, the expansion and contraction of the light guide plate is limited to prevent warps of the light guide plate attributable to stresses that could be applied to the light guide plate while the distance between the light source and the light entrance plane can be kept constant.

Thus, even when the light guide plate expands in vertical direction because of its own weight, temperature, or other causes, the second securing means 216, adapted to move as the light guide plate expands and contracts, limits the expansion and thus prevents warps of the light guide plate.

The guide means 218 comprises four guide members 250. The four guide members 250 are disposed opposite two end faces located at both longitudinal ends of the light source support 220 and the two longitudinal end faces of the light source support 222, respectively. The guide members 250 are in contact with surfaces of the opposite light source supports and support the opposite light source supports so as to be slidable in a direction parallel to the light exit plane and immovable in a direction perpendicular to the light exit plane.

The guide members 250 are secured to their given positions of the housing.

Now, the guide members 250 will be described in more detail. The guide members 250 share the same shape and the same function. Thus, description will be made of one of the guide members 250 located at one longitudinal end of the light source support 222 as a representative.

Figure 20A:
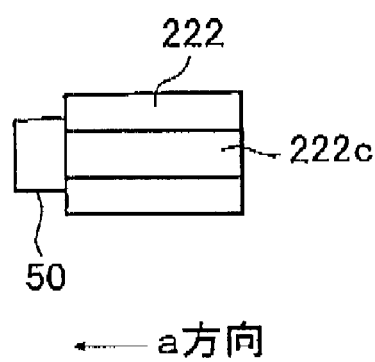
FIG. 20A is a side view illustrating the lower main light source as seen from a longitudinal end thereof.
Figure 20B:
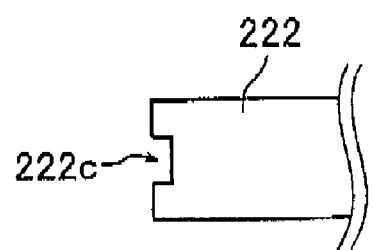
FIG. 20B is a partial rear view illustrating the lower main light source of FIG. 20A as seen from a direction "a."
Figure 21A:
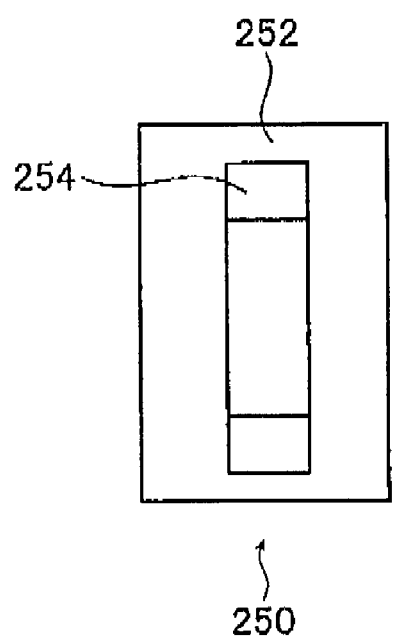
FIG. 21A is a schematic front view illustrating an example of the guide member.
Figure 21B:
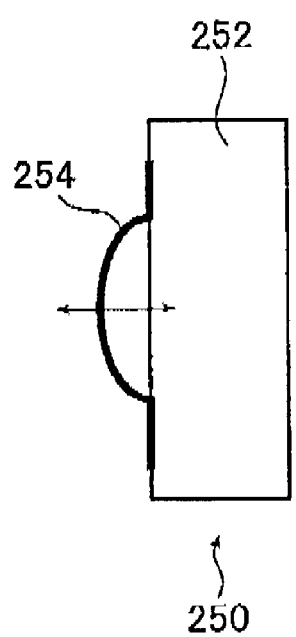
FIG. 21B is a side view of the guide member illustrated in FIG. 21A.

FIG. 20A is a side view illustrating the lower main light source 214 as seen from a longitudinal end thereof; FIG. 20B is a rear view illustrating part of the lower main light source 214 of FIG. 20A as seen from a direction indicated by an arrow "a." FIG. 21A is a front view of the guide member 250; FIG. 21B is a side view of the guide member 250 illustrated in FIG. 21A.

Referring first to FIGS. 20A and 20B, the lower main light source 214 has a guide groove 222c formed in a region of its lateral plane corresponding to the guide member 250 in the optical axis direction, i.e., in the direction perpendicular to the light entrance plane.

As illustrated in FIGS. 21A and 21B, the guide member 250 comprises a base member 252 in the form of a plate and a spring member 254 provided on a plane thereof opposite the light source support 222.

The spring member 254 is an elastic member capable of expanding only in the direction of the line where the light exit plane 30a and the second light entrance plane 30e meet (in a horizontal direction in FIG. 21B).

Thus, the light source support 222 can be supported such that it can move in the optical axis direction and expand/contract in the direction of the line where the light exit plane 30a and the second light entrance plane 30e meet by adapting the spring member 254 of the guide member 250 secured to the housing to expand/contract only in the direction of the line where the light exit plane 30a and the second light entrance plane 30e meet and by engaging the spring member 254 with the guide groove 222c extending in the optical axis direction.

This prevents the light source support 222 from moving in a direction perpendicular to the light exit plane.

Further, even when the light source support expands/contracts, the engagement of the guide member 250 with the groove formed in the light source support can be maintained by adapting the portion of the guide member 250 engaging with the light source support to be expandable/contractible in the direction of the line where the light exit plane 30a and the second light entrance plane 30e meet. In addition, the light source support can be kept free from greater stress than is necessary.

As described above, the light source supports 220 and 222 of the planar lighting device 130 can be prevented from moving in a direction perpendicular to the light exit plane by providing the four guide members 250 as the guide means 218 adjacent the lateral planes of the light source support 220 and the lateral planes of the light source support 222 in four locations for supporting the light source supports 220 and 222 such that the light source supports are movable in the optical axis direction and expandable/contractible in the direction of the line where the light exit plane 30a and the second light entrance plane 30e meet in order to prevent the light source supports 220 and 222 from moving in the direction perpendicular to the light exit plane.

This prevent the first securing means 214 supporting the light source support 220 and the second securing member means 216 supporting the light source support 222 from moving in the direction perpendicular to the light exit plane and the light exit plane of the light guide plate held by the first securing means 214 and the second securing means 216 from moving in the direction perpendicular to the light exit plane.

Thus, the light exit plane is held in position in the housing in the direction perpendicular to the light exit plane. Further, the light exit plane and the liquid crystal display panel can be kept spaced a constant distance from each other, enabling optimum images to be displayed free from uneven brightness.

Further, warping of the light guide plate 30 and the projection of the light exit plane 30a in a direction perpendicular thereto can be prevented and the planar lighting device can be provided with a reduced thickness. This in turn makes it possible to provide a liquid crystal display device with a reduced thickness.

Although the planar lighting device 130 is provided with guide members in four locations, the guide members may only be provided at least in two locations for the light source support of the lower main light source in cases where, as in the embodiment under discussion, the upper main light source is secured to the housing by the fixed ends.

Since almost no displacement of the light exit plane occurs on the side closer to the upper main light source, providing the guide members in two locations for the light source support of the lower main light source suffices to prevent the light exit plane 30a from projecting in a direction perpendicular thereto.

Further, the guide member is not limited to the configuration of the guide member illustrated in FIG. 21.

FIG. 22A is a front view of another example of configuration of the guide member; FIG. 22B is an elevation of the guide member illustrated in FIG. 22A. FIG. 23A is a front view of still another example of configuration of the guide member; FIG. 23B is an elevation of the guide member illustrated in FIG. 23A.

A guide member 260 illustrated in FIG. 22, for example, comprises a base member 262 in the form of a plate and plungers 264 disposed on a plane of the base member 262 opposite the light source support 222.

The plungers 264 are members capable of expanding and contracting only in the direction of the line where the light exit plane 30a and the second light entrance plane 30e meet (in a horizontal direction in FIG. 22B) and arranged in a straight line in a direction parallel to the direction in which the guide groove 222c extends. The plungers 264 engage with the guide groove 222c. Thus, the guide member provided with plungers in place of a spring can also produce like effects.

The guide member illustrated in FIG. 23 comprises a base member 272 in the form of a plate, springs 274 disposed on a plane of the base member 272 opposite the light source support 222, and a linear guide 276 supported by the ends of the springs 274 facing the light source support 222.

The linear guide 276 is urged in a direction of the line where the light exit plane 30a and the second light entrance plane 30e meet (in a horizontal direction in FIG. 23B). The linear guide 276 engages with the guide groove 222c. Thus, the guide members provided with a linear guide 276 combined with springs can also produce like effects as in the cases described above.

Although the guide members have a projection and the light source support has a groove to engage with the projection in all the above embodiments, the invention is not limited to such a configuration. The light source support may have a projection and the guide members may have a groove. In this case, the light source support may have a projection equal to or higher than a given minimum height (equal to or higher than an expansion/contraction range of the light source support) such that the projection of the light source support is allowed to move in the direction of the line where the light exit plane 30a and the second light entrance plane 30e meet as the light source support expands and contracts.

Although each light source support and the guide members are adapted to engage with each other in the above embodiments, the invention is not limited to such a configuration. The longitudinal ends of the securing members may be adapted to have a groove, or the longitudinal ends of the fixed ends may be adapted to have a groove to engage the securing members and the guide members or the fixed ends and the guide members.

Further, the locations of the guide members are not limited, provided that the light sources or the securing means and the light guide plate can be prevented from moving with respect to the housing in a direction perpendicular to the light exit plane but movably held in the other directions. For example, the securing members may be supported from the side thereof opposite from the light guide plate.

Although the light sources are secured to the fixed ends or the securing members with fastener pins in the planar lighting device 130, the invention is not limited thereto; the light sources may be directly connected to the fixed ends or the securing members. Further, the fixed ends and the securing members may not be provided because the upper main light source can be secured to the housing by the fastener pins, and the position in a direction perpendicular to the light exit plane can be fixed to a given position by the guide members. In cases where no fixed ends or securing members are provided, the reinforcing members and the fastener pins serve as securing means, respectively.

Further, the fastener pins need not necessarily extend from one end through the other end of the light source support and may engage with only one side of each light source support or, alternatively, separate fastener pins may be provided on the sides each closer to the light exit plane and the inclined planes, provided that the fastener pins can fasten the housing, the fixed ends and the light source supports or the fixed ends (securing members), the reinforcing members, and the light source supports.

Further, displacement of the light exit plane, the light sources or other parts can be prevented with increased certainty by providing the sliding mechanism described earlier.

Although the planar lighting device 130 has been described as having two light sources, the upper main light source and the lower main light source, the invention is not limited to such a configuration; auxiliary light sources may be provided opposite the lateral planes 30f, 30g of the light guide plate to admit light through the four sides.

Figure 24A:
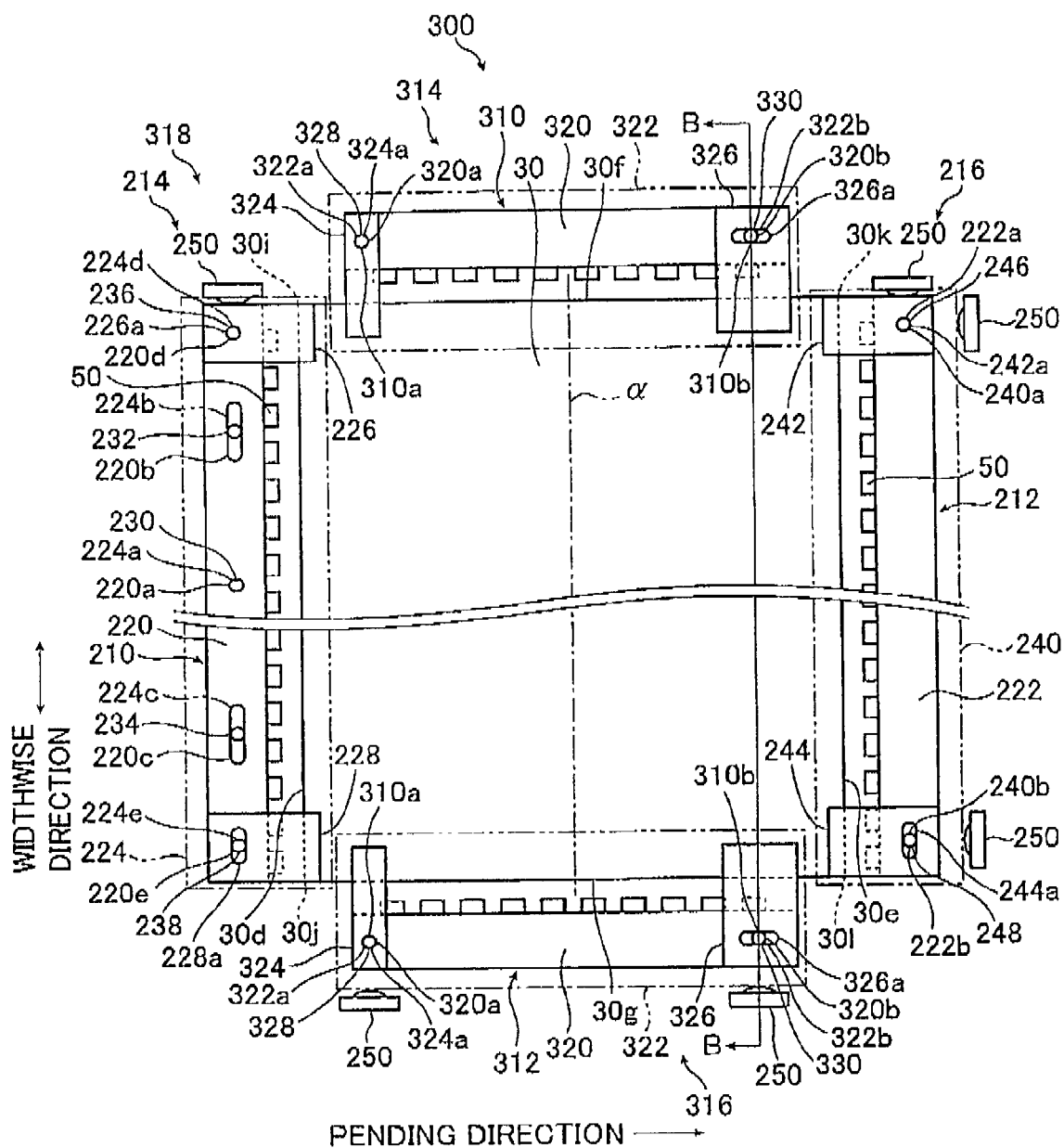
FIG. 24A is a schematic plan view illustrating light sources, light guide plate, reinforcing members, and guide members of another example of the planar lighting device, as partially omitted.
Figure 24B:
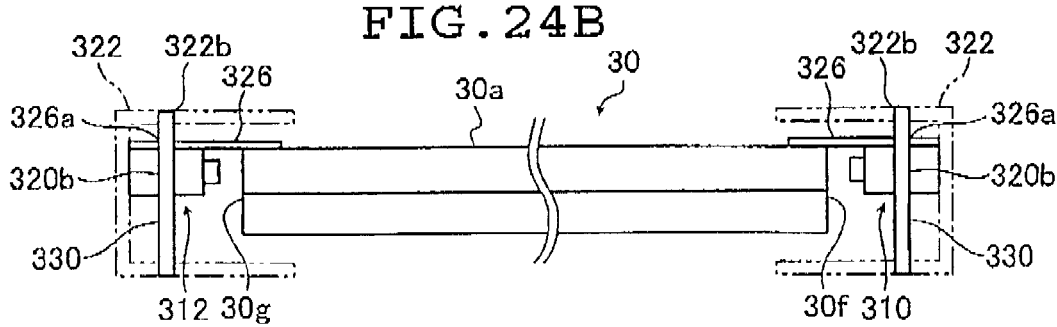
FIG. 24B is a sectional view taken along line B-B of FIG. 24A.

FIG. 24A is a schematic plan view illustrating, partially omitted, light sources, a light guide plate, reinforcing members and guide means of another example of planar lighting device; FIG. 24B is a sectional view of FIG. 24A taken along line B-B.

A planar lighting device 300 illustrated in FIG. 24 comprises the upper main light source 210 and the lower main light source 214 disposed opposite the light entrance planes 30d, 30e as main light sources and auxiliary light sources 310, 312 disposed opposite the first lateral plane 30f and the second lateral plane 30g, thus adapting the first lateral plane 30f and the second lateral plane 30g to serve as a third light entrance plane and a fourth light entrance plane, respectively. Thus, the present invention is capable of increasing the brightness of the light emitted through the light exit plane.

The planar lighting device illustrated in FIG. 24 is substantially the same as the planar lighting device 130 except that the former comprises two third securing means 314, 316 for keeping the two auxiliary light sources 310, 312 at a constant distance from the light guide plate 30 and also comprises guide means 318. Thus, like members are given like reference characters and description thereof will not be repeated here, but features unique to the planar lighting device 300 will be described.

The planar lighting device 300 comprises the upper main light source 210, the lower main light source 212, the auxiliary light sources 310, 312, the light guide plate 30, the first securing means 214, the second securing means 216, the third securing means 314, 316, and the guide means 318. The planar lighting device 300 further comprises the optical member unit, the reflection plate, the lower housing, the upper housing, and the reinforcing members (housing reinforcing members), though not shown, as does the planar lighting device 130.

The auxiliary light source 310 and the third securing means 314 are provided opposite the lateral plane 30f of the light guide plate 30; the auxiliary light source 312 and the third securing means 316 are provided opposite the lateral plane 30g of the light guide plate 30. The auxiliary light source 310 and the third securing means 314 are basically identical in configuration to the auxiliary light source 312 and the third securing means 316 except that they are disposed opposite different planes of the light guide plate 30. Thus, the auxiliary light source 310 and the third securing means 314 will be described as a representative.

The auxiliary light source 310 comprises the LED chips 50 and the light source support 320, as does the main light source. The light source support 320 is a plate member and carries the LED chips 50 disposed in an array on a plane thereof opposite the lateral plane 30f.

The light source support 320 has a circular hole 320a formed near its longitudinal upper end in vertical direction (its end closer to the first light entrance plane 30d) for engaging with a fastener pin 328 to be described and a circular hole 320b formed near its longitudinal lower end in vertical direction (its end closer to the second light entrance plane 30e) for engaging with a fastener pin 330 also to be described.

The third securing means 314 comprises a securing member 322, fourth reinforcing members 324, 326, and the fastener pins 328, 330.

The securing member 322 is movably disposed with respect to the housing. The securing member 322 is a columnar member having a U-shaped cross section and houses the auxiliary light source 310 therein. The securing member 322 secures the auxiliary light source 310 to a given position inside the securing member 322 with the fastener pins 328, 330 to be described.

The securing member 322 has circular holes 322a, 322b formed therein corresponding to the circular holes 320a, 320b of the light source support 320 of the auxiliary light source 310.

The fourth reinforcing member 324 is a plate member having one end thereof closer to the lateral plane 30f secured to the light exit plane 30a near the corner 30i of the light guide plate 30, with the other end extending outwardly from the light exit plane 30a. The part of the fourth reinforcing member 324 extending outwardly from the light exit plane 30a extends to a position opposite the light source support 320 and has a circular hole 324a formed in a position corresponding to the circular hole 320a such that the longer diameter thereof extends parallel to the longitudinal direction of the light source support 320.

The fourth reinforcing member 326 is a plate member having one end thereof closer to the lateral plane 30f secured to the light exit plane 30a near the corner 30k of the light guide plate 30, with the other end extending outwardly from the light exit plane 30a. The part of the fourth reinforcing member 326 extending outwardly from the light exit plane 30a extends to a position opposite the light source support 320 and has a circular hole 326a formed in a position corresponding to the circular hole 322b such that the longer diameter thereof extends parallel to the longitudinal direction of the light source support 320.

The fourth reinforcing members 324, 326 have substantially the same configuration as do the first reinforcing members and the second reinforcing members described earlier and secured to the light guide plate by bonding using an adhesive.

The fastener pin 328 is secured as it is inserted through the circular hole 320a of the light source support 320 and the circular hole 322a of the securing member 322. The fastener pin 328 is further inserted through the hole 324a of the fourth reinforcing member 324 disposed between the light source support 320 and the securing member 322.

The fastener pin 330 is secured as it is inserted through the circular hole 320b of the light source support 320 and the circular hole 322b of the securing member 322. The fastener pin 328 is further inserted through the hole 326a of the second reinforcing member 326 disposed between the light source support 320 and the securing member 322.

The third fastener mean 314 is configured as described above. Accordingly, the fastener pin 328 is inserted through the circular hole 324a of the fourth reinforcing member 324 to fix the position of the fourth reinforcing member 324 secured to the light guide plate 30 in a direction parallel to the line where the lateral plane 30f and the light exit plane 30a meet; the fastener pin 330 is inserted through the long hole 324a of the fourth reinforcing member 324 such that the fourth reinforcing member 324 is movable in a direction parallel to the line where the lateral plane 30f and the light exit plane 30a meet; thus the light guide plate 30 can be supported free to expand and contract in the direction parallel to the line where the lateral plane 30f and the light exit plane 30a meet. Further, the fourth reinforcing member 324 and the fourth reinforcing member 326 keep the distance between the lower main light source 212 and the second light entrance plane 30e constant in a direction perpendicular to the light entrance plane 30e. Thus, the distance between the lower main light source 212 and the second light entrance plane 30e can be kept constant.

The portion of the light guide plate that will be located in a lower position when the planar lighting device is installed is allowed to expand by forming the circular hole 324a in a position of the fourth reinforcing members 324 that will be located in the upper position when the planar lighting device is installed to fix the relative position of the light source and the light guide plate and by forming the long hole 326a in a position of the fourth reinforcing members 326 that will be located in the lower position when the planar lighting device is installed to adapt the fourth reinforcing members 326 connected to the light guide plate to be movable in vertical direction. Thus, a load applied to the light guide plate can be minimized.

Further, when the light guide plate expands/contracts in the widthwise direction (in the direction of the line where the light entrance plane and the light exit plane meet), the third securing means 314 moves together with the light guide plate in the widthwise direction keeping the lateral plane at a constant distance from the auxiliary light source as the light guide plate expands/contracts, since the third securing means 314 is movable with respect to the housing.

Thus, also the distance between the lateral planes and the auxiliary light sources can be kept constant without restricting the warp of the light guide plate by providing the third securing means The guide means 318 comprises six guide members 250 respectively disposed adjacent a longitudinal end face of the light source support 220 closer to the corner 30i of the light guide plate 30, a plane of the securing member 322 of the third securing means 316 opposite from the light guide plate and close to the corner 30j of the light guide plate 30, a longitudinal end face of the light source support 222 closer to the corner 30k of the light guide plate, and a plane of the securing member 322 of the third securing means 316 opposite from the light guide plate and close to the corner 30l of the light guide plate 30.

The guide members 250 have substantially the same configuration as the guide members 250 of the planar lighting device 130 described earlier and therefore will not be described in detail here.

Portions opposite the guide members 250 for the light source supports 210, 222, and 320 have a groove formed therein engaging with the projection of the respective guide members 250.

The guide members 250 engage with the respective light source supports 210, 222, and 320 such that the light source supports are movable in the optical axis direction and in the direction of the line where the light entrance plane and the light exit plane meet but are immovable in the direction perpendicular to the light exit plane.

The guide members thus provided adjacent the four corners of the light guide plate prevent the light exit plane of the light guide plate from moving in the direction perpendicular to the light exit plane.

Also in the embodiment under discussion, the guide members 250 of the guide means 318 are provided at least at two locations, close to the corner 30k and the corner 30l of the light guide plate.

In the planar lighting device of the invention, the members existent between the light sources and the housing are preferably placed in contact with each other via a radiating grease provided between them. Accordingly, it is preferable that a radiating grease is applied to, that is, a layer of heat dissipating grease is formed on, the contact surfaces of the members existent between the light sources and the housing.

Specifically, a radiating grease is preferably applied onto the contact surfaces between the light source supports of the light sources and the securing means, the contact surfaces between the members forming the securing means, and the contact surfaces between the securing means and the housing or the upper housing and the lower housing to place the members in contact with each other via the radiating grease.

A radiating grease used to that end may be, for example, silicon grease, silicon grease containing a metal filler, or the like.

Thus, the securing members can be supported in a slidable state while the heat of the light sources can be transmitted to the housing more easily by placing the members in contact with each other with a radiating grease provided therebetween, thereby increasing a heat radiation efficiency of the entire device and preventing temperature rise of the light sources. Prevention of temperature rise of the light sources thus achieved in turn leads to increase in the light emission efficiency of the light sources.

Further, limitation of temperature rise of the light sources and prevention of decrease in the light emission efficiency of the LEDs thus achieved permit increasing the brightness of light emitted by consuming the same amount of electrical power, which in turn serves to lower the power consumption by the planar lighting device.

Still further, deformation of the light guide plate that might otherwise be caused by heating of the light sources can be prevented and, therefore, deformation of the device can be prevented, which in turn prevents otherwise possible deformation from exerting unnecessary force to the liquid crystal display panel, causing the panel to deform and develop white patches, etc. Further, suppression of warps thus achieved eliminates or minimizes the need to provide a space anticipating warps or cushioning material, thereby simplifying the configuration of the device to achieve a thinner design of the device.

Further, efficient heat radiation achieved eliminates or minimizes the need to provide expensive heat radiation means such as heat pipes, achieving an inexpensive device.

Further still, application of a radiating grease also serves to allow the movable components to slide smoothly.

Preferably, the radiating grease has a thermal conductivity of at least 0.6 W/m·k. Preferably used is silicon grease, which has a thermal conductivity of 10 W/m·k and contains metallic particles dispersed therein such as silver particles.

Where the radiating grease having a thermal conductivity of at least 0.6 W/m·k is used, an efficient heat transmission is achieved. Further, use of grease containing metal particles dispersed therein permits efficient radiation of heat generated in the light sources even when the grease is applied in a thick layer.

The radiating grease preferably has a consistency of 300 to 400 both inclusive.

The consistency of at least 300 allows the radiating grease to be applied in a thin layer; the consistency not greater than 400 prevents decrease of mobility of the slidable components and, for example, enables movable members to be moved with a low resistance.

Preferably, the radiating grease is applied to the entire surface of each contact surface.

When the radiating grease is applied to the entire surface of each contact surface, the heat of the light sources can be transmitted to the housing more efficiently.

Since heat is transmitted through each contact surface, the radiating grease needs to be applied to at least part of each contact surface, but only partially applied grease not applied to the entire surface of each contact surface can also produce a certain degree of effects.

Now, description will be made in detail referring to specific examples.

An example of measurements now to be described used a planar lighting device illustrated in FIG. 2, wherein a radiating grease was applied in a thickness of 50 to 100 μm to the entire surface where the light sources 28 are in contact with the securing members 31a, the contact surface between the securing members 31a and the lower sliding members 48c, the contact surface between the lower sliding members 48c and the securing members 48a of the lower sliding member 48c, the contact surface between the securing members 48a and the lower housing 42, the contact surface between the securing members 31a and the heat sinks 64, the contact surface between the heat sinks 64 and the lower housing 42, the contact surface between the heat sinks 64 and the heat pipes 66, and the entire contact surface between the heat pipes 66 and the lower housing 42. The application of the radiating grease was done on both sides of the light guide plate 30 where the two light entrance planes are located. The radiating grease used for the measurements was a heat radiating silicone oil compound (brand name) having a thermal conductivity of 0.84 W/(m/k) and a consistency of 300. The light source supports used were members in the form of a plate. The light guide plate used was one for a 52-inch planar lighting device. The planar lighting device was suspended such that one of the securing members 31a was located in an upper position and the other was located beneath in a lower position.

Using the planar lighting device configured as above, measurements were made of the temperature of the light sources 28, flatness of the light guide plate, and brightness of the light emitted through the light exit plane of the planar lighting device. For comparison, measurements were also made of the temperature of the light sources 28, flatness of the light guide plate and brightness of the light emitted through the light exit plane.

The temperature of the light sources was determined by placing a thermocouple at a longitudinal center of the light source support 50, 5 mm immediately below a position where the LED chips 50 are mounted to the upper light source 28.

Flatness of the light guide plate was determined by measuring the amount of deformation of the upper and lower frame portions of the planar lighting device in relation to a reference gage (right-angle gauge) using a three-dimensional vision measuring method.

Brightness of the light emitted through the light exit plane was determined by measuring the brightness at the center of the light exit plane with a brightness meter (brand name: spectroradiometer SR-3).

Figure 25:
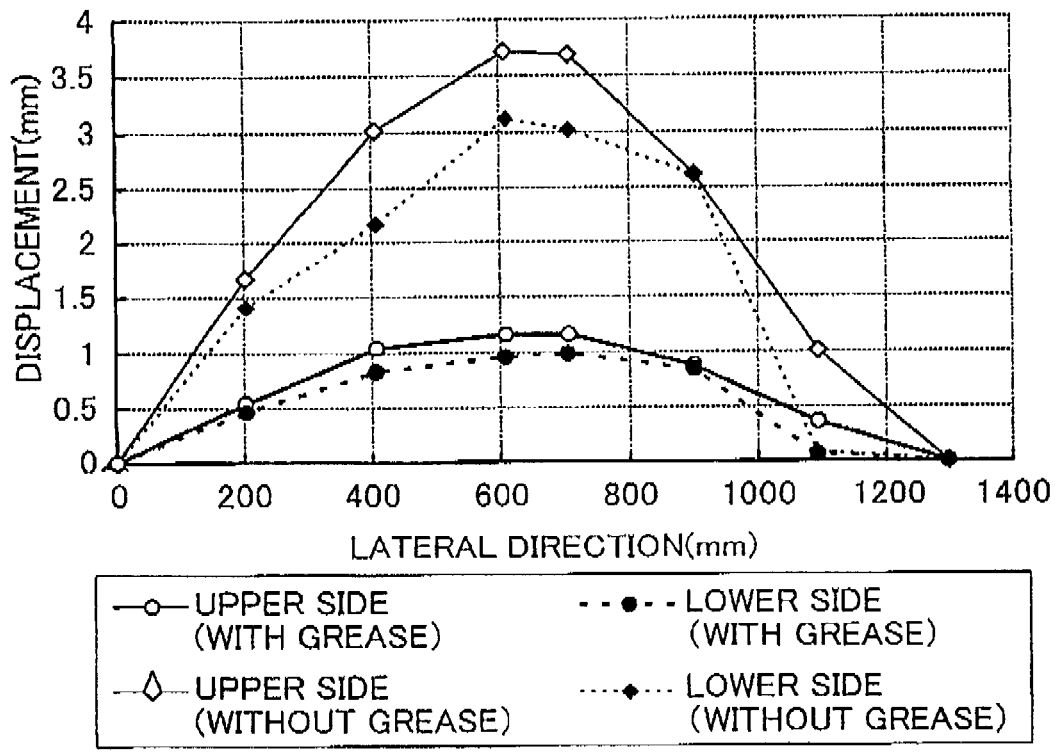
FIG. 25 is a graph illustrating measurements representing the flatness of a liquid crystal panel module.
Figure 26:
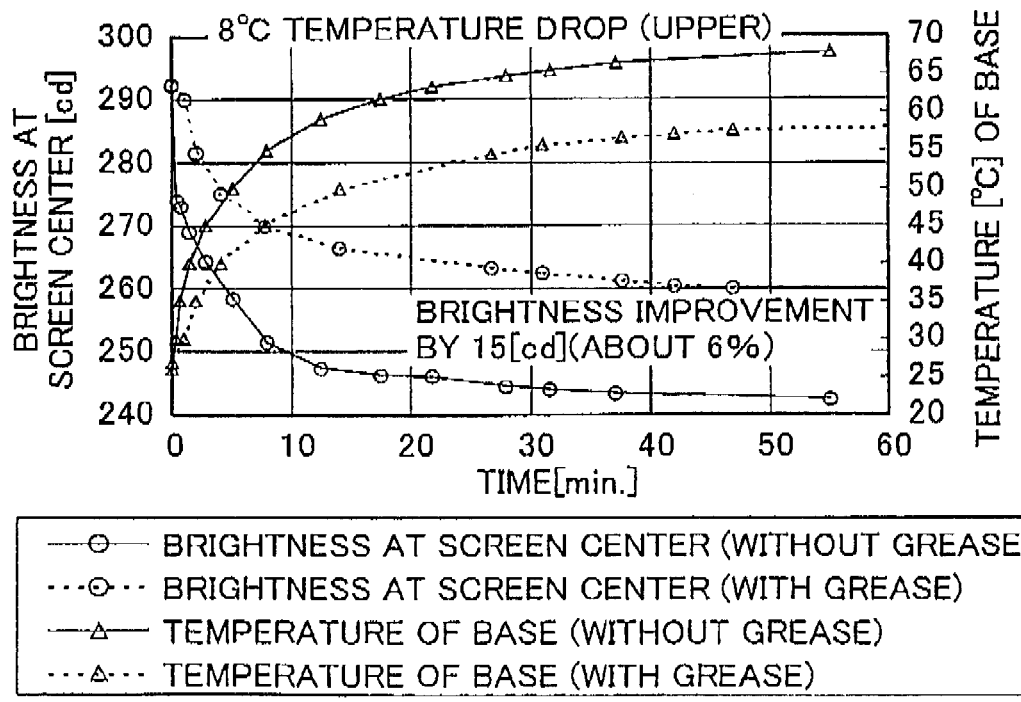
FIG. 26 is a graph illustrating relationships between the brightness at the center of the planar lighting device and the temperature of the light sources on the one hand and elapsed time of illumination by the light sources on the other hand.

The measurements obtained are illustrated in FIGS. 25 and 26.

FIG. 25 is a graph illustrating measurements representing the flatness of a liquid crystal panel module; FIG. 26 is a graph illustrating measurements showing relationships between the length of time of illumination on the one hand and the temperature of the light sources and brightness of light emitted through the light exit plane on the other. In FIG. 25, the vertical axis indicates displacement, and the horizontal axis indicates the longitudinal direction of the upper and lower frames. In FIG. 26, the vertical axis indicates the temperature of the light source [° C.] and brightness [cd], and the horizontal axis indicates the length of time of illumination [min].

As illustrated in FIG. 25, in the case the radiating grease was not applied, a maximum displacement in the upper frame of the planar lighting device (indicated as "UPPER SIDE (WITHOUT GREASE)" in FIG. 25) was found to be 3.7 mm and a maximum displacement in the lower frame (indicated as "LOWER SIDE (WITHOUT GREASE)" in FIG. 25) was found to be 3.1 mm. In contrast, in the case the radiating grease was applied, a maximum displacement in the upper frame of the planar lighting device (indicated as "UPPER SIDE (WITH GREASE)" in FIG. 25) was found to be 1.2 mm and a maximum displacement in the lower frame (indicated as "LOWER SIDE (WITH GREASE)" in FIG. 25) was found to be 1.0 mm. This shows that application of the radiating grease reduces the displacement of the frames of the planar lighting device to one third as compared with the case the radiating grease was not applied.

From the foregoing, it is apparent that application of the radiating grease prevents deformation of the light guide plate and hence maintains the flatness thereof at a high level.

Further, FIG. 26 shows that in the case the radiating grease was applied, the temperature of the light source 28 was lower by 10° C. and, 55 minutes later, the brightness improved by 6% as compared with the case the radiating grease was not applied.

Now, as earlier described referring to FIG. 16, the light guide plate 30 may have another configuration such that the light exit plane 100a of the light guide plate 100 is a curved plane curved downwardly or curved toward the inclined planes (reflection plate 34) from the light entrance planes toward the center or, more specifically, the light exit plane 100a may be an arc in a plane perpendicular to the lines where the light entrance planes meet the light exit plane may be an arc.

Thus, in case the light guide plate 100 expands/contracts to develop a warp, the light exit plane 100a of the light guide plate 100 warps so as to curve toward the reflection plate 34 (downward in the drawing) when the light guide plate 100 is adapted to have the concave light exit plane 100a curved toward the reflection plate 34. Accordingly, the light guide plate 100 warps away from the liquid crystal display panel, i.e., downward in the drawing, which prevents the light guide plate 100 from pushing up the liquid crystal display panel and thus prevents occurrence of uneven brightness in the light emitted from the liquid crystal display device in a more preferable manner.

An embodiment of the light guide plate for further improving the properties of the above light guide plate 100 will be described below.

Figure 27:
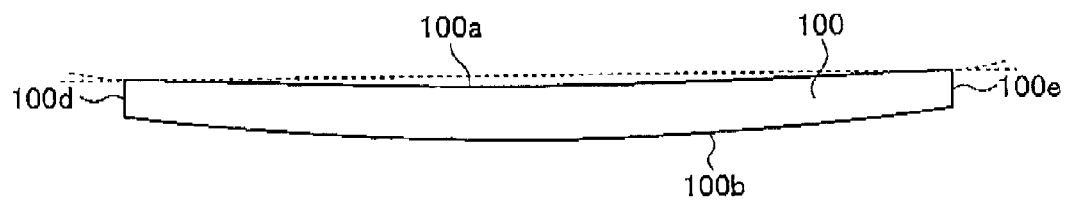
FIG. 27 is a sectional view of another example of the inventive light guide plate.

While the light guide plate 100 illustrated in FIG. 16A has the light exit plane 100a and the plane located on the side closer to the reflection plate (i.e., a plane formed by the inclined planes 100b, 100c and the curved portion 100h, or the rear plane) outwardly curved downwardly, the light guide plate 100 according to the embodiment illustrated in FIG. 27 has the rear plane 100b adapted to be a continuously curved plane outwardly curved downwardly as well as the light exit plane 100a. Further, the light guide plate 100 has a recess 100a1 in the light exit plane 100a capable of containing the optical member unit 32 as earlier described composed of the diffusion sheet 32a, the prism sheet 32b, and the diffusion sheet 32c, as illustrated in FIG. 27.

Figure 28A:
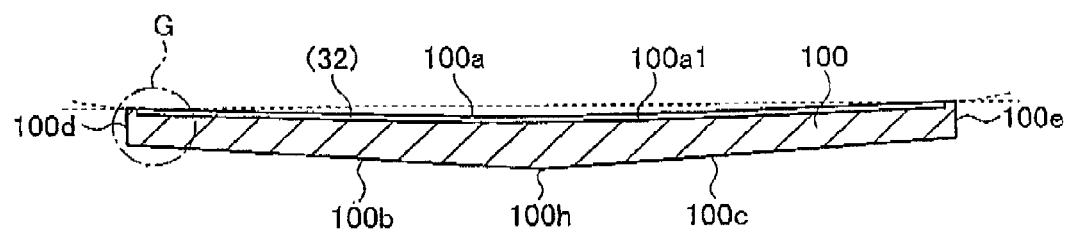
FIGS. 28A and 28B are schematic sectional views of embodiments of the light guide plate, which are improvements over the embodiments illustrated in FIG. 16 and FIG. 27, respectively.
Figure 28B:
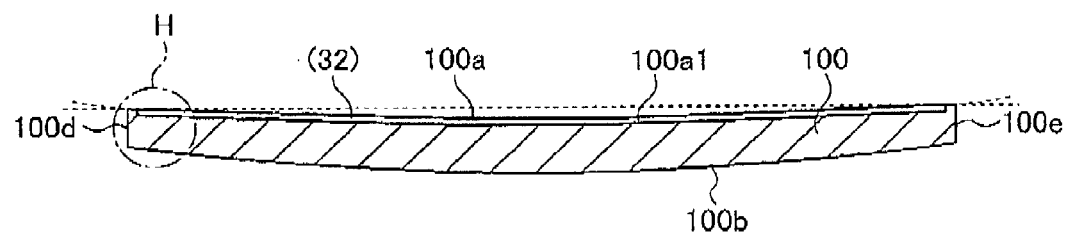

Thus, the light guide plate 100 according to the embodiment under discussion, which is an improvement over the light guide plate 100 illustrated in FIGS. 16A and 27, has the recess 100a1 in the light exit plane 100a capable of containing the optical member unit 32, as illustrated in FIGS. 28A and 28B.

Figure 29A:
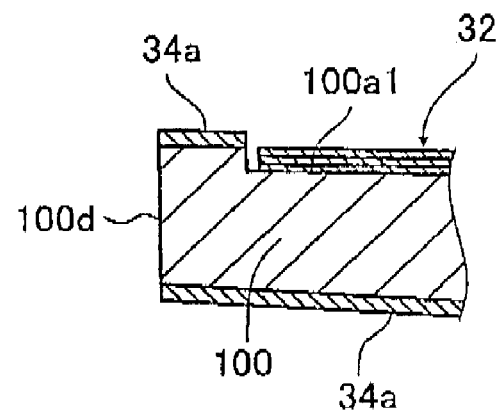
FIGS. 29A to 29C are sectional views respectively illustrating parts G and H of the embodiments of FIGS. 28A to 28B in detail.
Figure 29B:
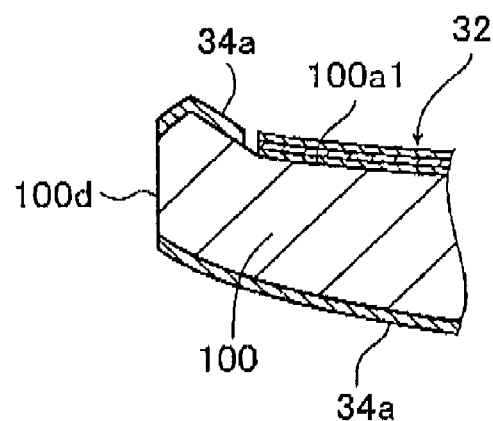
Figure 29C:
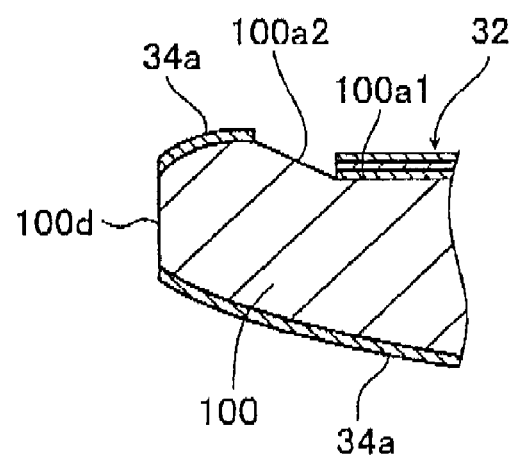
Figure 30:
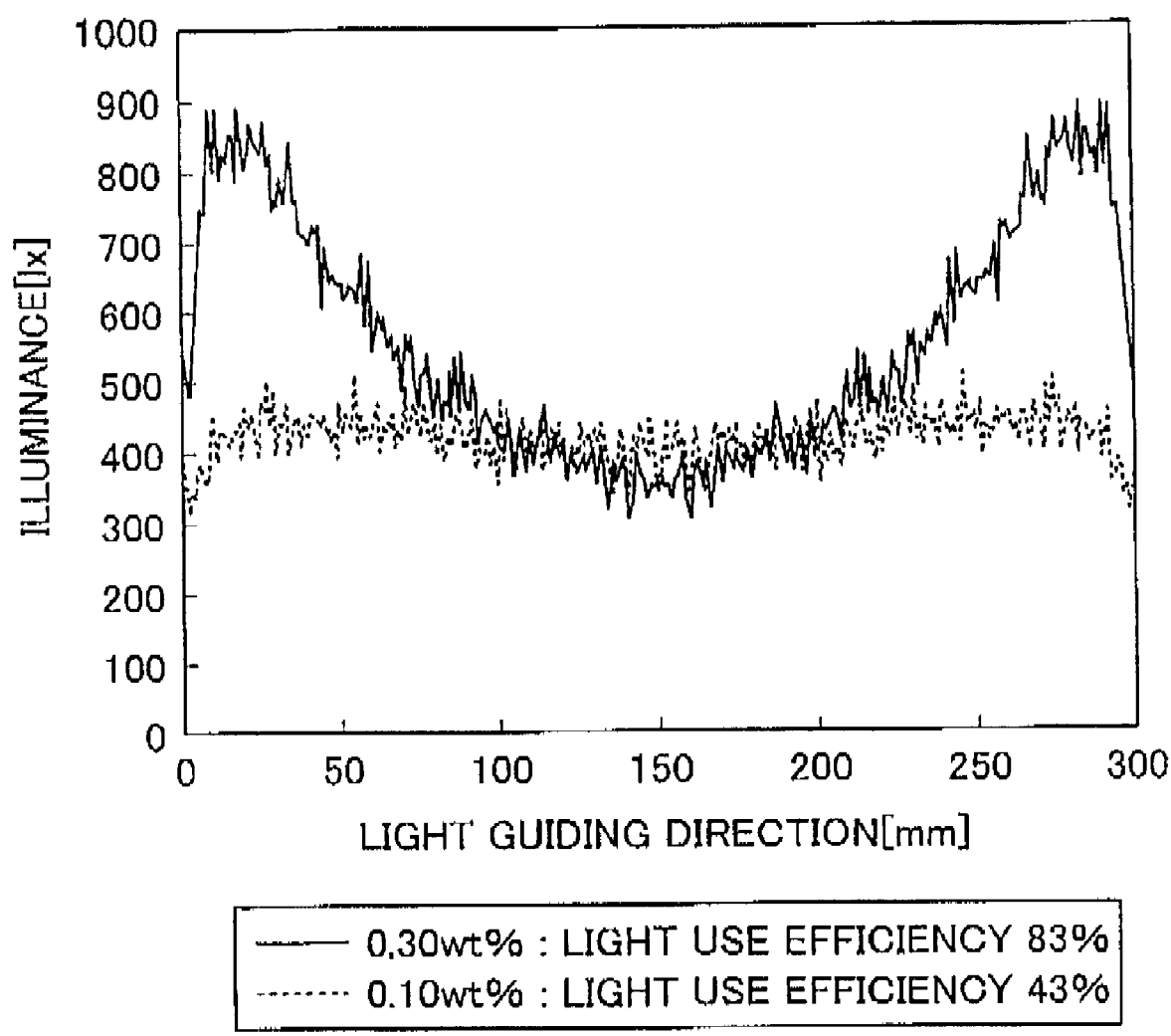
FIG. 30 is a graph illustrating an illuminance distribution of a conventional light guide plate as observed from the front thereof.

In either example illustrated, an optical film 34a or the like is preferably attached to both sides of the light guide plate 100, the front side and the rear side, excluding the light exit plane 100a and the light entrance planes 100d, 100e, as illustrated in FIGS. 29A to 29C, in order to prevent undesirable light emission from the light guide plate 100.

FIG. 29A is a detailed view of an encircled portion G illustrated in FIG. 28R; FIGS. 29B and 29C are detailed views of an encircled portion H illustrated in FIG. 28B. FIGS. 29a to 29C illustrate examples of the end of the recess 100a1 formed in the light exit plane 100a of the light guide plate 100 respectively. The example illustrated in FIG. 29C uses a taper 100a2 in the surface profile that changes from the recess 100a1 to the end of the surface of the light guide plate 100 to minimize the angular change.

According to the above embodiment, in case the light guide plate 100 expands/contracts to develop a warp, the light exit plane 100a of the light guide plate 100 warps so as to curve toward the reflection plate 34 (downward in the drawing) when the light guide plate 100 is adapted to have the concave light exit plane 100a curved toward the reflection plate 34. Accordingly, the light guide plate 100 warps away from the liquid crystal display panel, i.e., downward in the drawing, which prevents the light guide plate 100 from pushing up the liquid crystal display panel and thus prevents occurrence of uneven brightness in the light emitted from the liquid crystal display device 10 in a more preferable manner.

As has been described referring to various embodiments and examples, the invention achieves a planar lighting device having a thin shape, yielding a high light use efficiency, capable of emitting light with a minimized brightness unevenness, and providing a high-in-the-middle or bell-curve brightness distribution.

It is to be noted that the embodiments and examples given above are not limitative in any manner of the invention, and various modifications and improvements may be made without departing from the spirit of the present invention.

What is claimed is:

1. A planar lighting device comprising:
a light guide plate including
a light exit plane being rectangular,
two light entrance planes respectively containing two opposite longer sides of the light exit plane and being disposed opposite each other,
two inclined planes being symmetrical and being increasingly distanced from the light exit plane with an increasing distance from the two light entrance planes toward a center of the light exit plane,
a curved portion joining the two inclined planes, and scattering particles for scattering light propagating inside the light guide plate and being contained within the light guide plate;
two light sources disposed opposite the two light entrance planes of the light guide plate, respectively;
securing means for integrating the two light sources and the light guide plate such that the two light sources are secured to the light guide plate with a distance between the two light sources and the two light entrance planes of the light guide plate kept constant;
a housing for accommodating the two light sources and the two light guide plate integrated by the securing means; and
a sliding mechanism provided between the housing and the securing means for allowing the securing means to slide with respect to the housing in a direction from the two light entrance planes of the light guide plate toward the two light sources as the light guide plate expands or contracts with the two light sources and the light guide plate integrated and a distance between the two light sources and the light guide plate kept constant;
wherein a distance between the two light entrance planes is from 480 mm to 830 mm both inclusive, the scattering particles have a particle diameter of from 4.0 μm to 12.0 μm both inclusive and a particle density of from 0.008 wt % to 0.25 wt % both inclusive, a light use efficiency representing a ratio of light emitted through the light exit plane to light admitted through the two light entrance planes is 55% or higher, and wherein a middle-high ratio of brightness distribution at the light exit plane representing a ratio of brightness of light emitted through a central area of the light exit plane to brightness of light emitted through an area of the light exit plane near either light entrance plane is from 0% to 25% inclusive.

2. The planar lighting device according to claim 1, wherein the light guide plate has a minimum thickness of from 0.5 mm to 3.0 mm both inclusive and a maximum thickness of from 1.0 mm to 6.0 mm both inclusive, the curved portion has a radius of curvature of from 1,500 mm to 45,000 mm both inclusive, and wherein the inclined planes have a taper angle of from 0.1° to 2.2° both inclusive with respect to a line parallel to the light exit plane.

3. The planar lighting device according to claim 1, wherein the securing means integrates the two light sources and the light guide plate so as to be slidable with respect to the housing in a direction perpendicular to a direction from the two light entrance planes of the light guide plate toward the light sources as the light exit plane expands or contracts.

4. The planar lighting device according to claim 1, wherein all members existent between the light sources and the housing are in contact with each other via a radiating grease.

5. The planar lighting device according to claim 1, wherein the sliding mechanism is essentially composed of sliding members for nipping and holding the securing means by a stress generated by screwing the housing, and wherein, supposing that a frictional force T(x) generated between the sliding member and the securing means in a position spaced by a distance x from a position of screwing is represented by a following expression:

$$T(x)=\mu \cdot G(x)$$

where G(x) is a stress distribution resulting from the screwing in a position spaced by a distance x from the position of screwing, and supposing that a pushing force F generated by expansion/contraction of the light guide plate is represented by a following expression:

$$F=Y \cdot A\text{ave} \cdot (\Delta L/L)$$

where Y is Young's modulus of the light guide plate, Aave is an average sectional area of the light guide plate, L is a length of the light guide plate, and ΔL is a length of expansion/contraction of the light guide plate, then the sliding members are disposed in a position x from a position of screwing of the housing that satisfies a following expression:

$$T(x)=\mu \cdot G(x)<F=Y \cdot A\text{ave} \cdot (\Delta L/L).$$

6. The planar lighting device according to claim 5, wherein the light guide plate has a linear expansion coefficient satisfying $1/1000 < \Delta L/L < 5/1000$ and a Young's modulus of 1.5MN/m2<Y<3MN/m2.

7. The planar lighting device according to claim 1, wherein the light exit plane of the light guide plate is curved outwardly toward the two inclined planes, the light exit plane has a radius of curvature of from 55,000 mm to 120,000 mm both inclusive, and wherein the curved portion has a radius of curvature of from 10,000 mm to 55,000 mm both inclusive.

8. The planar lighting device according to claim 7, wherein a line parallel to a tangent to the light exit plane at ends of the light exit plane adjacent respectively to the two light entrance planes form an angle of from 0.1° to 2.2° both inclusive with the two inclined planes.

9. The planar lighting device according to claim 7, wherein an angle formed by a tangent to the curved portion at a joint between each of the two inclined planes and the curved portion and a tangent to the light exit plane at an intersection where the light exit plane meets a straight line passing through the joint and parallel to the light entrance plane is equal to an angle formed by a line parallel to a tangent to the light exit plane at the ends of the light exit plane adjacent respectively to the two light entrance planes and the two inclined planes.

10. The planar lighting device according to claim 1, wherein the rectangular light exit plane of the light guide plate has an inwardly curved surface.

11. The planar lighting device according to claim 10, wherein the light guide plate contains an optical member in form of a film in a recess provided in a surface of the light exit plane.

12. The planar lighting device according to claim 11, wherein an optical reflection plane opposite the light exit plane of the light guide plate is formed by a curved plane curved toward a side of the light guide plate opposite from the light exit plane.

13. The planar lighting device according to claim 1, further comprising guide means provided between the housing and one of the two light sources to allow the one of the two light sources to slide with respect to the housing in a direction from one of the two light entrance plane toward the one of the two light source as the light guide plate expands or contracts with a distance in a direction perpendicular to the light exit plane between the light exit plane and one of the two light sources and the housing kept constant.

14. The planar lighting device according to claim 13, wherein the one of the two light sources is disposed in a lower position in vertical direction with respect to another one of the two light sources.

15. The planar lighting device according to claim 13, wherein the securing means is essentially composed of projections secured to the light source, reinforcing members in a form of plate members secured to at least one of the surfaces of the light exit plane and the inclined plane of the light guide plate and engaging with the projections to engage the light guide plate with the projections.

16. The planar lighting device according to claim 13, wherein the securing means comprises a securing member for covering planes of the light source except for the light emission plane and supporting the light source, and wherein the guide means supports the securing member so as to be movable with respect to the housing in a direction from the light exit plane of the light guide plate toward the light source.

17. The planar lighting device according to claim 13, wherein the guide means is provided by two guide members disposed respectively on both-end faces perpendicular to a longitudinal direction of the light source.

* * * * *